United States Patent
Rios et al.

(10) Patent No.: US 11,708,458 B2
(45) Date of Patent: Jul. 25, 2023

(54) COMPOSITION FOR THIOL-ENE-BASED POLYMERIZATION AND LIQUID CRYSTALLINE NETWORK-CONTAINING OBJECTS FORMED THEREFROM USING ADDITIVE MANUFACTURING

(71) Applicants: Orlando Rios, Knoxville, TN (US); William G. Carter, Knoxville, TN (US); Michael R. Kessler, Fargo, ND (US); Yuzhan Li, Knoxville, TN (US); Monojoy Goswami, Knoxville, TN (US)

(72) Inventors: Orlando Rios, Knoxville, TN (US); William G. Carter, Knoxville, TN (US); Michael R. Kessler, Fargo, ND (US); Yuzhan Li, Knoxville, TN (US); Monojoy Goswami, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 179 days.

(21) Appl. No.: 17/076,693

(22) Filed: Oct. 21, 2020

(65) Prior Publication Data
US 2022/0056215 A1    Feb. 24, 2022

Related U.S. Application Data

(60) Provisional application No. 63/068,400, filed on Aug. 21, 2020.

(51) Int. Cl.
| | | |
|---|---|---|
| *C08G 75/045* | (2016.01) | |
| *C09K 19/38* | (2006.01) | |
| *B33Y 10/00* | (2015.01) | |
| *B29C 64/106* | (2017.01) | |
| *B29C 64/336* | (2017.01) | |
| *B33Y 70/00* | (2020.01) | |
| *B29K 25/00* | (2006.01) | |

(52) U.S. Cl.
CPC .......... *C08G 75/045* (2013.01); *B29C 64/106* (2017.08); *B29C 64/336* (2017.08); *B33Y 10/00* (2014.12); *B33Y 70/00* (2014.12); *C09K 19/3804* (2013.01); *B29K 2025/00* (2013.01); *B29K 2995/0041* (2013.01)

(58) Field of Classification Search
CPC .............. C09K 19/3804; C09K 19/402; C09K 19/2007; C09K 19/24; C09K 2019/0444; C09K 2019/0448
See application file for complete search history.

(56) References Cited

U.S. PATENT DOCUMENTS

| | | |
|---|---|---|
| 4,710,547 A | 12/1987 | Uryu et al. |
| 5,393,644 A | 2/1995 | Etzbach et al. |
| 5,811,504 A | 9/1998 | Shiota et al. |
| 7,794,623 B2 | 9/2010 | Matayabas, Jr. et al. |
| 10,253,261 B2 | 4/2019 | Li et al. |
| 10,407,535 B2 | 9/2019 | Li et al. |
| 2006/0128826 A1 | 6/2006 | Ellison et al. |
| 2008/0063808 A1 | 3/2008 | Stum et al. |
| 2008/0258108 A1 | 10/2008 | Broer et al. |
| 2009/0096136 A1 | 4/2009 | Hawker et al. |
| 2009/0176941 A1 | 7/2009 | David et al. |
| 2022/0056215 A1* | 2/2022 | Rios ..................... C08G 75/045 |

OTHER PUBLICATIONS

Li et al., "Liquid crystalline networks based on photo-initiated thiol-ene click chemistry", Soft Matter, Feb. 16, 2020, vol. 16, pp. 1760-1770. (Year: 2020).*
Li et al., "Liquid crystalline networks based on photo-initiated thiol-ene click chemistry," *Soft Matter*, 16(7): 1760-1770, Dec. 10, 2019.
Radl et al., "Photo-responsive thiol-ene networks for the design of switchable polymer patterns," *Polymer Chemistry*, No. 8, pp. 1562-1572, Jan. 31, 2017.

* cited by examiner

*Primary Examiner* — Geraldina Visconti
(74) *Attorney, Agent, or Firm* — Klarquist Sparkman, LLP

(57) ABSTRACT

Disclosed herein are embodiments of a composition that can be used to make liquid crystalline networks using thiol-ene-based polymerization. In particular embodiments, the liquid crystalline networks can be formed by using the composition embodiments in additive manufacturing methods. The composition comprises a monomer, chain extender compound, and a crosslinker compound and each of these components can be selected so as to influence the thermomechanical and shape memory properties of the liquid crystalline networks and/or objects formed therewith.

20 Claims, 25 Drawing Sheets

COMPOSITION FOR THIOL-ENE-BASED POLYMERIZATION AND LIQUID CRYSTALLINE NETWORK-CONTAINING OBJECTS FORMED THEREFROM USING ADDITIVE MANUFACTURING

CROSS REFERENCE TO RELATED APPLICATION

This application claims the benefit of the earlier filing date of U.S. Provisional Patent Application No. 63/068,400, filed on Aug. 21, 2020, the entirety of which is incorporated herein by reference.

ACKNOWLEDGMENT OF GOVERNMENT SUPPORT

This invention was made with government support under Contract No. DE-AC05-00OR22725 awarded by the U.S. Department of Energy. The government has certain rights in the invention.

FIELD

Disclosed herein are embodiments of a liquid crystalline network (LCN) comprising covalently bound monomer, chain extender, and crosslinker components that are coupled using thiol-ene chemistry, as well as compositions used to make such LCNs and methods of making and using the LCNs, particularly in additive manufacturing.

BACKGROUND

In recent years, using light to induce shape change in a material has received much interest; however, the current photoresponsive LCNs, such as those based on either polysiloxane or polyacrylate chemistries, cannot undergo reversible phase transitions, which limits their functionality and use. Such materials also cannot be reprocessed because of their covalently fixed cross-linked structure, which makes it impossible to reshape or repair the material. There exists a need in the art for LCNs that are amenable to reversible phase transitions and that can be prepared and/or used in additive manufacturing technologies.

SUMMARY

Disclosed herein are embodiments of a liquid crystalline network, comprising:
(i) a monomer having a structure according to Formula I

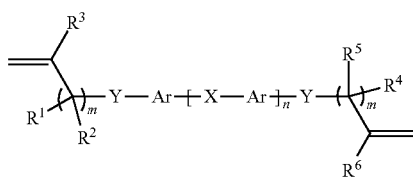

Formula I wherein
each Ar group is an aromatic ring system;
each X independently is a linker group;
each Y independently comprises a heteroatom;
each of $R^1$, $R^2$, $R^3$, $R^4$, $R^5$, and $R^6$ independently is selected from hydrogen, deuterium, aliphatic, heteroaliphatic, haloaliphatic, haloheteroaliphatic, aromatic, or an organic functional group;
n is an integer selected from 0 to 5;
and m is an integer selected from 0 to 50;
(ii) a chain extender compound having a structure according to Formula II

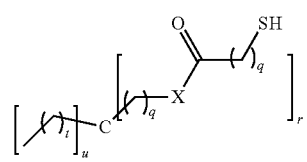

Formula II wherein
A comprises an aliphatic group, a heteroaliphatic group, an aromatic group, or an organic functional group; and
(iii) a crosslinker compound having a structure according to Formula III

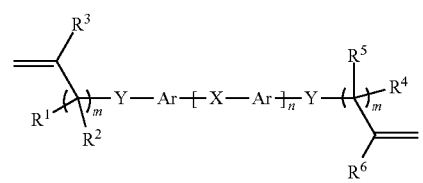

Formula III wherein
each X independently is O, S, or NR", wherein R" is hydrogen, aliphatic, or heteroaliphatic;
each q independently is an integer selected from 1 to 100;
r is an integer selected from 2, 3, or 4;
each t independently is an integer selected from 0 to 5; and
u is an integer selected from 0, 1, or 2; and
wherein the monomer is directly covalently coupled to the chain extender compound, the crosslinker compound, or both the chain extender compound and the crosslinker compound.

Also disclosed herein are embodiments of a composition, comprising:
(i) a monomer having a structure according to Formula I Formula I wherein
each Ar group is an aromatic ring system;
each X independently is a linker group;
each Y independently comprises a heteroatom;
each of $R^1$, $R^2$, $R^3$, $R^4$, $R^5$, and $R^6$ independently is selected from hydrogen, aliphatic, heteroaliphatic, haloaliphatic, haloheteroaliphatic, aromatic, or an organic functional group;
n is an integer selected from 0 to 5;
and m is an integer selected from 0 to 50;
(ii) a chain extender compound having a structure according to Formula II HS-A-SH     Formula II wherein
A comprises an aliphatic group, a heteroaliphatic group, an aromatic group, or an organic functional group; and (iii) a crosslinker compound having a structure according to Formula III

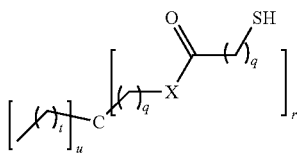

Formula III wherein
each X independently is O, S, or NR", wherein R" is hydrogen, aliphatic, or heteroaliphatic;
q is an integer selected from 1 to 100;
r is an integer selected from 2, 3, or 4;
t is an integer selected from 0 to 5; and
u is an integer selected from 0, 1, or 2.

Also disclosed herein are embodiments of a method, comprising: adding a composition embodiment as disclosed herein, or components thereof, into an additive manufacturing device; depositing the composition using the additive manufacturing device to provide a deposited composition; and polymerizing the deposited composition to provide a liquid crystalline network by exposing it to an energy source.

The foregoing and other objects and features of the present disclosure will become more apparent from the following detailed description, which proceeds with reference to the accompanying figures.

BRIEF DESCRIPTION OF THE DRAWINGS

FIGS. 38A and 38B are images showing molecular dynamics simulation showing the effect of chain extender BMAB on LC formation; wherein FIG. 38A shows a large-chain length LCN and FIG. 38B shows a small-chain length LCN.

DETAILED DESCRIPTION

I. Overview of Terms

Figure 1:
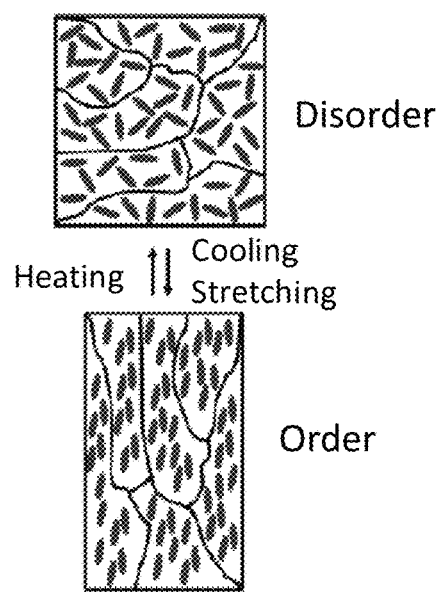
FIG. 1 is a schematic illustration showing macroscopic orientation that can occur in LCN embodiments of the present disclosure.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms are provided. Certain functional group terms include a symbol "-" which is used to show how the defined functional group attaches to, or within, structural compounds disclosed herein to which it is bound. Also, a dashed bond (i.e., "- - -") as used in certain formulas described herein indicates an optional bond (that is, a bond that may or may not be present). A person of ordinary skill in the art would recognize that the definitions provided below and the compound embodiments disclosed herein are not intended to include impermissible substitution patterns (e.g., methyl substituted with 5 different groups, and the like). Such impermissible substitution patterns are easily recognized by a person of ordinary skill in the art. In formulas, a hydrogen atom (or a deuterium atom or a tritium atom) is present and completes any formal valency requirements (but may not necessarily be illustrated) wherever a functional group or other atom is not illustrated. For example, a phenyl ring that is drawn as comprises a hydrogen

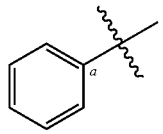 [SMILES: *c1ccccc1]

atom attached to each carbon atom of the phenyl ring other than the "a" carbon, even though such hydrogen atoms are not illustrated. Any functional group disclosed herein and/or defined above can be substituted or unsubstituted, unless otherwise indicated herein.

In any embodiments, any or all hydrogens present in the compound whether illustrated or not, or in a particular group or moiety within the compound, may be replaced by a deuterium or a tritium. Thus, for example, a recitation of "alkyl" includes deuterated alkyl, where from one to the maximum number of hydrogens present may be replaced by deuterium. For example, ethyl refers to both $C_2H_5$ or $C_2H_5$ where from 1 to 5 hydrogens are replaced by deuterium, such as in $C_2D_xH_{5-x}$.

Acyl Halide: —C(O)X, wherein X is a halogen, such as Br, F, I, or Cl.

Additive Manufacturing Device: A device that can build three-dimensional objects by adding layer-up-layer of a material (e.g., a composition according to the present disclosure). Representative additive manufacturing devices can include, but not necessarily limited to, devices used for 3D printing, rapid prototyping, direct digital manufacturing, layered manufacturing, additive fabrication, and the like.

Aldehyde: —C(O)H.

Aliphatic: A hydrocarbon group having at least one carbon atom to 50 carbon atoms ($C_{1-50}$), such as one to 25 carbon atoms ($C_{1-25}$), or one to ten carbon atoms ($C_{1-10}$), and which includes alkanes (or alkyl), alkenes (or alkenyl), alkynes (or alkynyl), including cyclic versions thereof, and further including straight- and branched-chain arrangements, and all stereo and position isomers as well. An aliphatic group is distinct from an aromatic group.

Alkenyl: An unsaturated monovalent hydrocarbon having at least two carbon atom to 50 carbon atoms ($C_{2-50}$), such as two to 25 carbon atoms ($C_{2-25}$), or two to ten carbon atoms ($C_{2-10}$), and at least one carbon-carbon double bond, wherein the unsaturated monovalent hydrocarbon can be derived from removing one hydrogen atom from one carbon atom of a parent alkene. An alkenyl group can be branched, straight-chain, cyclic (e.g., cycloalkenyl), cis, or trans (e.g., E or Z).

Alkoxy: —O-aliphatic, such as —O-alkyl, —O-alkenyl, —O-alkynyl; with exemplary embodiments including, but not limited to, methoxy, ethoxy, n-propoxy, isopropoxy, n-butoxy, t-butoxy, sec-butoxy, n-pentoxy (wherein any of the aliphatic components of such groups can comprise no double or triple bonds, or can comprise one or more double and/or triple bonds).

Alkyl: A saturated monovalent hydrocarbon having at least one carbon atom to 50 carbon atoms ($C_{1-50}$), such as one to 25 carbon atoms ($C_{1-25}$), or one to ten carbon atoms ($C_{1-10}$), wherein the saturated monovalent hydrocarbon can be derived from removing one hydrogen atom from one carbon atom of a parent compound (e.g., alkane). An alkyl group can be branched, straight-chain, or cyclic (e.g., cycloalkyl).

Alkynyl: An unsaturated monovalent hydrocarbon having at least two carbon atom to 50 carbon atoms ($C_{2-50}$), such as two to 25 carbon atoms ($C_{2-25}$), or two to ten carbon atoms ($C_{2-10}$), and at least one carbon-carbon triple bond, wherein the unsaturated monovalent hydrocarbon can be derived from removing one hydrogen atom from one carbon atom of a parent alkyne. An alkynyl group can be branched, straight-chain, or cyclic (e.g., cycloalkynyl).

Amide: —C(O)NR$^a$R$^b$ or —NR$^a$C(O)R$^b$ wherein each of R$^a$ and R$^b$ independently is selected from hydrogen, aliphatic, heteroaliphatic, haloaliphatic, haloheteroaliphatic, aromatic, or an organic functional group.

Amino: —NR$^a$R$^b$, wherein each of R$^a$ and R$^b$ independently is selected from hydrogen, aliphatic, heteroaliphatic, haloaliphatic, haloheteroaliphatic, aromatic, or an organic functional group.

Aromatic: A cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Hückel rule (4n+2). The point of attachment to the parent structure typically is through an aromatic portion of the condensed ring system. For example,

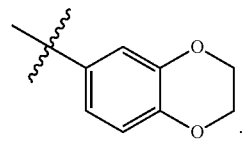 [SMILES: *c1ccc2c(c1)OCCO2]

However, in certain examples, context or express disclosure may indicate that the point of attachment is through a non-aromatic portion of the condensed ring system. For example,

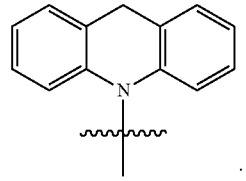 [SMILES: *N1c2ccccc2Cc2ccccc21]

An aromatic group or moiety may comprise only carbon atoms in the ring, such as in an aryl group or moiety, or it may comprise one or more ring carbon atoms and one or more ring heteroatoms comprising a lone pair of electrons (e.g. S, O, N, P, or Si), such as in a heteroaryl group or moiety. Aromatic groups may be substituted with one or more groups other than hydrogen, such as aliphatic, heteroaliphatic, haloaliphatic, haloheteroaliphatic, aromatic, or an organic functional group.

Aryl: An aromatic carbocyclic group comprising at least five carbon atoms to 15 carbon atoms ($C_5$-$C_{15}$), such as five to ten carbon atoms ($C_5$-$C_{10}$), having a single ring or multiple condensed rings, which condensed rings can or may not be aromatic provided that the point of attachment to a remaining position of the compound disclosed herein is through an atom of the aromatic carbocyclic group. Aryl groups may be substituted with one or more groups other than hydrogen, such as aliphatic, heteroaliphatic, haloaliphatic, haloheteroaliphatic, aromatic, or an organic functional group.

Aroxy: —O-aromatic.

Azide: —N$_3$—.

Azo: —N=NR$^a$ wherein R$^a$ is hydrogen, aliphatic, heteroaliphatic, haloaliphatic, haloheteroaliphatic, aromatic, or an organic functional group; or —N=N— when X of Formula I herein is an azo linker.

Biphenyl:

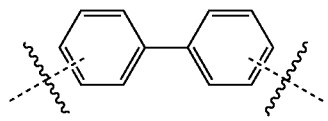

Bulk Physical Deformation: A deformation that is of such large macroscopic range as to be directly observable with the eye, and generally without the use of a microscope or other instrumentation. In particular embodiments, this term is not limited to mechanical motion that occurs only on a molecular scale, such as between molecular segments or microscopic grains, while the outer contours of the bulk material remain visibly static.

Carbamate: —OC(O)NR$^a$R$^b$, wherein each of R$^a$ and R$^b$ independently is selected from hydrogen, aliphatic, heteroaliphatic, haloaliphatic, haloheteroaliphatic, aromatic, or an organic functional group.

Carbonate: —OC(O)OR$^a$, wherein R$^a$ is selected from hydrogen, aliphatic, heteroaliphatic, haloaliphatic, haloheteroaliphatic, aromatic, or an organic functional group.

Carboxyl: —C(O)OH.

Carboxylate: —C(O)O$^-$ or salts thereof, wherein the negative charge of the carboxylate group may be balanced with an M$^+$ counterion, wherein M$^+$ may be an alkali ion, such as K$^+$, Na$^+$, Li$^+$; an ammonium ion, such as +N(R$^b$)$_4$ where R$^b$ is hydrogen, aliphatic, heteroaliphatic, haloaliphatic, haloheteroaliphatic, aromatic, or an organic functional group; or an alkaline earth ion, such as [Ca$^{2+}$]$_{0.5}$, [Mg$^{2+}$]$_{0.5}$, or [Ba$^{2+}$]$_{0.5}$.

Chain Extender Compound: A compound comprising at least two terminal thiol groups and that stabilizes the liquid crystalline phase of an LCN, particularly during curing.

Crosslinker Compound: A compound comprising at least two terminal thiol groups that are positioned on branches that extend from the same carbon atom. In particular embodiments, the crosslinker compound facilitates forming a network structure in an LCN to promote shape recovery of the LCN.

Cyano: —CN.

Degree of Liquid Crystallinity ($\Delta H_{lc}$): The enthalpy change involved in the LC phase transition.

Directly Covalently: This term refers to embodiments where two components (e.g., a monomer and a chain extender compound; a monomer and a crosslinker compound; and/or a chain extender compound and a crosslinker compound) are covalently coupled to one another without an intervening compound, such as a linker compound. Solely by way of example, LCN embodiments disclosed herein can comprise a monomer that is directly covalently attached to a chain extender compound because a carbon-sulfur bond is formed between a carbon atom of the monomer and a sulfur atom of the chain extender compound.

Disulfide: —SSR$^a$, wherein R$^a$ is selected from hydrogen, aliphatic, heteroaliphatic, haloaliphatic, haloheteroaliphatic, aromatic, or an organic functional group.

Dithiocarboxylic: —C(S)SR$^a$ wherein R$^a$ is selected from hydrogen, aliphatic, heteroaliphatic, haloaliphatic, haloheteroaliphatic, aromatic, or an organic functional group.

Energy Source: A device capable of producing energy sufficient to facilitate or promote thiol-ene chemistry between a monomer and a chain extender and/or a crosslinker compound. In some embodiments, the energy sufficient to facilitate or promote thiol-ene chemistry is electromagnetic radiation, particularly ultraviolet radiation. In some embodiments, the energy source is a UV lamp or other UV-emitting device capable of emitting UV radiation having a wavelength ranging from 10 nm to 400 nm. In an independent embodiment, an energy source, when used to facilitate or promote bulk physical deformation as described herein, can be an energy source capable of producing energy sufficient to facilitate or promote trans-cis-trans or trans-cis isomeric conversion of an azo group.

Ester: —C(O)OR$^a$ or —OC(O)R$^a$, wherein R$^a$ is selected from aliphatic, heteroaliphatic, haloaliphatic, haloheteroaliphatic, aromatic, or an organic functional group.

Ether: -aliphatic-O-aliphatic, -aliphatic-O-aromatic, -aromatic-O-aliphatic, or -aromatic-O-aromatic.

Glass Transition Temperature ($T_g$): A temperature at which a material transitions from a hard glassy state into a molten state.

Halo (or halide or halogen): Fluoro, chloro, bromo, or iodo. In some embodiments, this can include astatine.

Haloaliphatic: An aliphatic group wherein one or more hydrogen atoms, such as one to 10 hydrogen atoms, independently is replaced with a halogen atom, such as fluoro, bromo, chloro, or iodo.

Haloheteroaliphatic: A heteroaliphatic group wherein one or more hydrogen atoms, such as one to 10 hydrogen atoms, independently is replaced with a halogen atom, such as fluoro, bromo, chloro, or iodo.

Haloalkyl: An alkyl group wherein one or more hydrogen atoms, such as one to 10 hydrogen atoms, independently is replaced with a halogen atom, such as fluoro, bromo, chloro, or iodo. In an independent embodiment, haloalkyl can be a CX$_3$ group, wherein each X independently can be selected from fluoro, bromo, chloro, iodo (or in some embodiments, astatine).

Heteroaliphatic: An aliphatic group comprising at least one heteroatom to 20 heteroatoms, such as one to 15 heteroatoms, or one to 5 heteroatoms, which can be selected from, but not limited to oxygen, nitrogen, sulfur, silicon, boron, selenium, phosphorous, and oxidized forms thereof within the group. Alkoxy, ether, amino, disulfide, peroxy, and thioether groups are exemplary (but non-limiting) examples of heteroaliphatic.

Heteroaliphatic-aryl: An aryl group that is or can be coupled to a compound disclosed herein, wherein the aryl group is or becomes coupled through a heteroaliphatic group.

Heteroaryl: An aryl group comprising at least one heteroatom to six heteroatoms, such as one to four heteroatoms, which can be selected from, but not limited to oxygen, nitrogen, sulfur, silicon, boron, selenium, phosphorous, and oxidized forms thereof within the ring. Such heteroaryl groups can have a single ring or multiple condensed rings, wherein the condensed rings may or may not be aromatic and/or contain a heteroatom, provided that the point of attachment is through an atom of the aromatic heteroaryl group. However, in certain examples, context or express disclosure may indicate that the point of attachment is through a non-aromatic portion of the condensed ring system. Heteroaryl groups may be substituted with one or more groups other than hydrogen, such as aliphatic, heteroaliphatic, haloaliphatic, haloheteroaliphatic, aromatic, or an organic functional group.

Heteroatom: An atom other than carbon or hydrogen, such as (but not limited to) oxygen, nitrogen, sulfur, silicon, boron, selenium, or phosphorous. In particular disclosed embodiments, such as when valency constraints do not permit, a heteroatom does not include a halogen atom.

Hydroxyl: —OH.

Initiator Compound: A compound that promotes or facilitates thiol-ene chemistry between a monomer and a chain extender compound and/or a crosslinker compound, but that does not become part of the structure formed between the monomer and the chain extender and/or the crosslinker compound.

Imine: —C(NR$^a$)R$^b$, wherein each of R$^a$ and R$^b$ independently is selected from hydrogen, aliphatic, heteroaliphatic, haloaliphatic, haloheteroaliphatic, aromatic, or an organic functional group.

Ketone: —C(O)R$^a$, wherein R$^a$ is selected from aliphatic, heteroaliphatic, haloaliphatic, haloheteroaliphatic, aromatic, or an organic functional group.

Linker Group: An organic group or molecule that is used to covalently couple two or more compounds together. In some embodiments, a linker group covalently couples a first "Ar" group to a second "Ar" group, as defined by Formula I, herein.

Liquid Crystal Phase Transition ($T_{lc}$): The temperature at which liquid crystals transform from one phase to another with a change of molecular order. In some embodiments, this reversible phase transition determines the shape-programming and shape-recovering temperature of a LCE.

Liquid Crystalline: A state of matter having properties between those of a liquid and those of a solid crystal. Molecules of a liquid crystalline material can be ordered in a semi-crystalline or crystalline manner. In some embodiments, a liquid crystalline material can comprise a thermotropic phase, such as a nematic phase, a smectic phase, a chiral phase, a discotic phase, or a combination thereof.

Liquid Crystalline Network: A network structure formed by thiol-ene chemistry between a monomer and a chain extender compound and a crosslinker compound as disclosed herein.

Mesogen: A compound that exhibits liquid crystal properties.

Naphthyl:

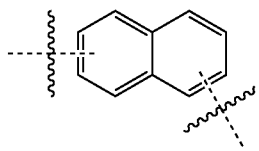

Nitro: —NO$_2$.

Organic Functional Group: A functional group that may be provided by any combination of aliphatic, heteroaliphatic, aromatic, haloaliphatic, and/or haloheteroaliphatic groups, or that may be selected from, but not limited to, aldehyde; aroxy; acyl halide; halogen; nitro; cyano; azide; carboxyl (or carboxylate); amide; ketone; carbonate; imine; azo; carbamate; hydroxyl; thiol; sulfonyl (or sulfonate); oxime; ester; thiocyanate; thioketone; thiocarboxylic acid; thioester; sulfonamide; dithiocarboxylic acid or ester; phosphonate; phosphate; silyl ether; sulfinyl; thial; or combinations thereof.

Oxime: —CR$^a$=NOH, wherein R$^a$ is hydrogen, aliphatic, heteroaliphatic, haloaliphatic, haloheteroaliphatic, aromatic, or an organic functional group.

Peroxy: —O—OR$^a$ wherein R$^a$ is hydrogen, aliphatic, heteroaliphatic, haloaliphatic, haloheteroaliphatic, aromatic, or an organic functional group.

Phosphate: —O—P(O)(OR$^a$)$_2$, wherein each R$^a$ independently is hydrogen, aliphatic, heteroaliphatic, haloaliphatic, haloheteroaliphatic, aromatic, or an organic functional group; or wherein one or more R$^a$ groups are not present and the phosphate group therefore has at least one negative charge, which can be balanced by a counterion, M$^+$, wherein each M$^+$ independently can be an alkali ion, such as K$^+$, Na$^+$, Li$^+$; an ammonium ion, such as $^+$N(R$^b$)$_4$ where R$^b$ is H, hydrogen, aliphatic, heteroaliphatic, haloaliphatic, haloheteroaliphatic, aromatic, or an organic functional group; or an alkaline earth ion, such as [Ca$^{2+}$]$_{0.5}$, [Mg$^{2+}$]$_{0.5}$, or [Ba$^{2+}$]$_{0.5}$.

Phosphonate: —P(O)(OR$^a$)$_2$, wherein each R$^a$ independently is hydrogen, aliphatic, heteroaliphatic, haloaliphatic, haloheteroaliphatic, aromatic, or an organic functional group; or wherein one or more R$^a$ groups are not present and the phosphate group therefore has at least one negative charge, which can be balanced by a counterion, M$^+$, wherein each M$^+$ independently can be an alkali ion, such as K$^+$, Na$^+$, Li$^+$; an ammonium ion, such as $^+$N(R$^b$)$_4$ where R$^b$ is hydrogen, aliphatic, heteroaliphatic, haloaliphatic, haloheteroaliphatic, aromatic, or an organic functional group; or an alkaline earth ion, such as [Ca$^{2+}$]$_{0.5}$, [Mg$^{2+}$]$_{0.5}$, or [Ba$^{2+}$]$_{0.5}$.

Silyl Ether: —OSiR$^a$R$^b$, wherein each of R$^a$ and R$^b$ independently is selected from hydrogen, aliphatic, heteroaliphatic, haloaliphatic, haloheteroaliphatic, aromatic, or an organic functional group.

Sulfinyl: —S(O)R$^a$, wherein R$^a$ is selected from hydrogen, aliphatic, heteroaliphatic, haloaliphatic, haloheteroaliphatic, aromatic, or an organic functional group.

Sulfonyl: —SO$_2$R$^a$, wherein R$^a$ is selected from hydrogen, aliphatic, heteroaliphatic, haloaliphatic, haloheteroaliphatic, aromatic, or an organic functional group.

Sulfonamide: —SO$_2$NR$^a$R$^b$ or —N(R$^a$)SO$_2$R$^b$, wherein each of R$^a$ and R$^b$ independently is selected from hydrogen, aliphatic, heteroaliphatic, haloaliphatic, haloheteroaliphatic, aromatic, or an organic functional group.

Sulfonate: —SO$_3^-$, wherein the negative charge of the sulfonate group may be balanced with an M$^+$ counter ion, wherein M$^+$ may be an alkali ion, such as K$^+$, Na$^+$, Li$^+$; an ammonium ion, such as +N(R$^b$)$_4$ where R$^b$ is hydrogen, aliphatic, heteroaliphatic, haloaliphatic, haloheteroaliphatic, aromatic, or an organic functional group; or an alkaline earth ion, such as [Ca$^{2+}$]$_{0.5}$, [Mg$^{2+}$]$_{0.5}$, or [Ba$^{2+}$]$_{0.5}$.

Thial: —C(S)H.

Thiol: —SH.

Thiocarboxylic acid: —C(O)SH, or —C(S)OH.

Thiocyanate: —S—CN or —N=C=S.

Thioester: —C(O)SR$^a$ or —C(S)OR$^a$ wherein R$^a$ is selected from hydrogen, aliphatic, heteroaliphatic, haloaliphatic, haloheteroaliphatic, aromatic, or an organic functional group.

Thioether: —S-aliphatic or —S-aromatic, such as —S-alkyl, —S-alkenyl, —S-alkynyl, —S-aryl, or —S— heteroaryl; or -aliphatic-S-aliphatic, -aliphatic-S-aromatic, -aromatic-S-aliphatic, or -aromatic-S-aromatic.

Thioketone: —C(S)R$^a$ wherein R$^a$ is selected from hydrogen, aliphatic, heteroaliphatic, haloaliphatic, haloheteroaliphatic, aromatic, or an organic functional group.

Thiol-Ene Chemistry: An organic reaction between a thiol functional group of a compound and an alkene functional group of a compound that results in forming a bond between the sulfur atom of the thiol group and a carbon atom of the alkene functional group. In particular embodiments, thiol-ene chemistry is used herein to form a covalent bond between a monomer compound and a chain extender and/or a crosslinker compound. In particular embodiments, the thiol functional group is attached to the crosslinker compound or the chain extender compound and the alkene functional group is attached to the monomer. In some embodiments, thiol-ene chemistry can involve forming a thioether bond between a monomer and a crosslinker compound (via one alkene of the monomer and a thiol of the crosslinker compound) and a chain extender compound (via the second alkene of the monomer and a thiol of the chain extender compound).

Thiophenyl: A five-membered aromatic ring comprising a sulfur atom and having a structure

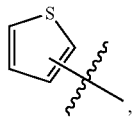

wherein the five-membered aromatic ring can be substituted with one or more substituents.

II. Introduction

Shape memory polymers are a unique class of active materials that exhibit reversible shape changing capabilities under a variety of external stimuli, such as heat, light, solvent exposure, electric fields, and magnetic fields. This shape changing capability makes them favorable for a wide range of emerging applications, including actuators, sensors, bio-medical devices, and microrobots. Out of the varieties of shape memory polymers, liquid crystalline networks (LCNs) fall in a special category due to the unique coupling between rigid liquid crystalline (LC) domains that helps in self-organization and soft crosslinked network that behaves as polymeric elastomers. In the shape programming process, the macroscopic orientation of the LC domains and the soft polymer network allow for a large dimensional change of LCNs caused by applied external forces. In the shape recovering process, on the other hand, the reversible phase transition of the LC domains and the crosslinked network provide the entropic force for LCNs to return to the original shape. Moreover, LCNs can potentially be used as phase change materials for thermal storage applications due to their temperature dependent reversible phase change properties. The unique combination of soft elasticity and phase behavior also allows for the design of elastocaloric materials for solid state cooling devices. LCNs based on thermally cured systems have been reported, including polysiloxanes and epoxies, and many of these materials showed impressive thermomechanical and shape memory properties; however, the curing process of these LCNs typically requires high temperatures and long curing times, consuming significant energy. Alternatively, LCNs based on photo-initiated polymerization of acrylates have been developed, which not only enabled photo-curing but also allowed for the design of LCNs with complex LC orientation. While progress has been made to achieve outstanding shape memory properties of LCNs, the highly heterogeneous network structures formed with acrylates usually cause broad thermal transitions, limiting shape memory efficiency of these materials.

Conventional LCNs made using thiol-ene chemistry utilize thiol-acrylate reactions, wherein a di-functional acrylate-terminated liquid crystalline monomer is used in combination with Michael additions to promote forming the LCN; however, these LCNs suffer from significant polymerization shrinkage and exhibit highly heterogeneous network structures because of the chain-growth process. These drawbacks limit the performance of the shape memory behavior of such LCNs. And, oxygen inhibition of free radical polymerization is an long-standing problem for curing such materials, which leads to additional difficulties in making the LCNs and objects formed therefrom, particularly additive manufacturing techniques.

Disclosed herein are embodiments of a LCN comprising a monomer, chain extender compound, and a crosslinker compound. Also disclosed are composition embodiments used to make the LCN embodiments, as well as methods of making and using the LCN embodiments. The monomer, chain extender, and crosslinker components of the LCN are covalently bound together (in permissible permutations) using thiol-ene chemistry between thiol groups and terminal alkene moieties. In particular embodiments, the terminal alkene moieties are not part of an acrylate system. This type of chemistry is highly efficient, insensitive to oxygen inhibition, and is amenable to versatile curing processes (e.g., photochemically or thermally). Also, because high curing rates can be used with this type of chemistry, the disclosed LCN compositions can be used in additive manufacturing techniques, which use fast reaction kinetics to print layers that exhibit suitable mechanical strength to support subsequent printed layers formed during the process. The ability to combine step-growth and chain-growth polymerization processes also facilitate forming a uniform network structure, resulting in low polymerization shrinkage stress. In particular embodiments, fast curing speeds can be used to provide high conversions of LCNs having a uniform network structure. And, LCNs with different crosslink density and liquid crystallinity can be prepared, thereby providing the ability to produce materials that exhibit tailored thermomechanical and shape memory properties.

III. Liquid Crystalline Network, Composition, and Component Embodiments

Disclosed herein are embodiments of an LCN and corresponding composition embodiments that are used to form the LCN. In particular embodiments, the LCN comprises a monomer, a chain extender compound, and a crosslinker compound. In particular embodiments, the monomer is directly covalently coupled to the chain extender compound, the crosslinker compound, or both the chain extender compound and the crosslinker compound. In yet some additional embodiments, the LCN has a homogenous network structure. In such embodiments, there is minimal to no homopolymerization of the monomer and thus the LCN is free of, or at least substantially free of, any homopolymerized monomer species. In particular embodiments, the LCN exhibits a degree of homopolymerization that is less than that obtained using an acrylate-based monomer. In yet additional embodiments, the LCN exhibits minimal to no polymerization shrinkage. In particular embodiments, more functional groups of the monomer, chain extender, and/or crosslinker compound undergo reactions (e.g., couplings amongst such groups) and less stress is built into the LCN, which facilitates reduced polymerization shrinkage as compared to LCNs made with acrylate-based monomers. In some embodiments, the LCN exhibits high tolerance to oxygen inhibition.

The monomer can have a structure according to Formula I.

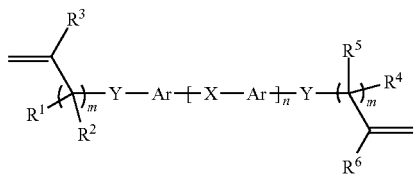

Formula I

With reference to Formula I, each Ar group is an aromatic ring system, such as an aryl group or a heteroaryl group; each X independently is a linker group; each Y independently comprises a heteroatom; each of $R^1$, $R^2$, $R^3$, $R^4$, $R^5$, and $R^6$ independently can be selected from hydrogen (or deuterium or tritium), aliphatic, heteroaliphatic, haloaliphatic, haloheteroaliphatic, aromatic, or an organic functional group; n is an integer selected from 0 to 5, such as 0 to 3 or 0 to 2, or 0, 1, 2, 3, 4, or 5; and m is an integer selected from 0 to 50, such as 0 to 25 or 0 to 10, or 0 to 5. In particular embodiments, each of $R^1$, $R^2$, $R^3$, $R^4$, $R^5$, and $R^6$ independently is hydrogen, alkyl, heteroalkyl, aryl, or heteroaryl. In some additional embodiments, each $R^1$, $R^2$, $R^3$, $R^4$, $R^5$, and $R^6$ independently is hydrogen or lower alkyl, such as methyl, ethyl, butyl, propyl, pentyl, hexyl, heptyl, octyl, nonyl, or decyl. In particular embodiments, each Ar is an aryl group, such as phenyl, biphenyl (or triphenyl or other number of linearly coupled phenyl groups attached via para, meta, and/or ortho bonds), naphthyl, anthracenyl, or the like; or a heteroaryl group, such as pyridinyl, pyrimidinyl, quinoline, or the like. In some embodiments, the Ar group(s) independently can be substituted with an aliphatic, heteroaliphatic, haloaliphatic, haloheteroaliphatic, aromatic, or organic functional group; or the Ar group(s) independently can be unsubstituted. In particular embodiments, each X independently is a linker selected from aliphatic, carbonyl, ester, amide, carbonate, azo, thioester, or comprises a heteroatom (e.g., O, S, or a NH group). In representative embodiments, each X independently is selected from —OC(=O)—, —N=N—, or —C(R')=C(R')—, or —C(R')$_2$—C(R')$_2$—, wherein each R' independently is hydrogen, aliphatic, heteroaliphatic, haloaliphatic, haloheteroaliphatic, aromatic, or an organic functional group. In particular embodiments, each Y independently is O, NH, or S. In representative embodiments, each Y is O. In particular embodiments, n is 0, in which case the Ar group of Formula I is bound directly to the Y group; or, n is 1 or 2. In particular embodiments, each m independently is an integer selected from 1 to 10, such as 1, 2, 3, 4, 5, 6, 7, 8, 9, or 10.

In some embodiments, the monomer can have a structure according to any one of Formulas IA-IF.

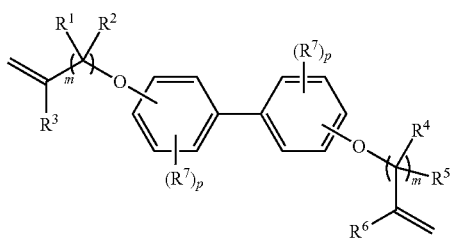

Formula IA

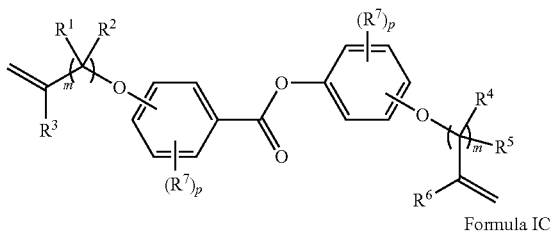

Formula IB

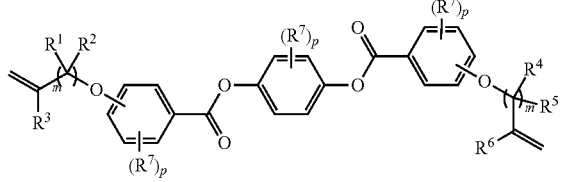

Formula IC

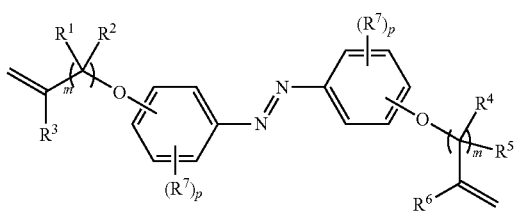

Formula ID

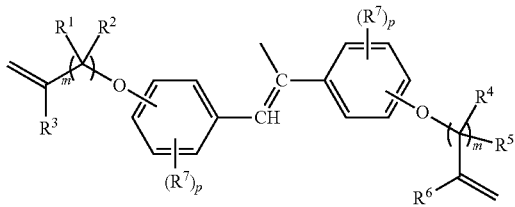

Formula IE

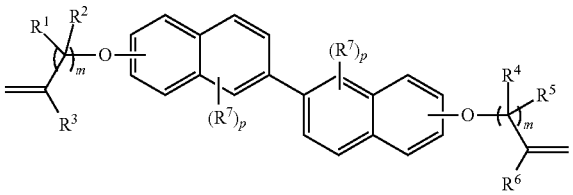

Formula IF

With reference to Formulas IA-IF, each of $R^1$, $R^2$, $R^3$, $R^4$, $R^5$, and $R^6$ and n can be as recited above for Formula I; each $R^7$ independently can be selected from aliphatic, aromatic, or an organic functional group; and each p independently can be an integer selected from 0 to 4, such as 0, 1, 2, 3, or 4. In particular embodiments, each $R^7$ independently is selected from alkyl (e.g., lower alkyl, such as methyl, ethyl, butyl, propyl, pentyl, hexyl, heptyl, octyl, nonyl, or decyl).

In some embodiments, the monomer can have a structure according to any one of Formulas IA'-IF' or IA"-IF".

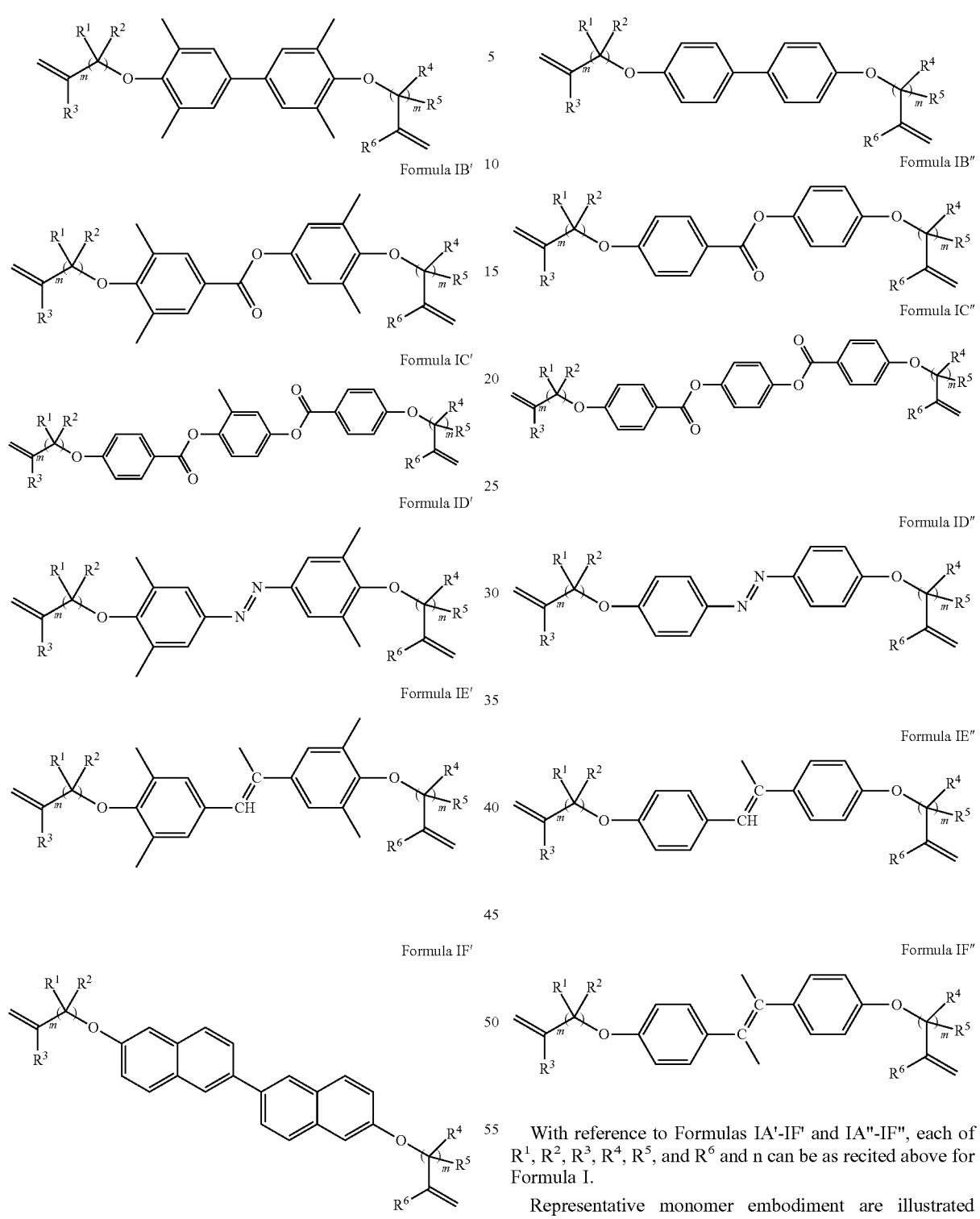
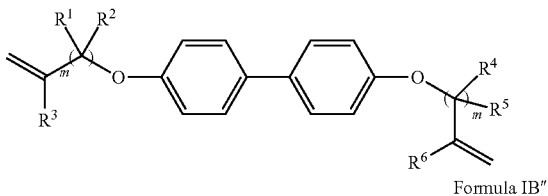
With reference to Formulas IA'-IF' and IA"-IF", each of $R^1$, $R^2$, $R^3$, $R^4$, $R^5$, and $R^6$ and n can be as recited above for Formula I.
Representative monomer embodiment are illustrated below.
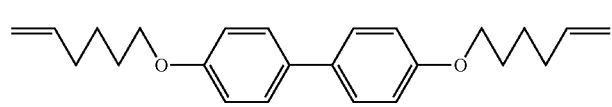

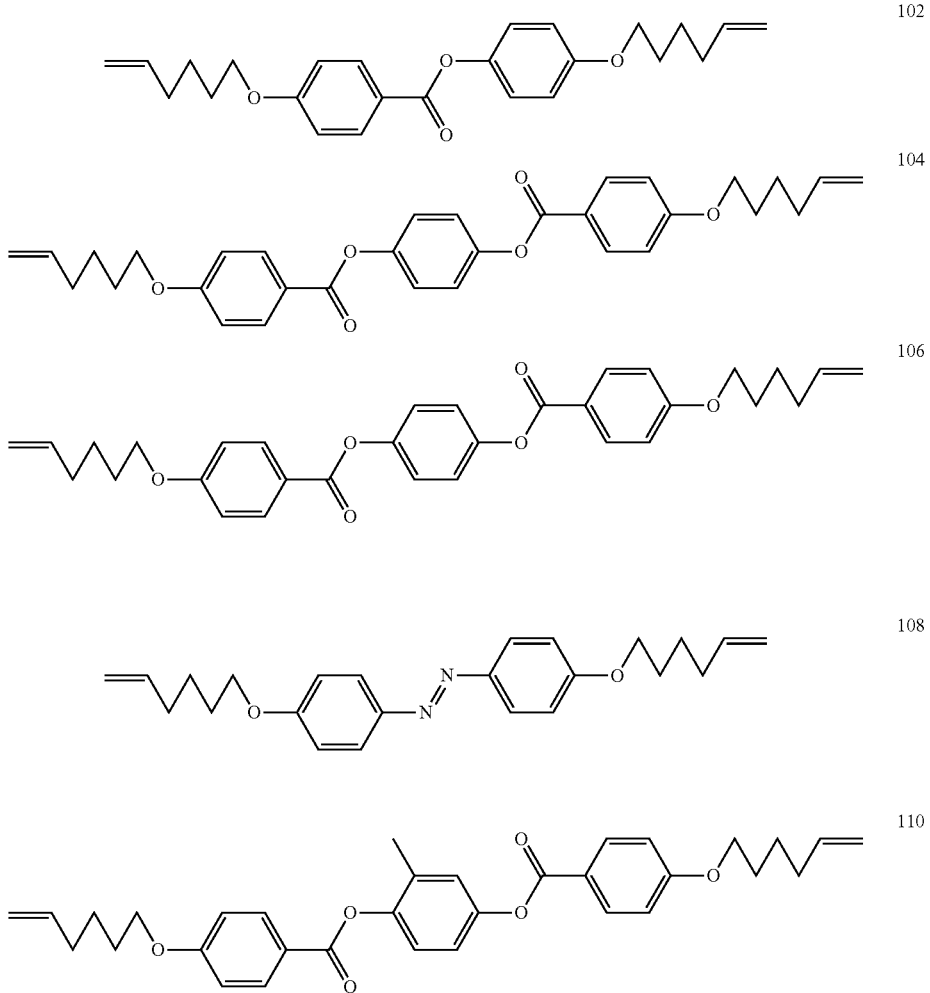

Monomer embodiments disclosed herein can be made by combining a difunctionalized starting material with a halogenated alkene compound, a solvent system, and a base. In particular embodiments, the difunctionalized starting material can have a structure according to Formula A, wherein each Y, X, and Ar group, and each n, is as recited above for Formula I. In particular embodiments, the halogenated alkene compound can have a structure according to Formula B, wherein each of $R^1$, $R^2$, and $R^3$ can be as recited for Formula I and wherein Z is a halogen, such as Br, I, Fl, or Cl. In particular embodiments, Y of Formula A is O and Z of Formula B is Br and the method of making the monomer comprises an Williamson ether synthesis, wherein the bifunctionalized starting material and the halogenated alkene compound are combined with a crown ether/acetone solution (e.g., 18-crown-6) and $K_2CO_3$. In some embodiments, the phase behavior of a resulting monomer can be tuned by selecting particular difunctionalized starting materials. For example, in some embodiments, the difunctionalized starting material can be selected to comprise a structure that results in a monomer having one or more crystalline phases, one or more nematic LC phases, or a combination of a nematic LC phase and a crystalline phase. In yet some additional embodiments, the thermal behavior of the resulting monomer can be tuned by modifying the length of the halogenated alkene compound (e.g., modifying "m" in Formula B).

$$HY-Ar-\!\!+\!\!X-Ar-\!\!\!+_{\!\!n}\!YH \quad \text{Formula A}$$

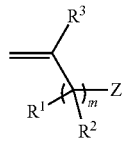

Formula B

The chain extender compound can be a di-thiol compound. In some embodiments, the chain extender compound has a structure according to Formula II. The chain extender compound can be used to promote development of the liquid crystalline phase of the LCN. In particular embodiments, the chain extender can be selected to impart flexibility in the structure and/or properties of the LCN. Solely by way of example, the chain extender can promote forming an ordered smectic LC phase as opposed to agglomerated structures.

$$HS-A-SH \quad \text{Formula II}$$

With reference to Formula II, A comprises an aliphatic group, a heteroaliphatic group, an aromatic group, or an organic functional group. In particular embodiments, A is alkyl (e.g., $-(CR'_2)_q$, wherein each R' independently is hydrogen or aliphatic); ether (e.g., —CH$_2$CH$_2$(OCH$_2$CH$_2$)$_q$—), ester (e.g., —(CH$_2$)$_q$C(O)O(CH$_2$)$_q$OC(O)(CH$_2$)$_q$— or the like), amide (e.g., —(CH$_2$)$_q$C(O)N(H)(CH$_2$)$_q$N(H)C(O)(CH$_2$)$_q$—, or the like), or an organic functional group comprising a combination of ester, aromatic, and aliphatic groups (e.g., —(CH$_2$)$_q$O-Ph-C(O)O-Ph-OC(O)-Ph-O(CH$_2$)$_q$— or the like); wherein each q independently is an integer selected from 1 to 100, such as 1 to 50, or 1 to 25, or 1 to 10, or 1 to 6. In particular embodiments, q is an integer selected from 1 to 10, such as 1, 2, 3, 4, 5, 6, 7, 8, 9, or 10. Representative chain extender compounds are illustrated below.

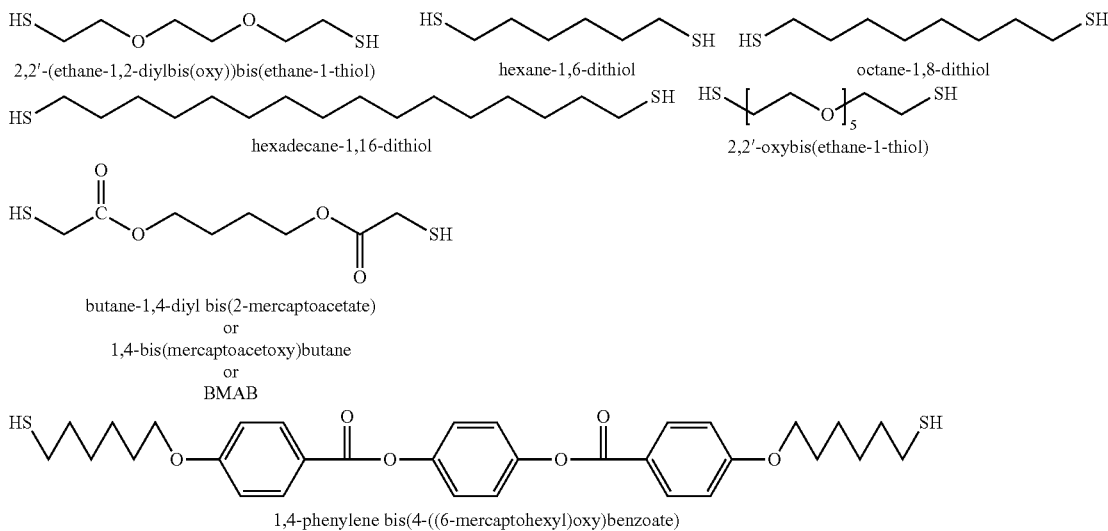

Chain extenders can be purchased from commercial sources or can be synthesized using methods recognizable to those of ordinary skill in the art of organic chemistry with the benefit of the present disclosure. For example, the benzoate-containing chain extender compound illustrated above can be made using the method illustrated below in Scheme 1.

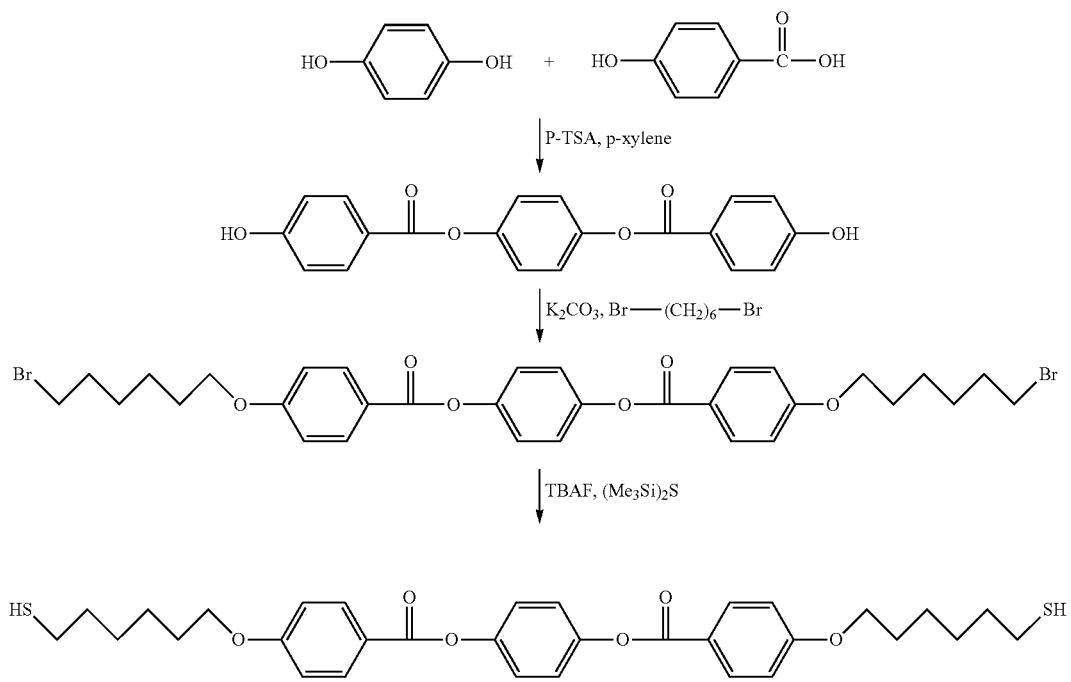

The crosslinker compound can have a structure according to Formula III. The crosslinker compound can be used to promote forming a network of the monomer and chain extender components so as to form the LCN. Different crosslinker compounds can be used to impart flexibility in the structure and/or properties of the LCN.

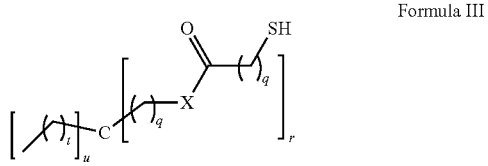

Formula III

With reference to Formula III, each X independently is O, S, or NR" (wherein R" is hydrogen, aliphatic, or heteroaliphatic); r is an integer selected from 2, 3, or 4; and u is an integer selected from 0, 1, or 2. In such embodiments, the "C" carbon atom illustrated in Formula III has a valency that is completed due to the fact that there are a sufficient number of "r" and/or "u" numbered groups attached thereto. In some embodiments, r is 4 and thus u is 0. In some embodiments, r is 3 and thus u is 1. In some embodiments, both u and r are 2. In Formula III, each q independently is an integer as recited above for Formula II (e.g., an integer selected from 1 to 100, such as 1 to 50, or 1 to 25, or 1 to 10, or 1 to 6). In some embodiments, each q independently is 1, 2, 3, 4, 5, or 6. In Formula III, each t independently is an integer selected from 0 to 5, such as 0, 1, 2, 3, 4, or 5. In particular embodiments, each X is O; each q independently is 1 or 2; r is 3 or 4; u is 0 or 1; and t is 1. Representative crosslinker compounds are illustrated below.

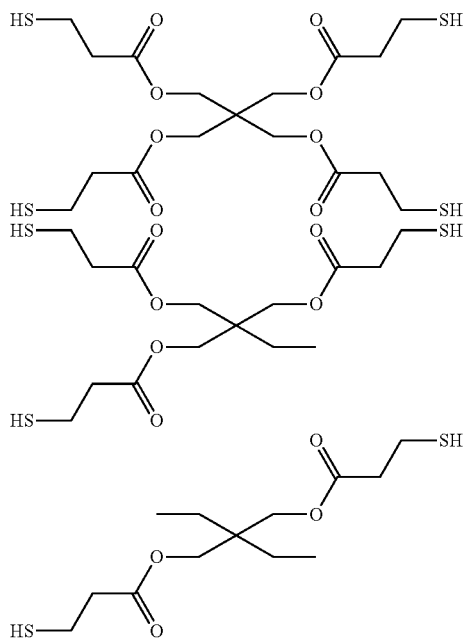

Crosslinker compounds can be purchased from commercial sources or can be synthesized using methods recognizable to those of ordinary skill in the art of organic chemistry with the benefit of the present disclosure.

Also disclosed herein are embodiments of making the LCN embodiments disclosed herein. In some embodiments, the method comprises combining a monomer, a chain extender compound, and a crosslinker compound to provide a polymerizable composition; and then thermally treating the polymerizable composition to induce polymerization of the components by forming covalent bonds between the monomer and the chain extender compound and the crosslinker compound. In yet additional embodiments, the method comprises combining a monomer, a chain extender compound, a crosslinker compound, and an initiator compound to provide a polymerizable composition; and exposing the polymerizable composition to an energy source to induce polymerization of the components by forming covalent bonds between the monomer and the chain extender compound and the crosslinker compound. In some embodiments, the energy source is an energy source that provides ultra-violet (UV) light. In particular embodiments, the energy source provides a UV intensity ranging from 2 mW/cm$^2$ to 40 mW/cm$^2$, such as 2.2 mW/cm$^2$ to 39 mW/cm$^2$. In some embodiments, the UV intensity is 2.2 mW/cm$^2$, 5.6 mW/cm$^2$, 11 mW/cm$^2$, 21.4 mW/cm$^2$, or 39 mW/cm$^2$. In particular embodiments, a higher level of UV intensity can promote faster reaction rates, which limits the amount of time for the rigid components of the LCN to self-assemble into an LC phase, which can thereby reduce liquid crystallinity. Objects comprising an LCN embodiment having reduced liquid crystallinity can thus exhibit more flexibility, thereby promoting the ability to reshape the object using reduced energy requirements.

In particular embodiments, the LCN can comprise a plurality of monomers, a plurality of chain extender compounds, and a plurality of crosslinker compounds. In such embodiments, the plurality of monomers can comprise monomer molecules that are the same or different from one another; the plurality of chain extender compounds can comprise chain extender molecules that are the same or different from one another; and the plurality of crosslinker compounds can comprise crosslinker molecules that are the same or different from one another. In exemplary embodiments, the LCN comprises a plurality of monomers that are the same as one another; a plurality of chain extender compounds that are the same as one another; and a plurality of crosslinker compounds that are the same as one another. In particular embodiments, the monomer forms covalent bonds with the crosslinker compound, the chain extender compound, or both the crosslinker compound and the chain extender compound via thiol-ene chemistry. In particular embodiments, at least one monomer is directly covalently attached to a crosslinker compound and a chain extender compound. In some such embodiments, a covalent bond is formed between a carbon atom of a first terminal alkene of the monomer and a thiol group of the chain extender compound and a carbon atom of a second terminal alkene of the monomer and a thiol group of the crosslinker compound. Multiple thiol-ene chemistry reactions can take place to propagate the formation of additional covalent bonds between other monomer molecules, chain extender molecules, and/or crosslinker molecules. In some embodiments, each thiol group of the crosslinker compound can be covalently bound to a carbon atom of the terminal alkene of different monomers such that one crosslinker compound is covalently coupled to a plurality of monomers.

In some embodiments, the thiol-ene chemistry is photo-initiated. In some such embodiments, the thiol-ene chemistry comprises exposing the monomer, the chain extender, and/or the crosslinker compound to an initiator. In some such embodiments, the initiator can be selected from radical initiators known to those of ordinary skill in the art with the benefit of the present disclosure. Exemplary initiators can include, but are not limited to, 2,2-dimethoxy-2-phenylacetophenone, (2-hydroxyethoxy)-2-methylpropiophenone, and other photoinitiator compounds recognized by those of ordinary skill in the art with the benefit of the present disclosure. The amount of initiator that can be used can range from greater than 0 wt % to 2 wt % of the composition (comprising the monomer, the chain extender compound, and the crosslinker compound), such as 0.1 wt % to 1 wt %, or 0.1 wt % to 0.75 wt %, or 0.1 wt % to 0.5 wt % of the composition. In particular embodiments, 0 wt %, 0.5 wt %, 1 wt %, or 2 wt % of the initiator can be used.

Figure 2:
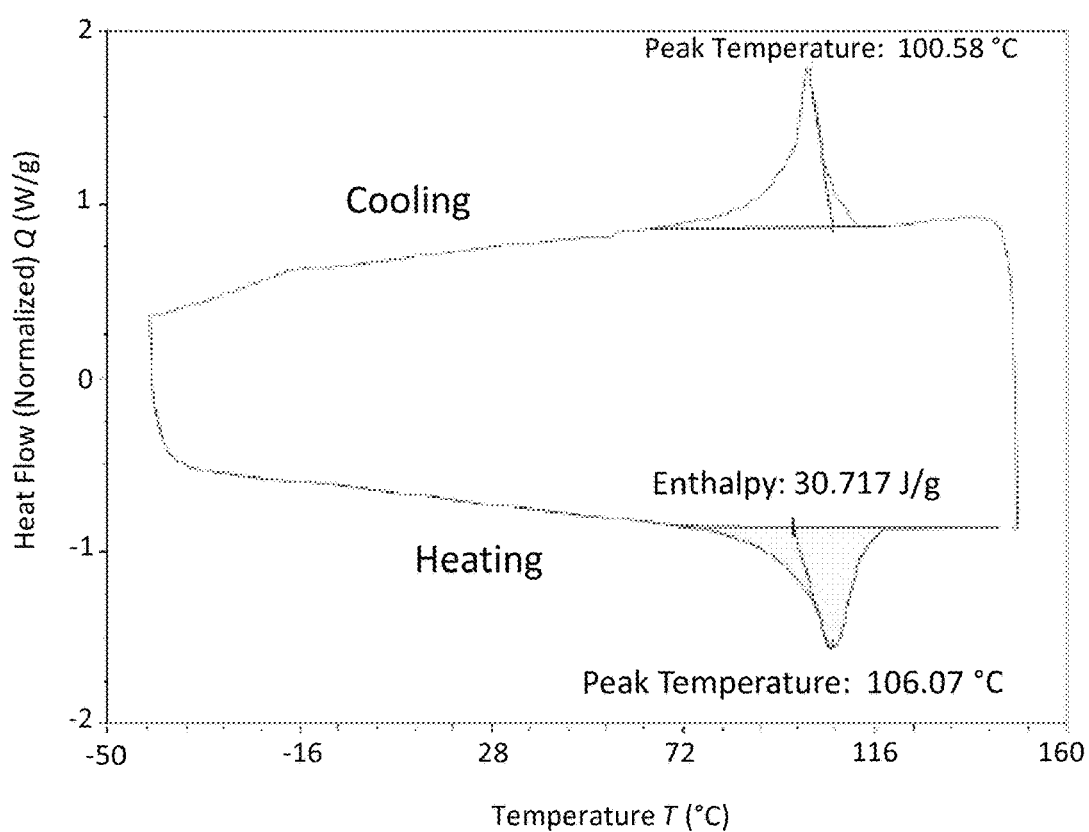
FIG. 2 is a differential scanning calorimetry ("DSC") thermogram showing reversible LC phase transitions of an LCN embodiment formed using monomer 100, pentaerythritol tetrakis (3-mercaptopropionate) ("PETMP"), and 2,2'-(ethane-1,2-diylbis(oxy))bis(ethane-1-thiol).
Figure 3:
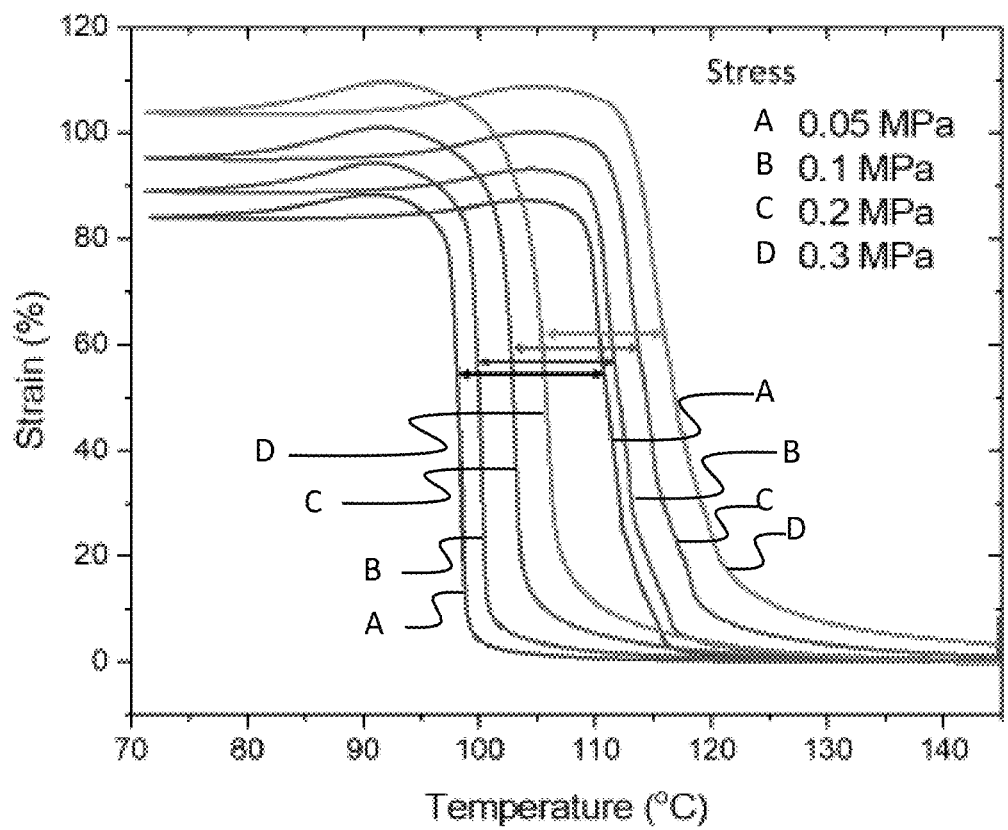
FIG. 3 is a graph of strain (%) as a function of temperature (° C.), which shows results from cyclic thermomechanical tensile tests performed at different stress levels with an LCN embodiment, made using monomer 100, pentaerythritol tetrakis (3-mercaptopropionate) ("PETMP"), and 2,2'-(ethane-1,2-diylbis(oxy))bis(ethane-1-thiol).

LCN embodiments disclosed herein exhibit reversible shape changing behavior. Without being limited to a particular theory, it currently is believed that this behavior is facilitated by macroscopic orientations and reversible phase transitions of the LC domains of the LCN. A schematic illustration of the macroscopic orientation of certain LCN embodiments disclosed herein is provided by FIG. 1. The reversible phase change behavior of an exemplary LCN embodiment is illustrated by FIG. 2. In some embodiments, an elastocaloric effect can be observed in the reversible shape changing process, which facilitates use of LCN embodiments in solid state refrigeration applications. For example, the reversible shape change of an embodiment of an LCN according to the present disclosure was characterized using cyclic thermomechanical tensile tests, with results shown in FIG. 3. As can be seen in FIG. 3, a shift of the LC phase transition temperature was observed when different stress levels were used, indicating the elastocaloric effect. In yet additional embodiments, the components of the LCN (e.g., monomer, chain extenders, and/or crosslinkers) can be selected to provide LCNs that exhibit latent heat values from phase transitions that exceed maximum values obtainable using shape memory alloys.

Also disclosed herein are embodiments of a composition comprising the monomer, the chain extender compound, and the crosslinker compound. In some embodiments, the composition can further comprise an initiator compound. In some embodiments, the composition is a printable composition capable of being printed using an additive manufacturing device. In some embodiments, the composition can be in the form of a molten liquid or in the form of a solid (e.g., pellets). In particular embodiments, the composition is capable of being printed using a 3D printing device, such as an extrusion-based 3D printing device, a vat-based 3D printing device, or other such devices. In some embodiments, the composition comprises a particular ratio of monomer, chain extender compound, and/or crosslinker compound. In some embodiments, an equivalent number of thiol groups (of the chain extender compound and/or the crosslinker compound) and alkene groups (of the monomer) are provided in the composition. In some embodiments, the ratio of monomer to chain extender compound ranges from 1:1 to 2:1, such as 1.2:1 to 1.8:1, or 1.4:1 to 1.6:1. In some embodiments, the ratio of monomer to crosslinker compound ranges from 8:1 to 2:1, such as 7:1 to 3:1, or 6:1 to 4:1. In particular composition embodiments, the monomer, the chain extender compound, and the crosslinker compound are present in a ratio ranging from 3:1:1 (monomer:chain extender compound:crosslinker compound) to 8:6:1 (monomer:chain extender compound:crosslinker compound). In representative embodiments, the monomer, the chain extender compound, and the crosslinker compound are present in a ratio of 3:1:1 (monomer:chain extender compound:crosslinker compound), or 4:2:1 (monomer:chain extender compound:crosslinker compound), or 6:4:1 (monomer:chain extender compound:crosslinker compound), or 8:6:1 (monomer:chain extender compound:crosslinker compound). In particular embodiments, the amount of the chain extender compound can be increased or decreased to modify the thermomechanical properties of the LCN. For example, increasing the amount of the chain extender compound can increase ordering of the LC phase of the LCN, whereas decreasing the amount of the chain extender compound can cause more crosslinking, which leads to a decrease in ordering of the LC phases of the LCN.

Figure 4A:
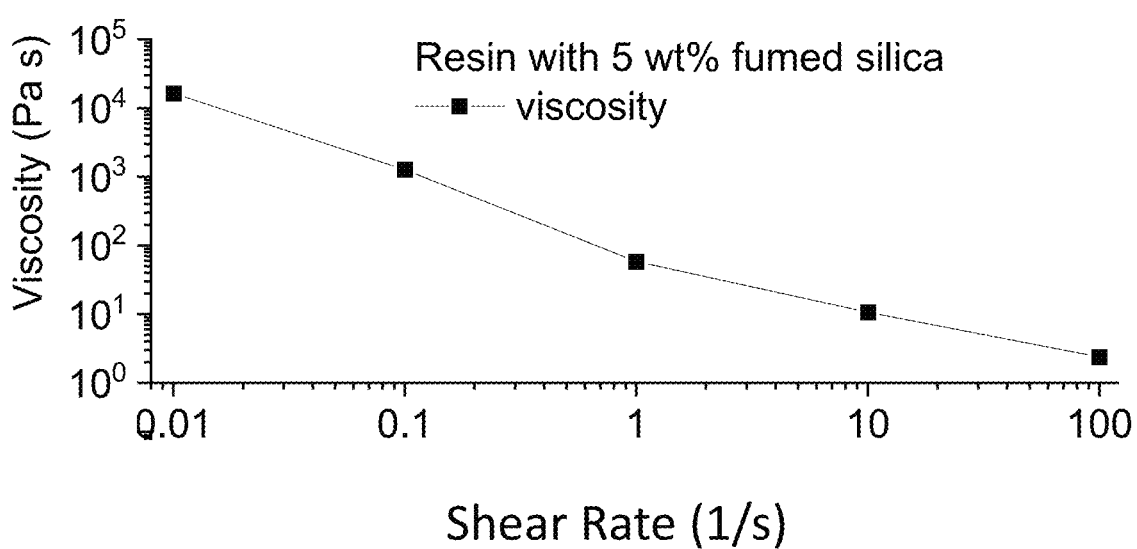
FIGS. 4A and 4B show graphs of viscosity (Pa∘S) as a function of shear rate (1/s) (FIG. 4A) and storage/loss modulus (Pa) as a function of oscillation strain (%) (FIG. 4B) for a composition comprising a monomer, chain extender compound, a crosslinker compound, and fumed silica.
Figure 4B:
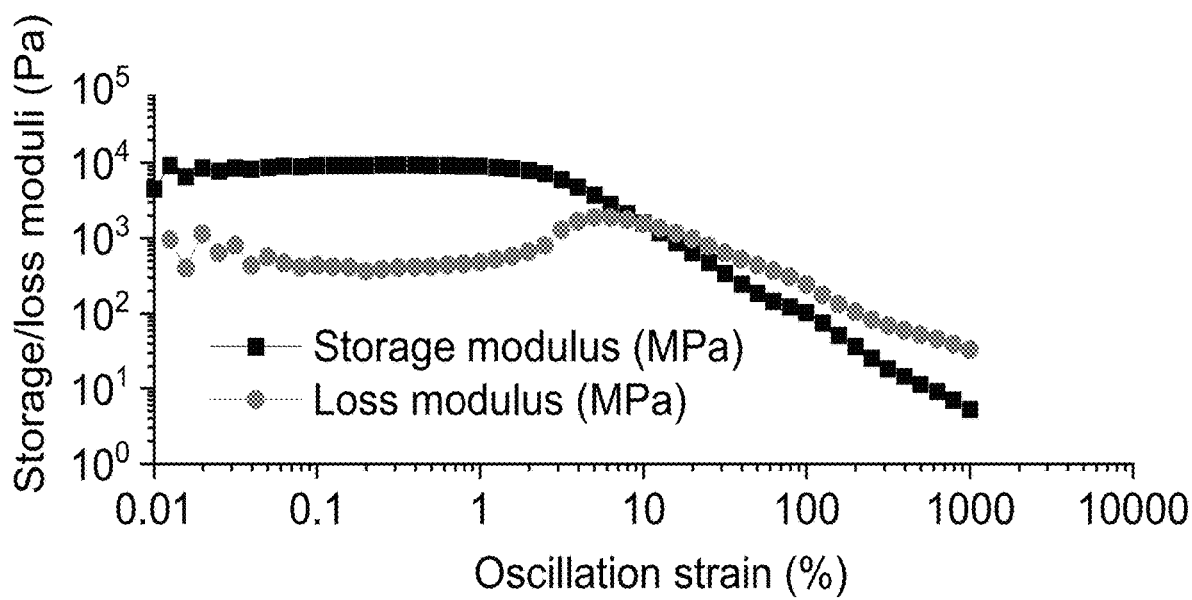

In some embodiments, the composition can further comprise one or more filler components, pigments, or other additive components that permit tuning the rheology and/or other properties of the composition. Representative filler components include silicas (e.g., fumed silica, or other forms of silica), graphitic fillers (e.g., carbon black, carbon nanofibers, carbon nanotubes, graphene, graphene nanoplatelets), or combinations thereof. Such filler components are particularly useful for composition embodiments that are designed for extrusion-based 3D printing techniques. For example, as can be seen in FIGS. 4A and 4B, rheological properties of an exemplary composition can be modified by adding fumed silica.

In particular embodiments, the composition can be tuned to provide desired properties in the resulting LCN. For example, molar ratios of the components of the composition can be selected to provide an LCN that exhibits a particular glass transition temperature ($T_g$), thermal stability of the liquid crystalline phase ($T_{lc}$), and/or degree of liquid crystallinity ($\Delta H_{lc}$). In some embodiments, the $T_g$ can be modified by lowering the concentration of monomer present in the composition. In particular embodiments, the $T_g$ can be modified by selecting a chain extender compound with longer and/or more flexible chains (e.g., by selecting different "A" groups according to Formula II). In some embodiments, the $T_{lc}$ can be modified by selecting different monomers. For example, monomer embodiments comprising more Ar groups can promote higher $T_{lc}$ values (wherein the Ar group is an Ar group according to Formula I). In some embodiments, Ar groups with substituents can be used to reduce the $T_{lc}$. The $T_g$ can be measured using a method known to a person of ordinary skill in the art with the benefit of the present disclosure, such as by using differential scanning calorimetry (DSC), wherein the $T_g$ is determined using the step change of the heat flow signal on the second heating scan at 10° C./minute. The $T_{lc}$ can be measured using a method known to a person of ordinary skill in the art with the benefit of the present disclosure, such as by using DSC, wherein the $T_{lc}$ is determined by using the peak temperature related to the LC phase transition on the second heating scan at 10° C./minute. The $\Delta H_{lc}$ can be measured using a method known to a person of ordinary skill in the art with the benefit of the present disclosure, such as by DSC wherein the value is determined using integrated peak area related to the LC phase transition on the second heating scan at 10° C./minute.

In some embodiments, the LCN exhibits a $T_g$ ranging from −50° C. to 50° C., such as −30° C. to −30° C., or −10° C. to 10° C. In particular embodiments, the LCN exhibits a $T_g$ of −5.4° C. to 14.1° C.

In some embodiments, the LCN exhibits a $T_{lc}$ ranging from 40° C. to 180° C., such as 80° C. to 140° C., or 100° C. to 120° C. In particular embodiments, the LCN exhibits a $T_{lc}$ of 87.7° C. to 92.3° C.

In some embodiments, the LCN exhibits a $\Delta H_{ic}$ ranging from 0 J/g to 40 J/g, such as 10 J/g to 30 J/g, or 15 J/g to 25 J/g. In particular embodiments, the LCN exhibits a $\Delta H_{ic}$ of 2.7 J/g to 31 J/g.

In some embodiments, the $\Delta H_{ic}$ can be used to estimate the degree of liquid crystallinity of the LCN because only one LC phase transition, smectic-isotropic, is involved in the LCN. In particular embodiments, the degree of liquid crystallinity influences the shape memory behavior of the LCN embodiments as both shape-programming and shape-recovering are realized because of the rotation of LC domains in the LCN embodiments. In addition, since liquid crystals are generally rigid-rod molecules, they can be regarded as reinforcing fillers in the materials, which influences mechanical properties of the LCN. Thus, in some embodiments, controlling liquid crystallinity provides a unique way to tailor thermomechanical properties of the LCN embodiments disclosed herein, which in turn affects shape memory behavior of the LCN embodiments.

In some embodiments, the LCN exhibits a storage modulus (E') ranging from 1 to 100 MPa at 150° C., such as 20 to 80 MPa, or 40 to 60 MPa at 150° C.; or a storage modulus ranging from 1000 to 4000 MPa at −50° C., such as 1500 to 3500 MPa, or 2000 to 3000 MPa at −50° C. The E' can determine the strength of a LCN embodiment. In some embodiments, shape memory LCNs with high strength are favored in some applications, such as self-assembling devices that can change shape under load.

The LCN embodiments disclosed herein also can exhibit a low coefficient of thermal expansion (CTE). In some such embodiments, the rigid LC domains in the LCN restrict motion of LCN chain segments, thereby reducing CTE of the LCN. In some embodiments, and as discussed herein, controlling orientation of the LC domains using external fields provides another way to tailor thermal expansion of the LCN.

IV. Method of Use

Also disclosed herein are methods of using the LCN and composition embodiments disclosed herein. In particular embodiments, the composition embodiments are used in additive manufacturing processes to provide a fabricated object comprising the LCN, which is formed during the additive manufacturing process. In some embodiments, the additive manufacturing process is a extrusion-based method. In yet some additional embodiments, the additive manufacturing process is a vat-based polymerization method. The method comprises adding a composition embodiment to an additive manufacturing device and exposing the composition to an energy source. In some embodiments, the method can further comprise depositing a layer of the composition and polymerizing the composition by exposing the composition to the energy source. In some embodiments, the composition is provided as a molten liquid that is added to the additive manufacturing device. In some other embodiments, the composition is provided as a solid, such as in the form of pellets, that is added to the additive manufacturing device. Some embodiments can further comprises exposing the composition to a heat source. In some embodiments, the method can further comprise exposing the composition or the LCN formed therefrom to an electric field, a magnetic field, or both an electric field and a magnetic field. Such embodiments can be used to control orientation of molecules present in the LCN, thereby providing the ability to provide fabricated objects exhibiting structural hierarchy. The LCN of the object can be used to influence the shape and/or form of the object as is discussed herein in more detail.

In some embodiments, the additive manufacturing device can be a device capable of extrusion-based 3D printing or vat-based 3D printing, such as a 3D printer, an extruder-based printer, a vat-based printing device, and the like. With reference to extruder-based printers, heat can be applied in some embodiments during the use of the extruder. The composition is added to the extruder device (either as a composition comprising the monomer, chain extender compound, and crosslinker compound; or as separate compositions of these components individually that are eventually combined at some point in the extrusion process). The composition comprising the monomer, chain extender compound, and the crosslinker compound (and optionally an initiator compound) is extruded through a die or nozzle of suitable shape, and repeatedly deposited in discrete amounts in designated locations to fabricate an object. In particular embodiments, the temperature used during the extrusion process is generally a temperature at which the precursor is extrudable but not in a completely melted state (e.g., a temperature below the melting temperature of the composition and/or a temperature below the melting temperature of each of the components). After deposition and/or during deposition, the composition is exposed to an energy source to facilitate the thiol-ene chemistry that forms the LCN. In processes utilizing a vat-based printing device, the composition is added to the vat and the energy source is focused on desired regions of a build platform positioned in the vat and in contact with the composition. As the build platform is moved, additional regions of the composition will be exposed to the energy source, thereby providing additive layers of composition that are converted to an LCN. The energy source facilitates the thiol-ene chemistry that forms the LCN when it is focused on pre-determined regions of the build platform. In some embodiments, the composition can further be exposed to a magnetic and/or electric field which can be provided by electrodes and/or magnets coupled to the additive manufacturing device.

Figure 5:
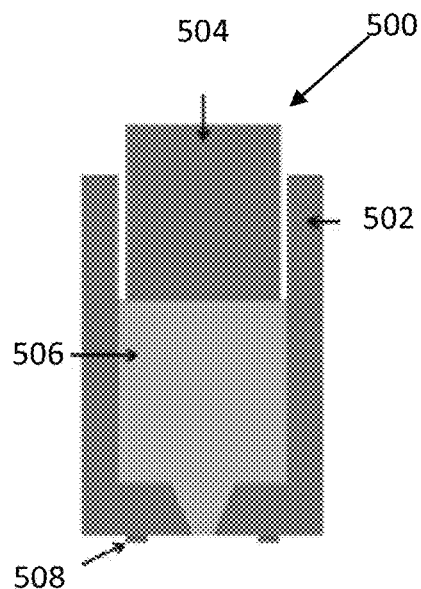
FIG. 5 is a schematic illustration of an extruder-based device for use in printing a molten composition embodiment comprising a monomer, a chain extender compound, and a crosslinker compound.
Figure 6:
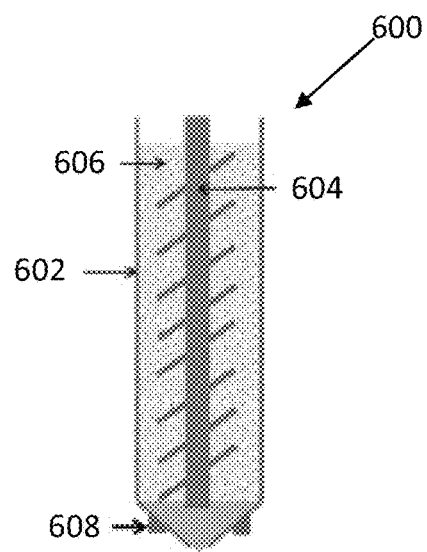
FIG. 6 is a schematic illustration of an extruder-based device for use in printing a solid-phase composition embodiment comprising a monomer, a chain extender compound, and a crosslinker compound.
Figure 7:
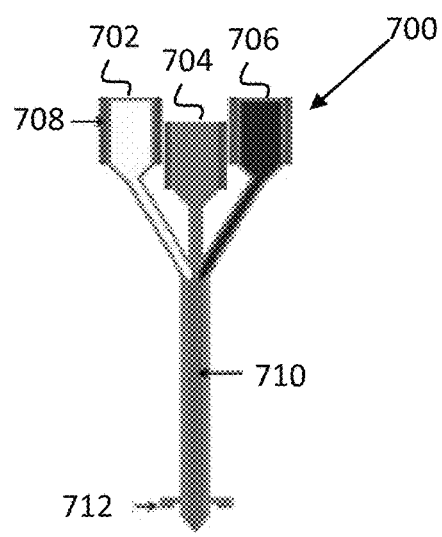
FIG. 7 is a schematic illustration of an extruder-based device for use in printing a molten composition embodiment, wherein the components of the composition (e.g., the monomer, chain extender compound, and the crosslinker compound) are first provided as separate components and are mixed within a mixing nozzle.
Figure 8:
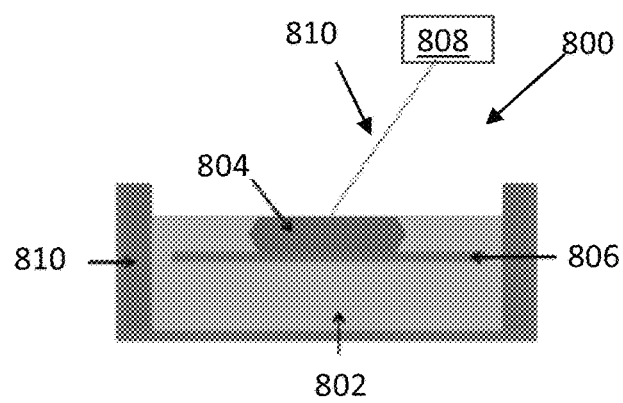
FIG. 8 is a schematic illustration of a vat-based device for use in printing a molten composition embodiment comprising a monomer, a chain extender compound, and a crosslinker compound.

Schematics illustrating representative devices and/or 3D printing techniques that can be used with the composition embodiments disclosed herein are illustrated in FIGS. 5-8. FIG. 5 illustrates extruder device 500, which comprises a heated cylinder component 502 and piston 504. Molten composition 506 comprises the monomer, chain extender compound and crosslinker compound, and in some embodiments can further comprise a modifier component. Molten composition 506 is pressed through extruder device 500 using piston 504. Energy source 508 (e.g., a UV lamp(s)) can be used to promote polymerization as molten composition 506 passes out of extruder device 500, thereby forming a fabricated LCN-containing object. Another extrusion-based embodiment is illustrated in FIG. 6. With reference to FIG. 6, screw extruder device 600 comprises heated nozzle 602 and screw 604 that facilitate extrusion of pellets 606, which comprise the composition comprising the monomer, chain extender compound, and crosslinker compound. Energy source 608 can be used to promote polymerization as a molten composition formed from heating pellets 606 passes out of extruder device 600, thereby forming a fabricated LCN object. Another exemplary device that can be used in method embodiments disclosed herein is illustrated in FIG. 7. Device 700 in FIG. 7 comprises individual chambers for each composition component (chambers 702, 704, and 706), each of which is coupled to a heater component (e.g., heater 708). As the compositional components are introduced into mixing nozzle 710, they are allowed to mix and pass through device 700 while being exposed to an energy source to facilitate polymerization and LCN formation (via UV lamp 712). A vat-based device for forming objects comprising LCN embodiments according to the present disclosure is illustrated in FIG. 8. With reference to FIG. 8, vat 800 is filled with molten composition 802 comprising the monomer, crosslinker compound, and the chain extender compound. Fabricated object 804 is printed on building platform 806 by exposing composition 802 to energy source 808 (e.g., a point laser or a projected laser), wherein the radiation from the energy source is represented by line 810. In some embodiments, components 810 (e.g., magnets and/or electrodes) can be provided to facilitate providing a magnetic and/or electric field during the printing process (as discussed below).

In some embodiments, the method can further comprise applying a directional field to the deposited layer of the LCN. In particular embodiments, the directional field can be a magnetic field, an electric field, or both a magnetic and electric field (or an "electromagnetic field"). In some such embodiments, this can increase chemical bonding across the deposited layers of LCN. It also can control the crystalline domains of the LCN. In particular embodiments, the directional field is applied to the deposited material before or during polymerization induced by the energy source and/or initiator component. In some embodiments, the field can be applied during or after partial or full deposition of the composition during the additive manufacturing method.

In some embodiments, the LCN is formed from a monomer component comprising an azo group. The presence of this group in the LCN can facilitate light-activated deformation of the LCN. In some such embodiments, the LCN (or an object comprising the LCN) can be exposed to an energy source capable of producing electromagnetic radiation having a suitable wavelength and operated at an intensity sufficient to result in a bulk physical deformation (e.g., bending, stretching, or twisting) of the LCN. The physical deformation occurs at least primarily (or solely) by light-stimulated trans-cis-trans or trans-cis isomeric conversion of the azo groups without thermal decomposition of the LCN composition. As different wavelengths can induce different isomeric arrangements with resulting different types of mechanical responses, a specific wavelength may be selected in order to elicit a specific type of mechanical response. In some embodiments, the specifically selected wavelength can range from 300 nm to 500 nm, such as 300 nm, 350 nm, 400 nm, 450 nm, or 500 nm. The intensity sufficient to result in a bulk physical deformation can range from 10 mW/cm$^2$ to 300 mW/cm$^2$, such as 20 mW/cm$^2$ to 250 W/cm$^2$, but is not so high so as to cause thermal decomposition. Depending on at least the wavelength and intensity of the light, along with the particular composition of the LCN, the physical deformation can be reversible or permanent. The type of physical deformation can also be dependent on whether the electromagnetic radiation is polarized or unpolarized.

In particular embodiments, objects comprising the LCN can be fabricated as the LCN is formed. Objects comprising the FCN that are made using method embodiments disclosed herein can have any suitable shape or function. In some embodiments, the object is an actuator used for temperature regulation. In additional embodiments, additional components can be combined with the LCN so as to become part of a final object comprising the additional component embedded in the LCN. For example, wires, particles, or other structural components can be added to the object such as by printing the LCN around such components and/or encompassing the components with the LCN during printing.

V. Overview of Several Embodiments

Disclosed herein are embodiments of a liquid crystalline network, comprising:
(i) a monomer having a structure according to Formula I as disclosed herein, wherein each Ar group is an aromatic ring system; each X independently is a linker group; each Y independently comprises a heteroatom; each of $R^1$, $R^2$, $R^3$, $R^4$, $R^5$, and $R^6$ independently is selected from hydrogen, deuterium, aliphatic, heteroaliphatic, haloaliphatic, haloheteroaliphatic, aromatic, or an organic functional group; n is an integer selected from 0 to 5; and m is an integer selected from 0 to 50; (ii) a chain extender compound having a structure according to Formula II as disclosed herein, wherein A comprises an aliphatic group, a heteroaliphatic group, an aromatic group, or an organic functional group; and (iii) a crosslinker compound having a structure according to Formula III as disclosed herein, wherein each X independently is O, S, or NR″, wherein R″ is hydrogen, aliphatic, or heteroaliphatic; each q independently is an integer selected from 1 to 100; r is an integer selected from 2, 3, or 4; each t independently is an integer selected from 0 to 5; and u is an integer selected from 0, 1, or 2; and wherein the monomer is directly covalently coupled to the chain extender compound, the crosslinker compound, or both the chain extender compound and the crosslinker compound.

In some embodiments, each Ar group of the monomer is an aryl group or a heteroaryl group; each X independently is azo or ester; each Y independently is O, S, or NH; each of $R^1$, $R^2$, $R^3$, $R^4$, $R^5$, and $R^6$ is hydrogen; and m is an integer selected from 0 to 5.

In any or all of the above embodiments, the monomer has a structure according to one of formulas IA, IB, IC, ID, IE, or IF as disclosed herein, wherein each $R^7$ independently is selected from aliphatic, aromatic, or an organic functional group; and each p independently is an integer selected from 0 to 4.

In any or all of the above embodiments, the monomer has a structure according to one of formulas IA', IB', IC', ID', IE', or IF' as disclosed herein.

In any or all of the above embodiments, the monomer has a structure according to one of formulas IA″, IB″, IC″, ID″, IE″, or IF″ as disclosed herein.

In any or all of the above embodiments, the monomer is selected from one of monomers 100, 102, 104, 106, 108, and/or 110.

In any or all of the above embodiments, the A group of Formula II is —(CR'$_2$)$_q$, wherein each R' independently is hydrogen or aliphatic and q is an integer selected from 1 to 100; —CH$_2$CH$_2$(OCH$_2$CH$_2$)$_q$—, wherein q is an integer selected from 1 to 100; —(CH$_2$)$_q$C(O)O(CH$_2$)$_q$OC(O)(CH$_2$)$_q$—, wherein q is an integer selected from 1 to 100; —(CH$_2$)$_q$C(O)N(H)(CH$_2$)$_q$N(H)C(O)(CH$_2$)$_q$—, wherein q is an integer selected from 1 to 100; or —(CH$_2$)$_q$O-Ph-C(O)O-Ph-OC(O)-Ph-O(CH$_2$)$_q$—, wherein q is an integer selected from 1 to 100.

In any or all of the above embodiments, the chain extender compound is selected from 2,2'-(ethane-1,2-diylbis(oxy))bis(ethane-1-thiol), hexane-1,6-dithiol, butane-1,4-diyl bis(2-mercaptoacetate), octane-1,8-dithiol, hexadecane-1,16-dithiol, 2,2'-oxybis(ethane-1-thiol), or 1,4-phenylene bis(4-((6-mercaptohexyl)oxy)benzoate).

In any or all of the above embodiments, X of Formula III is oxygen; r of Formula III is 4; u of Formula III is 0; t is 1; and each q independently is 1 or 2.

In any or all of the above embodiments, X of Formula III is oxygen; r of Formula III is 3; u of Formula III is 1; t is 1; and each q independently is 1 or 2.

In any or all of the above embodiments, the crosslinker is selected from

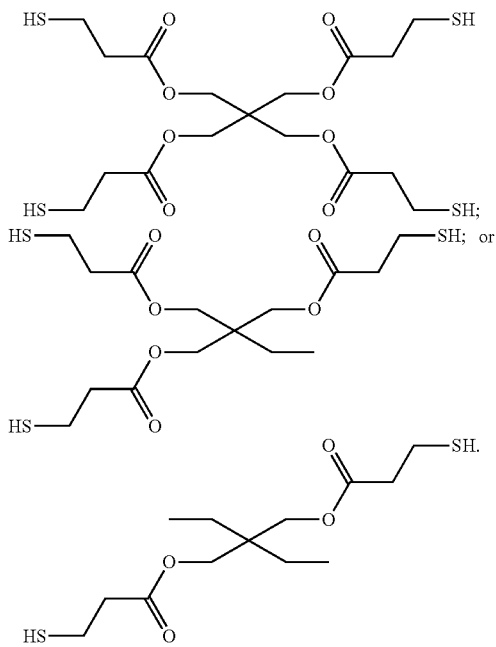

In any or all of the above embodiments, the liquid crystalline network exhibits a glass transition temperature ranging from −50° C. to 50° C., as measured using differential scanning calorimetry.

In any or all of the above embodiments, the liquid crystalline network exhibits a thermal stability of the liquid crystalline phase ranging from 40° C. to 180° C., as measured using differential scanning calorimetry.

In any or all of the above embodiments, the liquid crystalline network exhibits a degree of liquid crystallinity ranging from 0 J/g to 40 J/g, as measured using differential scanning calorimetry.

Also disclosed herein are embodiments of a composition, comprising: (i) a monomer having a structure according to Formula I as disclosed herein, wherein each Ar group is an aromatic ring system; each X independently is a linker group; each Y independently comprises a heteroatom; each of $R^1$, $R^2$, $R^3$, $R^4$, $R^5$, and $R^6$ independently is selected from hydrogen, aliphatic, heteroaliphatic, haloaliphatic, haloheteroaliphatic, aromatic, or an organic functional group; n is an integer selected from 0 to 5; and m is an integer selected from 0 to 50; (ii) a chain extender compound having a structure according to Formula II as disclosed herein, wherein A comprises an aliphatic group, a heteroaliphatic group, an aromatic group, or an organic functional group; and (iii) a crosslinker compound having a structure according to Formula III as disclosed herein, wherein each X independently is O, S, or NR″, wherein R″ is hydrogen, aliphatic, or heteroaliphatic; q is an integer selected from 1 to 100; r is an integer selected from 2, 3, or 4; t is an integer selected from 0 to 5; and u is an integer selected from 0, 1, or 2.

In some embodiments, the composition further comprises an initiator compound.

In any or all of the above embodiments, the monomer, the chain extender compound, and the crosslinker compound are present in a ratio ranging from 3:1:1 (monomer:chain extender compound:crosslinker compound) to 8:6:1 (monomer:chain extender compound:crosslinker compound).

In any or all of the above embodiments, crosslinker is present at a mole fraction ranging from 5% to 35%.

Also disclosed herein are embodiments of a method, comprising: adding a composition as disclosed herein, or components thereof, into an additive manufacturing device; depositing the composition using the additive manufacturing device to provide a deposited composition; and polymerizing the deposited composition to provide a liquid crystalline network by exposing it to an energy source.

In some embodiments, the method further comprises exposing the deposited composition, the liquid crystalline network, or both to an external field selected from a magnetic field, and electric field, or a combination thereof.

VI. Examples

Pentaerythritol tetrakis (3-mercaptopropionate) (PETMP, >95%), 2,2-dimethoxy-2-phenylacetophenone (DMPA, 99%), and 4,4'-dihydroxybiphenyl (97%) were purchased from Sigma-Aldrich. 1,4,7,10,13,16-hexaoxacyclooctadecane (18-Crown-6, 99%) and 1,4-bis(mercaptoacetoxy)butane (BMAB, 95%) was obtained from TCI Chemicals. 6-bromo-1-hexene (98%) was obtained from Combi-Blocks. Anhydrous potassium carbonate (K2CO3), acetone, and ethanol were purchased from Fisher Scientific. All chemicals were used as received without further purification.

Example 1

Figure 9A:
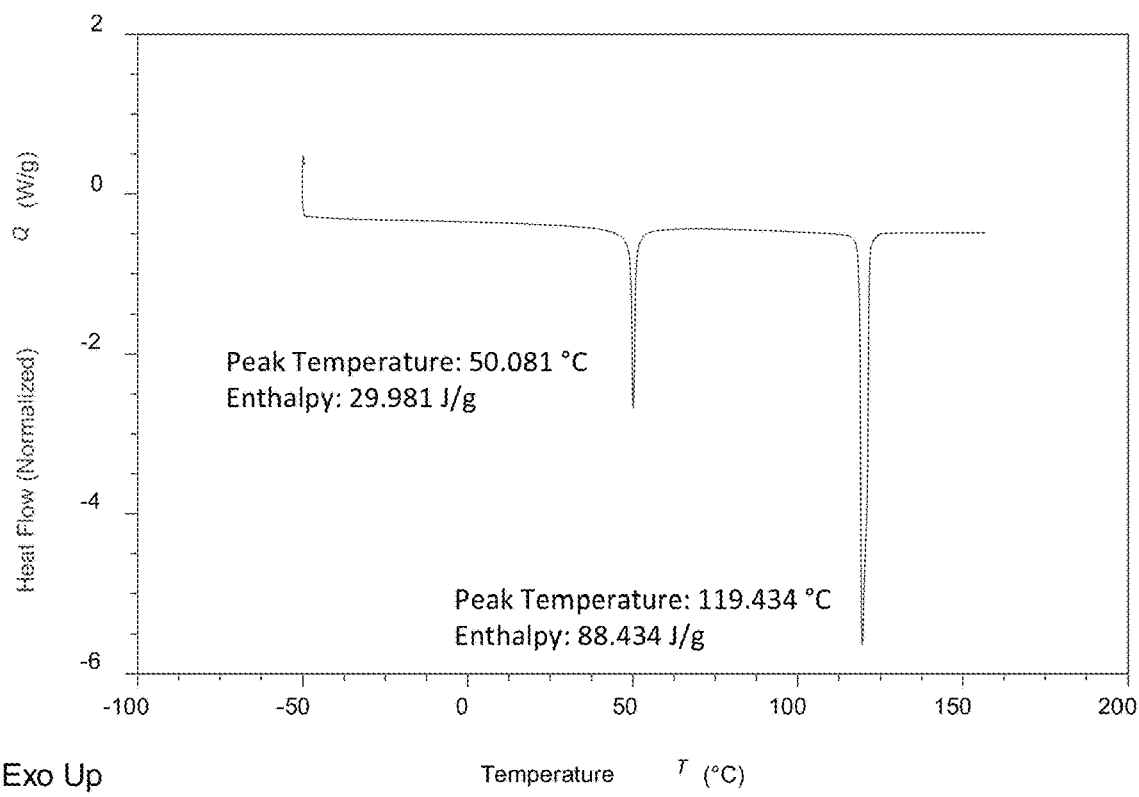
FIGS. 9A and 9B are DSC thermograms showing reversible liquid crystal ("LC") phase transitions upon heating (FIG. 9A) and cooling (FIG. 9B) monomer 100.
Figure 9B:
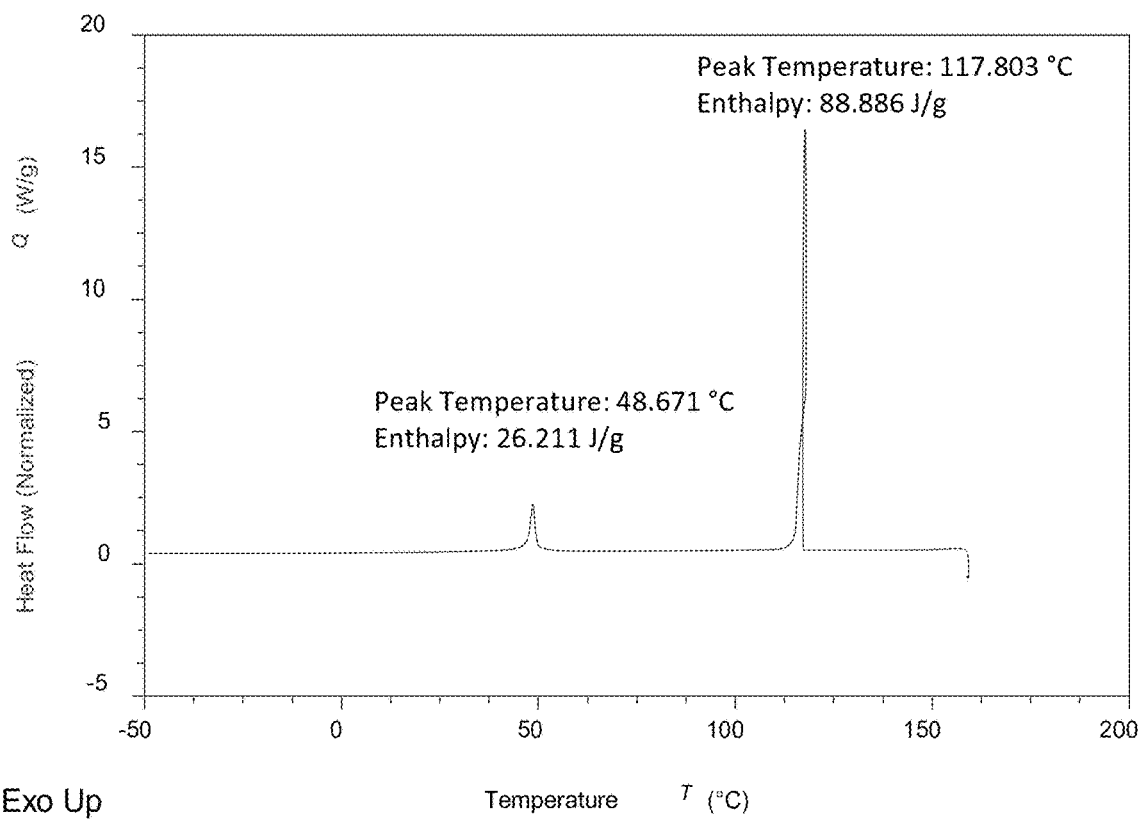
Figure 10A:
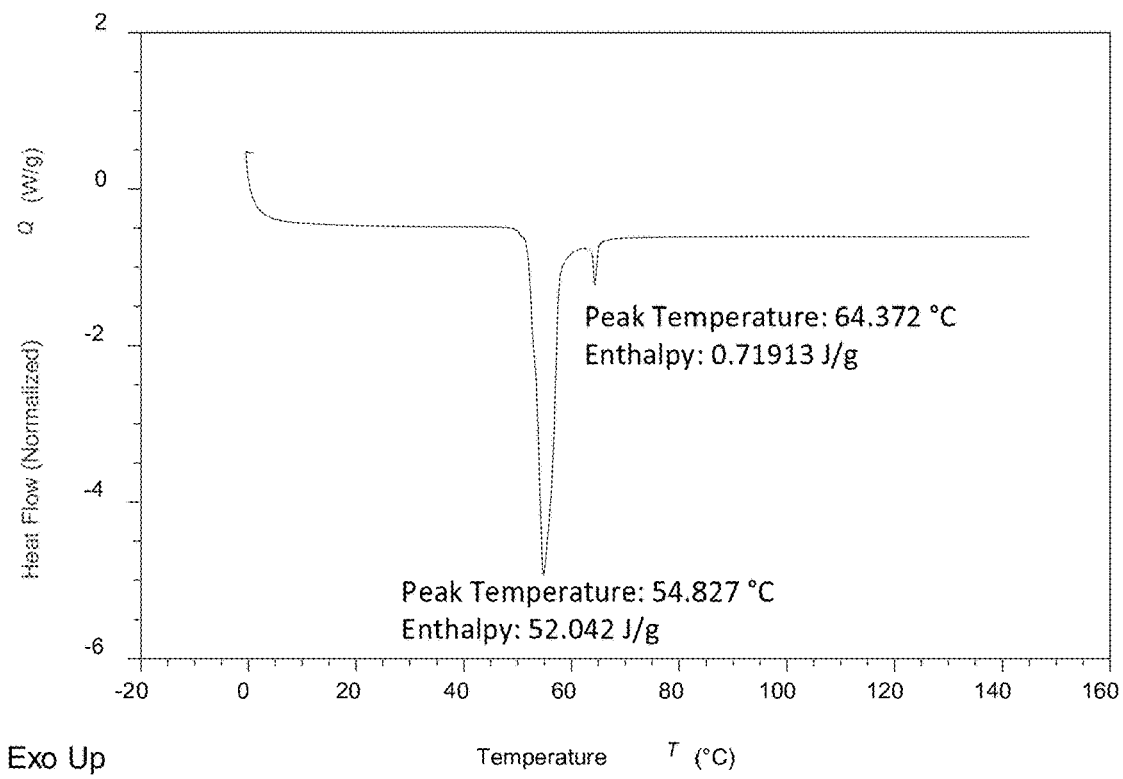
FIGS. 10A and 10B are DSC thermograms showing reversible LC phase transitions upon heating (FIG. 10A) and cooling (FIG. 10B) monomer 102.
Figure 10B:
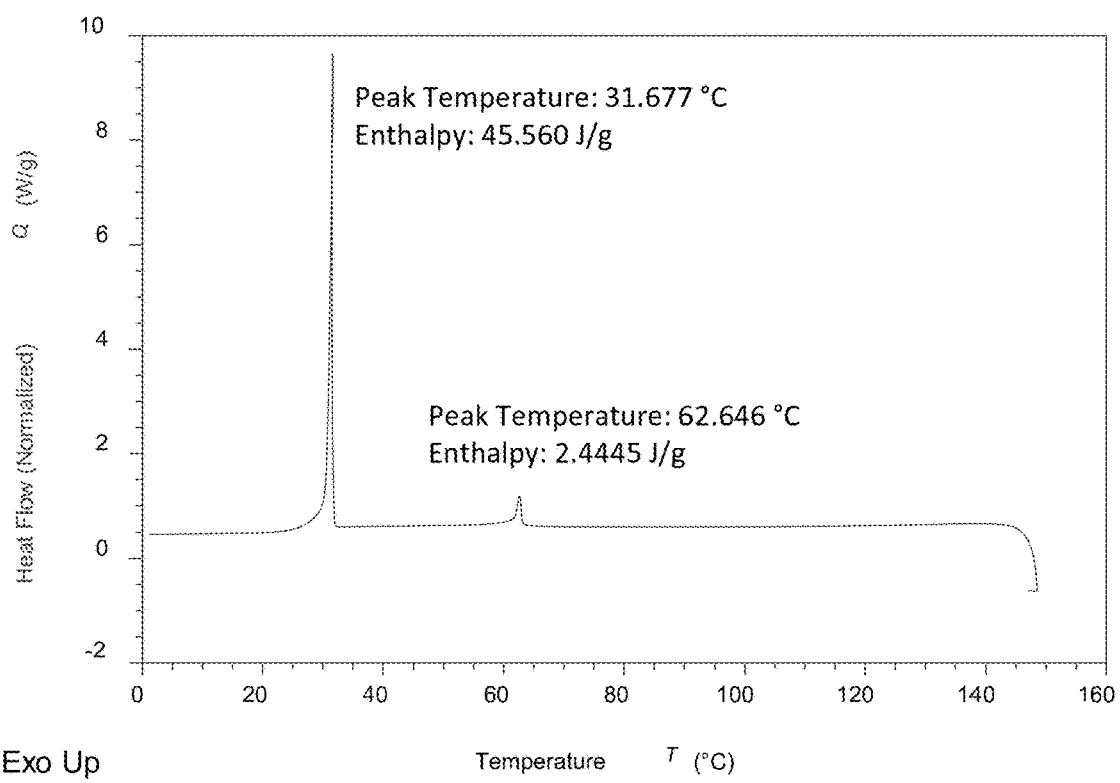
Figure 11A:
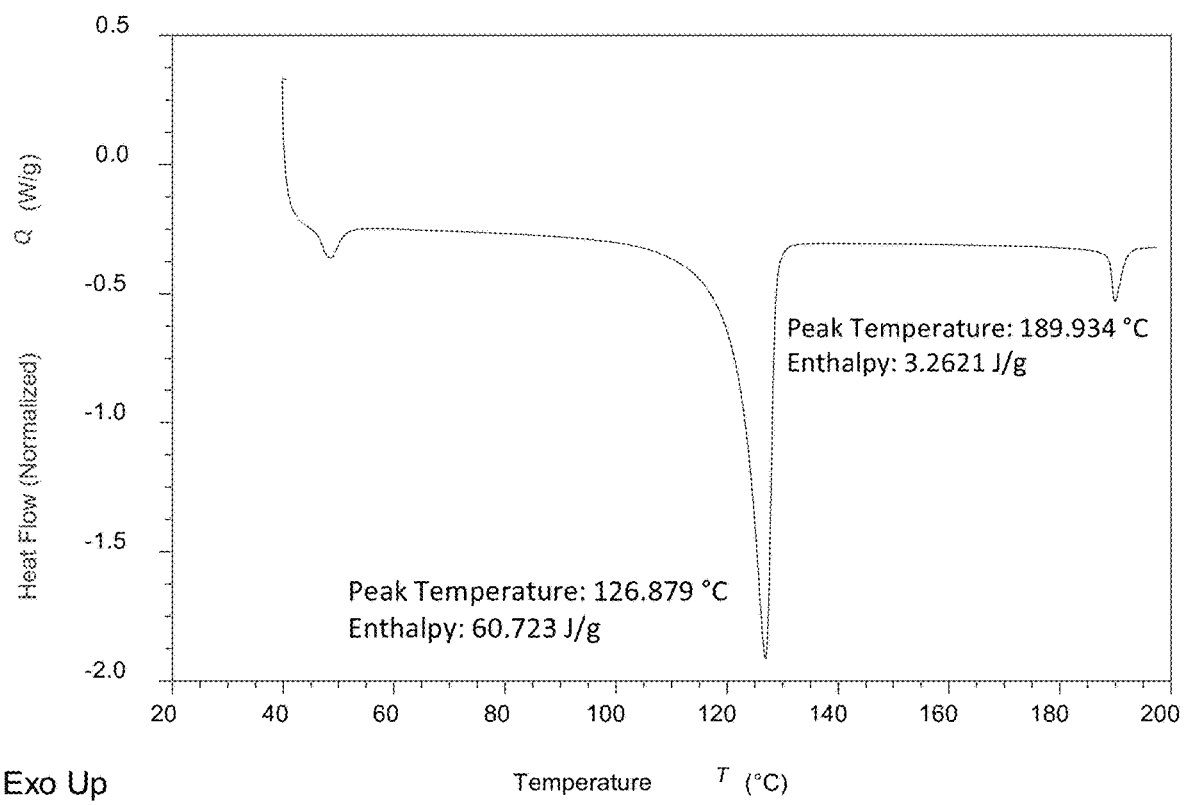
FIGS. 11A and 11B are DSC thermograms showing reversible LC phase transitions upon heating (FIG. 11A) and cooling (FIG. 11B) monomer 104.
Figure 11B:
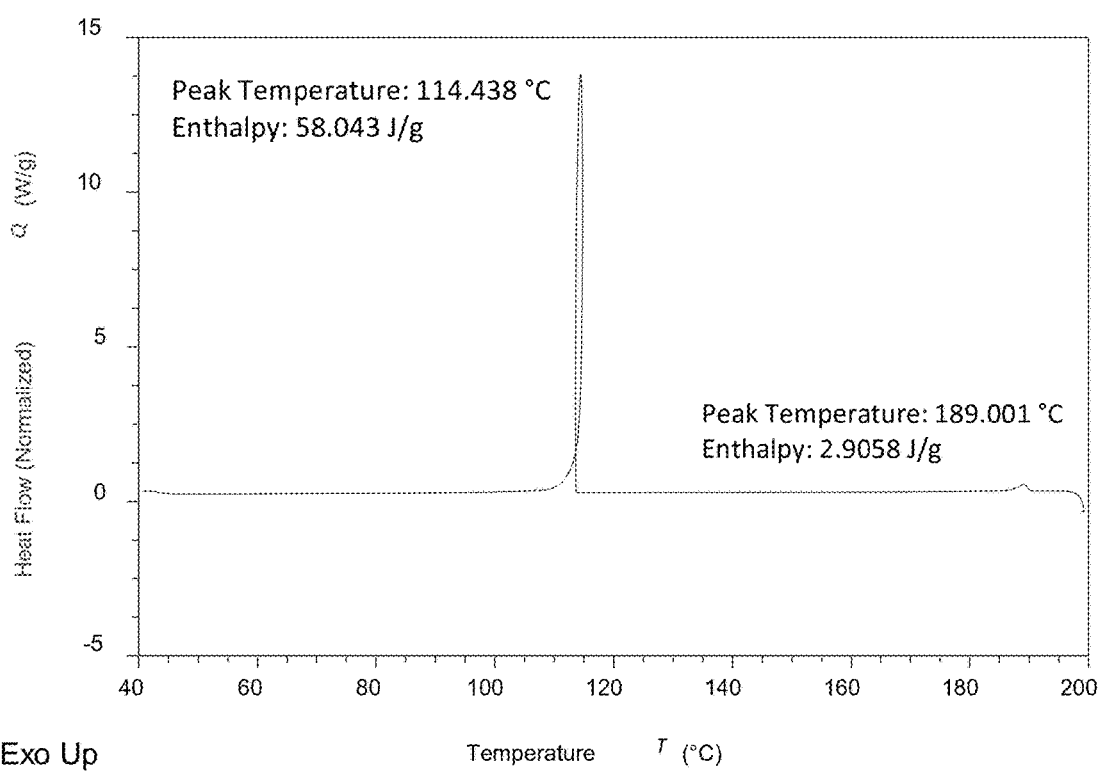
Figure 12A:
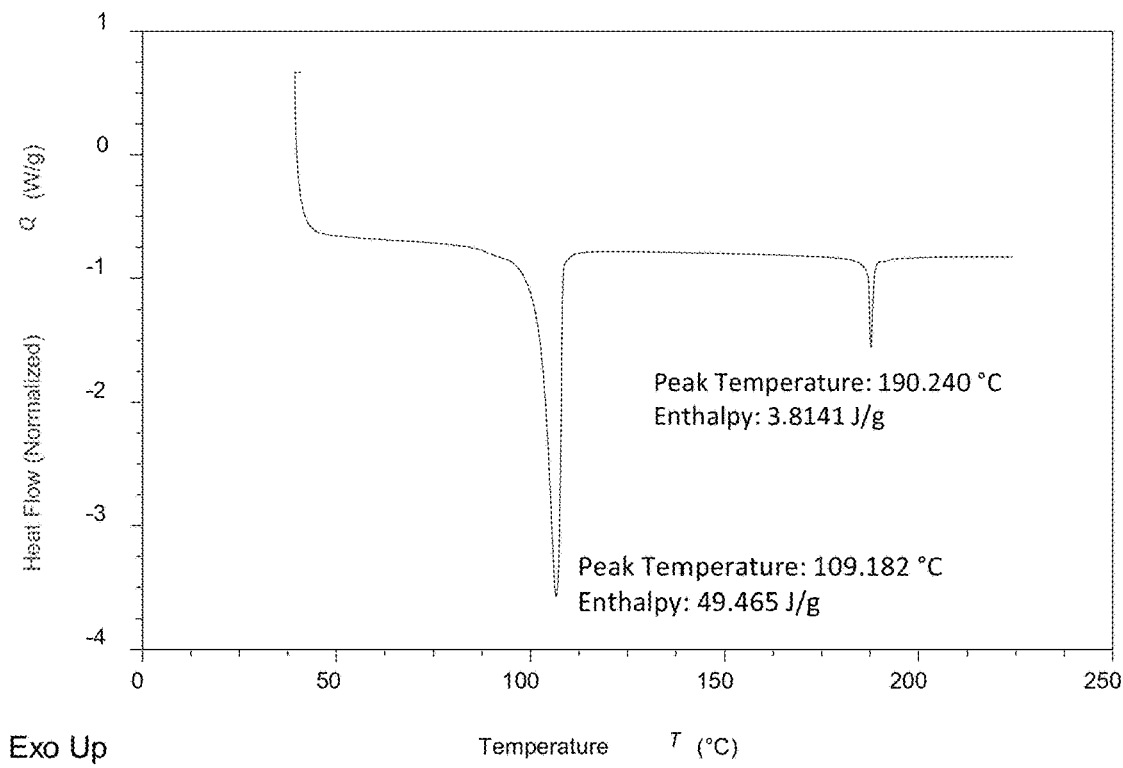
FIGS. 12A and 12B are DSC thermograms showing reversible LC phase transitions upon heating (FIG. 12A) and cooling (FIG. 12B) monomer 106.
Figure 12B:
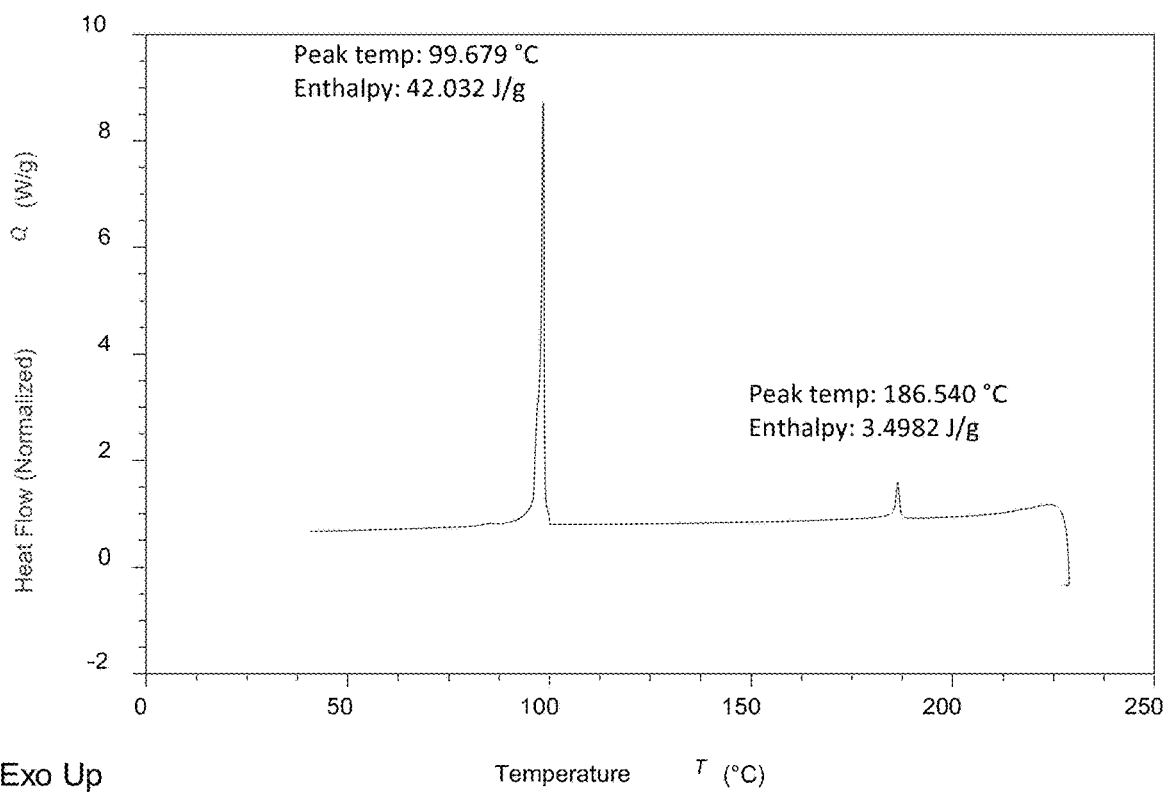
Figure 13A:
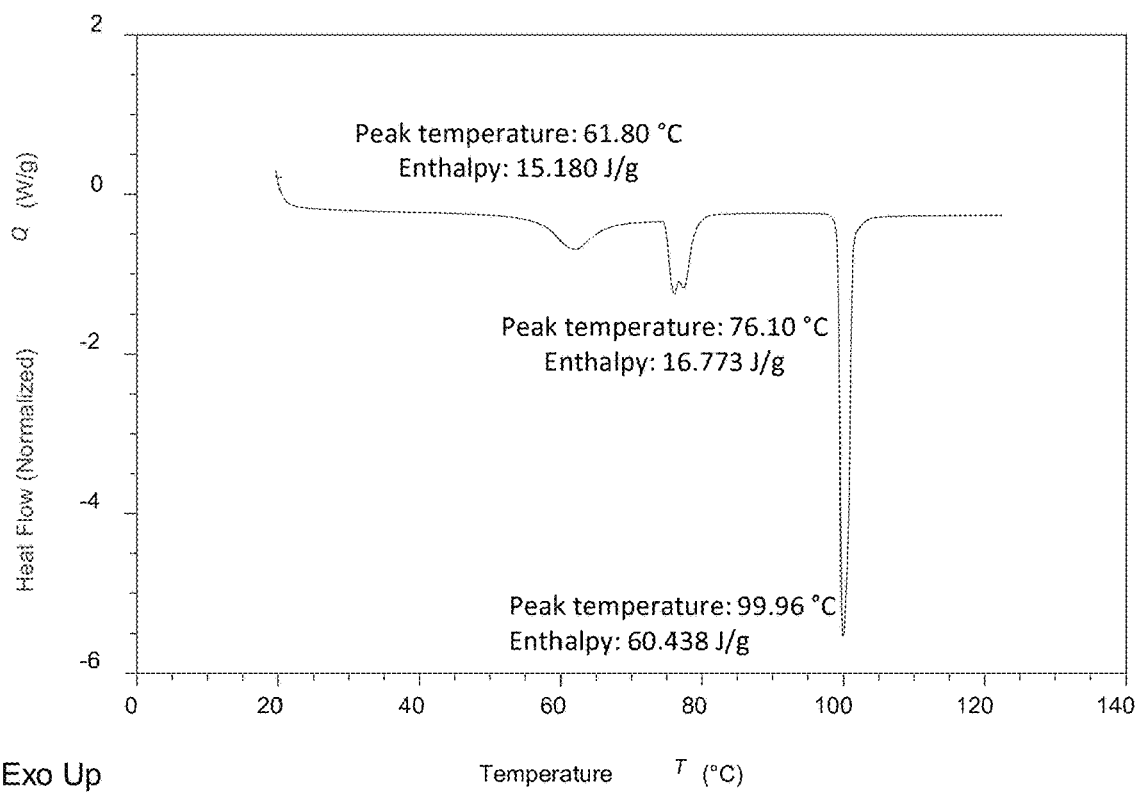
FIGS. 13A and 13B are DSC thermograms showing reversible LC phase transitions upon heating (FIG. 13A) and cooling (FIG. 13B) monomer 108.
Figure 13B:
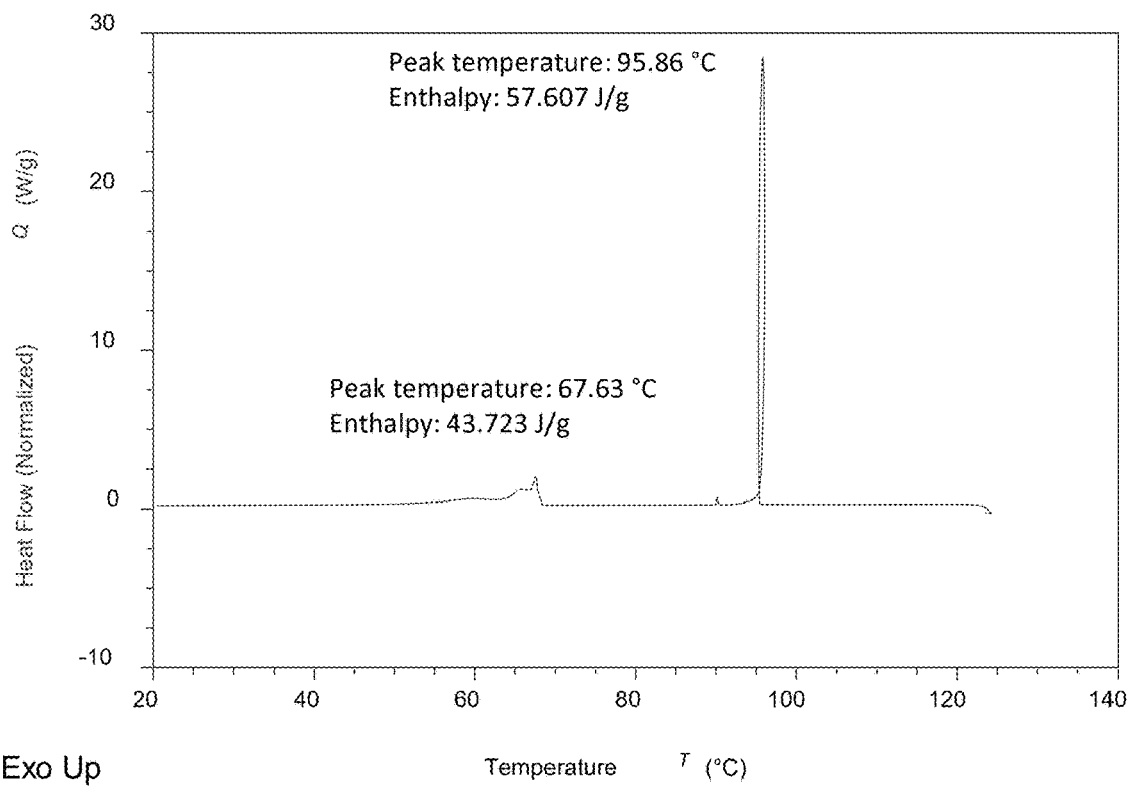
Figure 14A:
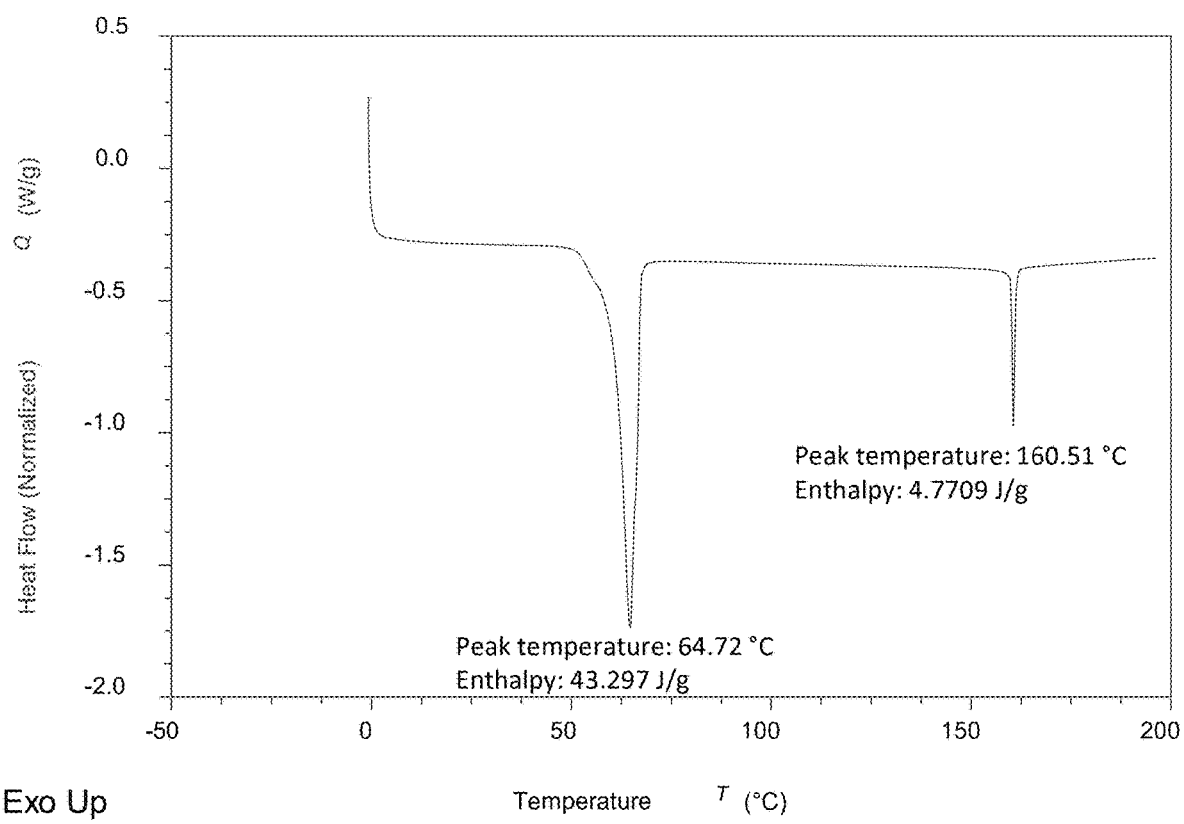
FIGS. 14A and 14B are DSC thermograms showing reversible LC phase transitions upon heating (FIG. 14A) and cooling (FIG. 14B) monomer 110.
Figure 14B:
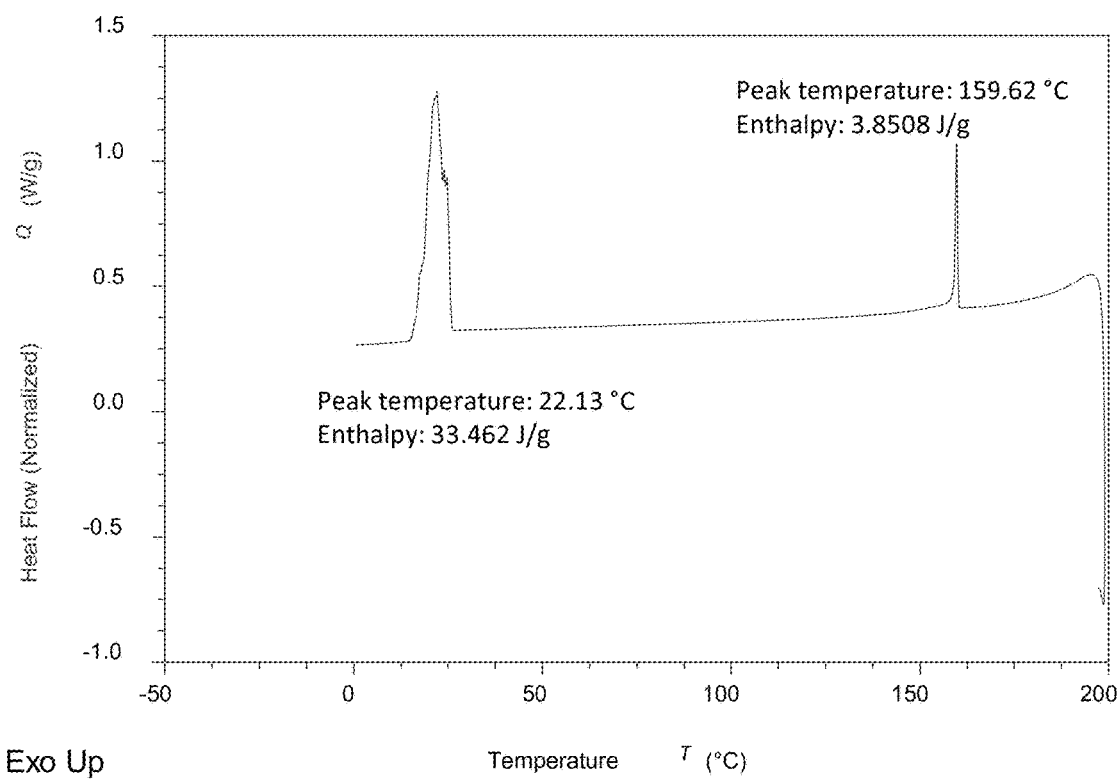

The biphenyl-based divinyl monomer (4,4'-Bis(5-hexen-1-yloxy)-1,1'-biphenyl, referred to as "BPDV") was prepared using the Williamson ether synthesis method. A mixture of 4,4'-dihydroxybiphenyl (9.516 g, 0.051 mol), 18-Crown-6 (1.351 g, 0.0051 mol), and $K_2CO_3$ (35.316 g, 0.256 mol) was suspended in 400 ml of acetone in a round bottom flask. Then, 6-bromo-1-hexene (25 g, 0.153 mol) was added into the flask and the reaction mixture was refluxed for 24 hours. After the reaction, the hot solution was filtered, and the filtrate was concentrated using a rotary evaporator. The precipitate was washed successively with water and ethanol yielding white flakes. The product was dried at 50° C. under vacuum and was used without further purification (14.865 g, dry yield 83.1%). $^1$H NMR (DMSO-$d_6$): δ=7.51-7.53 (d 4H), 6.97-6.99 (d, 4H), 5.79-5.89 (m, 2H), 4.96-5.07 (m, 4H), 3.99-4.02 (t, 4H), 2.08-2.13 (m, 4H), 1.70-1.77 (m, 4H), 1.49-1.56 (m, 4H). $^{13}$C NMR (DMSO-$d_6$): δ=157.94, 138.80, 132.43, 127.40, 115.19, 115.01, 67.47, 33.08, 28.39, 24.98. DSC thermograms showing the reversible LC phase of this monomer (monomer 100) are provided by FIGS. 9A and 9B, which show results for heating and cooling, respectively. Additional DSC thermograms for other monomer embodiments (namely, monomers 102, 104, 106, and 108 as disclosed herein) are shown by FIGS. 10A-10B, 11A-11B, 12A-12B, 13A-13B, and 14A-14B.

The method described in this example can be used to make other monomer embodiments according to the present disclosure by selecting an appropriate starting material to provide the

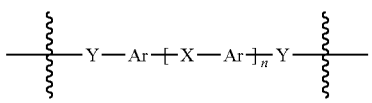

group of the monomer general formula, as described herein.

Example 2

PETMP, BMAB, and BPDV in different molar ratios were mixed while maintaining an equivalent amount of thiol and vinyl groups. 1 wt % of DMPA was added to the mixture as a photo-initiator. The powder mixture was transferred into a glass vial and melted at 130° C. in an oil bath. Once melted, the mixture was manually stirred for 5 minutes. Prior to casting of the films, a square glass open-faced mold was spray-coated with a thin layer of PTFE and equilibrated to 130° C. on a hot plate. The dimension of the glass mold is L*W*H=50 mm*50 mm*5 mm. The dimension of the indent in the center of the glass mold for holding materials is L*W*H=25 mm*25 mm*1 mm. The mold release lubricant was MR 311 Dry Film Release Agent and was purchased from McMASTER-CARR. The thickness of the applied mold release agent was estimated to be 50 μm. The liquid mixture was then poured into the mold and equilibrated for 90 seconds. A clean glass slide was then placed over the mold while leaving one small corner of the mold face uncovered. This small gap was left open to allow for some contraction of the material during the curing reaction. Next, a UV light source centered directly above the mold was turned on for 2 minutes with an intensity of 5 mW/cm$^2$ at the mold face to activate the photo-initiator and polymerize the samples. After that, the mold was removed from the hot-plate and allowed to cool to room temperature to obtain the polymerized LCN films with a dimension of L*W*H=50 mm*50 mm*5 mm. The prepared LCN films with different compositions were labeled as LCN-102, LCN-113, LCN-124, LCN-146, and LCN-168, as shown in Table 1.

TABLE 1

LCN Composition Embodiments

| | PETMP (mol) | BMAB (mol) | BPDV (mol) | Mole fraction of PETMP (%) |
|---|---|---|---|---|
| LCN-102 | 1 | 0 | 2 | 33.3 |
| LCN-113 | 1 | 1 | 3 | 20.0 |
| LCN-124 | 1 | 2 | 4 | 14.3 |
| LCN-146 | 1 | 4 | 6 | 9.1 |
| LCN-168 | 1 | 6 | 8 | 6.7 |

Figure 35:
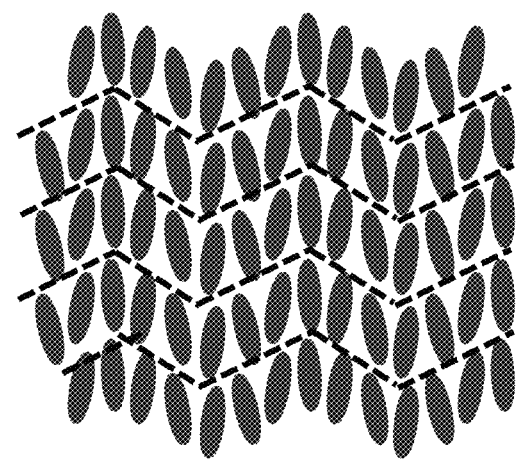
FIG. 35 is a schematic illustration of the chevron smectic C liquid crystal structure that can be observed for LCN embodiments disclosed herein.

The chemical structure of the synthesized BPDV was characterized using proton and carbon nuclear magnetic resonance ($^1$H and $^{13}$C NMR). Tests were carried out at room temperature using a Bruker DRX 400 NMR instrument with DMSO-d$_6$ as the solvent. NMR data was analyzed using the Mnova software from Mestrelab Research S.L. The thermal and LC behavior of BPDV was studied using a differential scanning calorimeter (DSC) from TA Instruments. Samples were tested using a Discovery DSC with heat-cool-heat cycle from −50 to 150° C. at a scanning rate of 10° C./min under a nitrogen purge of 20 mL/min. The first heating scan was used to erase the thermal history, and the second heating scan was used to analyze the thermal behavior. Non-ambient X-ray diffraction (XRD) was performed using PANalytical X'Pert Pro equipped with TTK-450 heating stage to investigate the structure changes of the monomer related to the thermal transitions. Diffraction patterns were collected at 27° C., 85° C., 150° C. on heating process and 85° C., 27° C. on cooling process, respectively, at a scan rate was 0.15°/min over a 2θ from 0° to 60°. Characterization of the molecular structure of an LCN also can be assessed using X-ray scattering, as illustrated by FIGS. 35 and 36.

Example 3

The curing behavior of the LCNs was investigated using the DSC equipped with a UV light source (OmniCure S2000). Approximately 10 mg of an uncured sample was loaded into a DSC pan without a lid and equilibrated at 125° C. in the DSC cell until the heat flow reading of the DSC became stable. The UV light was then turned on and the generated heat flow was recorded for 3 minutes. After the photo-DSC tests, the thermal and LC properties of the cured LCN samples were studied by running a heat-cool-heat dynamic DSC scan. The curing behavior was also characterized using a NICOLET iS50 Fourier Transform Infrared Spectroscopy (FTIR) system in attenuated total reflectance (ATR) mode to monitor the conversion of thiol and vinyl groups. Diamond was used as the ATR crystal. FTIR spectra were collected at 4 cm$^{-1}$ resolution using 64 scans from 4000 to 400 cm$^{-1}$ and corrected against ambient air as background.

Figure 15:
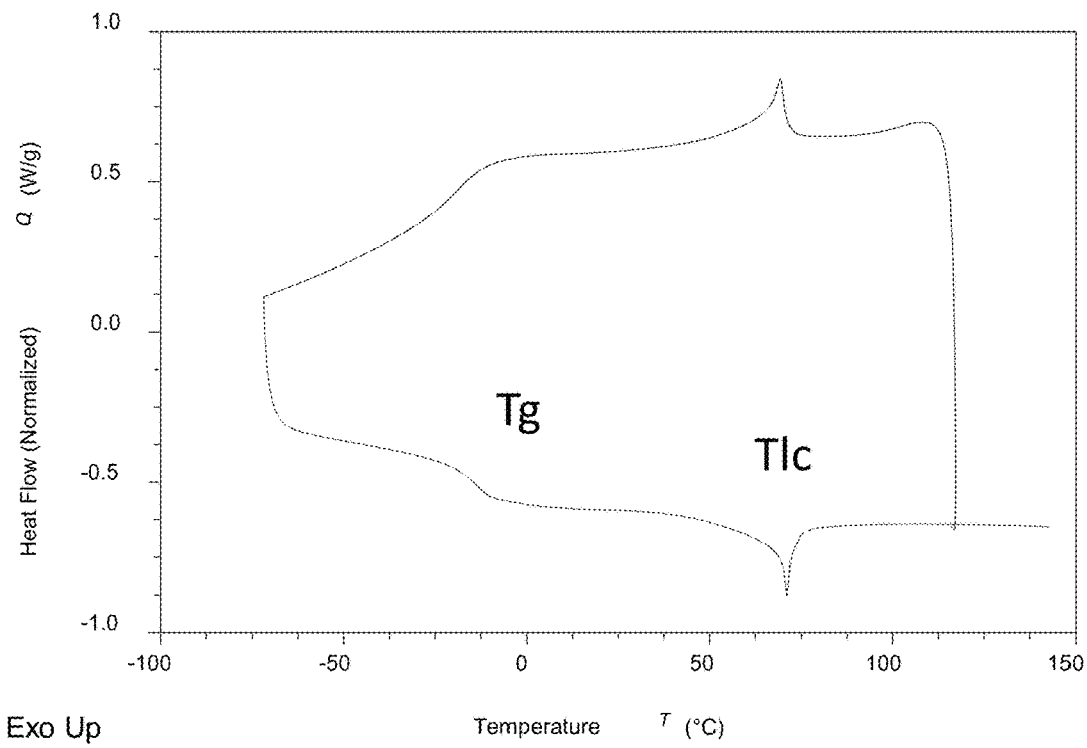
FIG. 15 is a DSC thermogram showing the glass transition temperature ($T_g$) and LC phase transition temperature ($T_{lc}$) for an LCN obtained from a composition comprising monomer 102, PETMP, and 2,2'-(ethane-1,2-diylbis(oxy))bis(ethane-1-thiol).
Figure 16:
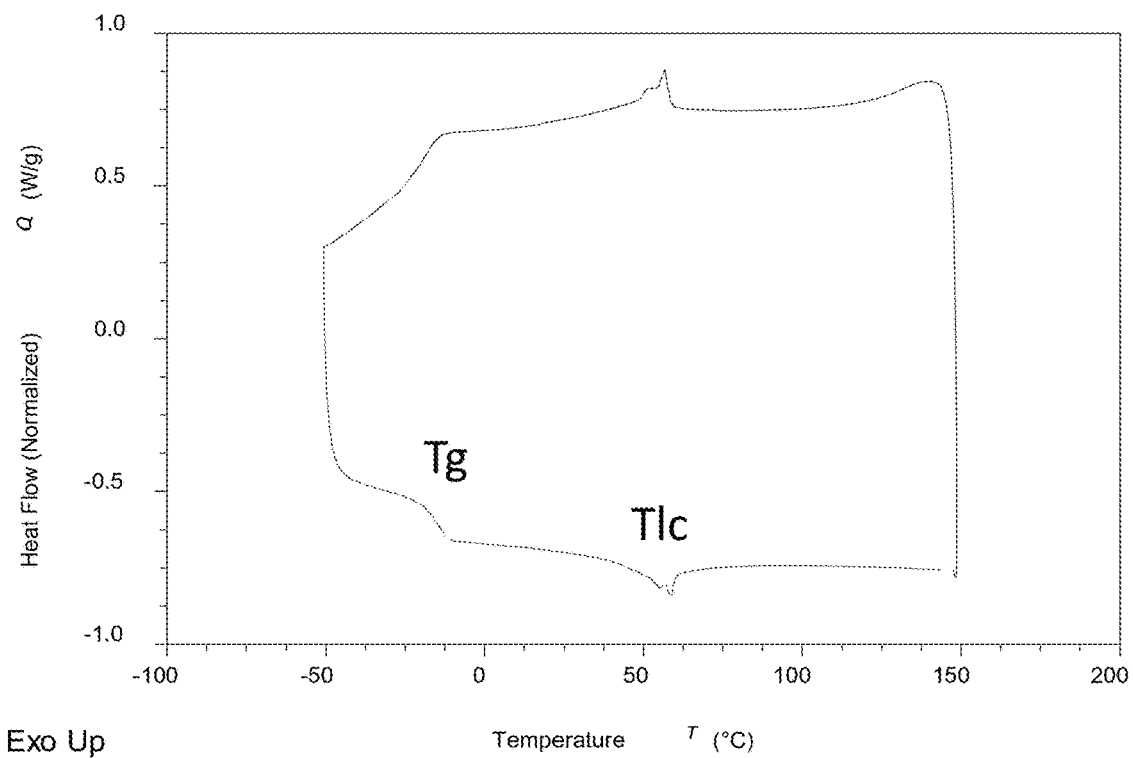
FIG. 16 is a DSC thermogram showing the glass transition temperature ($T_g$) and LC phase transition temperature ($T_{lc}$) for an LCN obtained from a composition comprising monomer 102, PETMP, and 1,4-bis(mercaptoacetoxy)butane ("BMAB").
Figure 17:
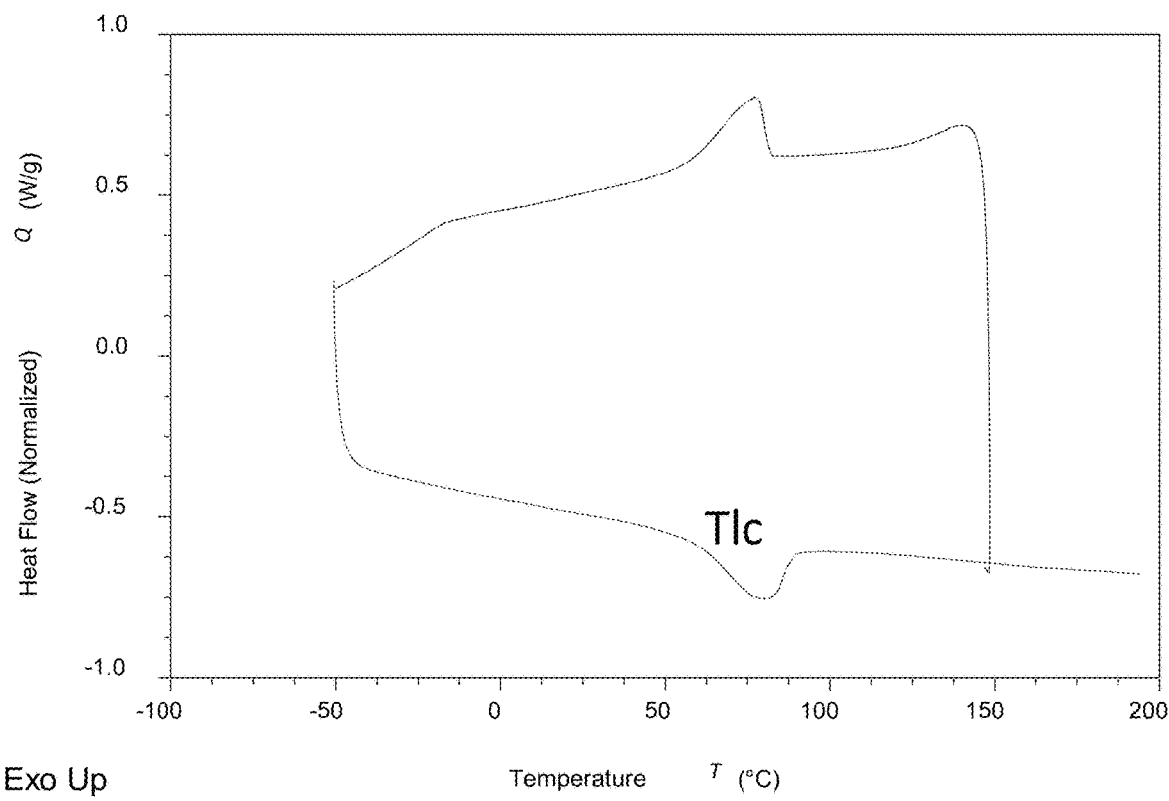
FIG. 17 is a DSC thermogram showing the glass transition temperature ($T_g$) and LC phase transition temperature ($T_{lc}$) for an LCN obtained from a composition comprising monomer 104, PETMP, and 2,2'-(ethane-1,2-diylbis(oxy))bis(ethane-1-thiol).
Figure 18:
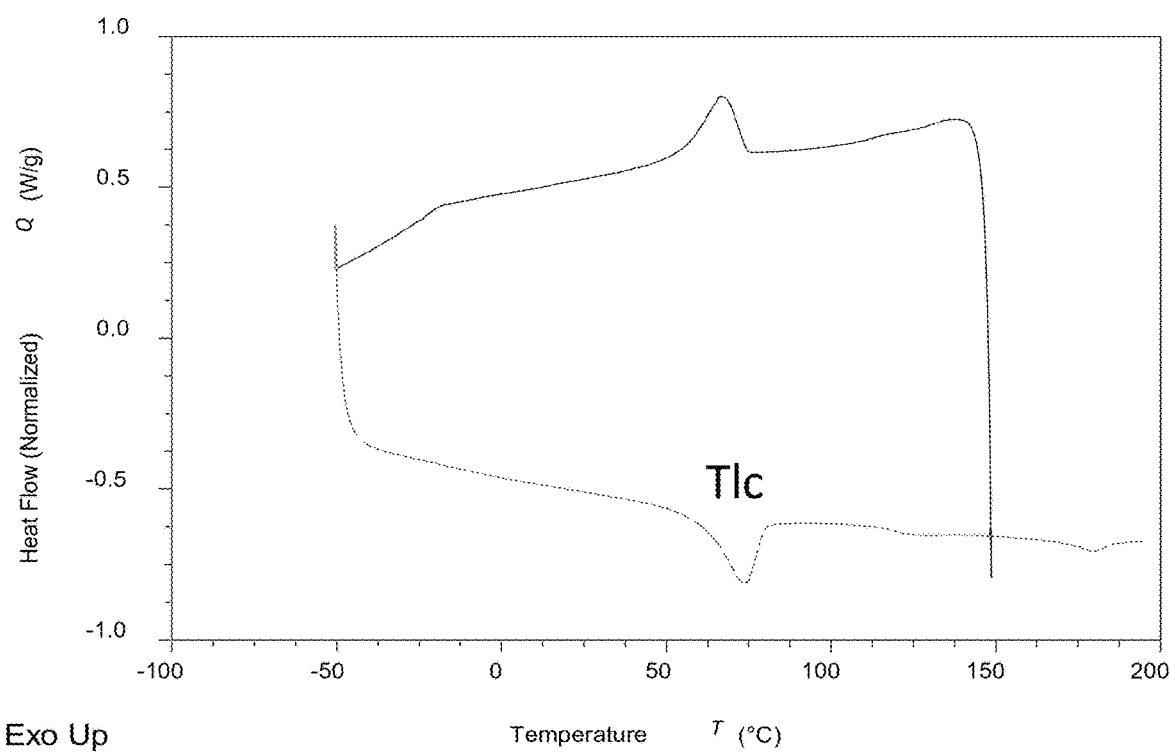
FIG. 18 is a DSC thermogram showing the glass transition temperature ($T_g$) and LC phase transition temperature ($T_{lc}$) for an LCN obtained from a composition comprising monomer 104, PETMP, and BMAB.
Figure 19:
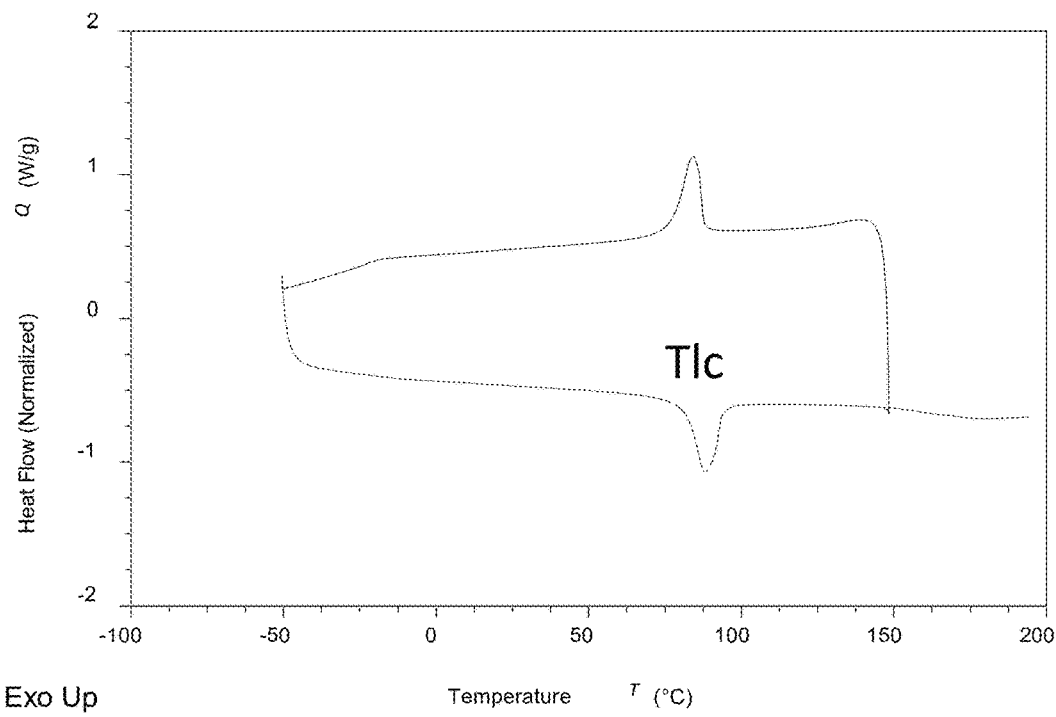
FIG. 19 is a DSC thermogram showing the glass transition temperature ($T_g$) and LC phase transition temperature ($T_{lc}$) for an LCN obtained from a composition comprising monomer 106, PETMP, and 2,2'-(ethane-1,2-diylbis(oxy))bis(ethane-1-thiol).
Figure 20:
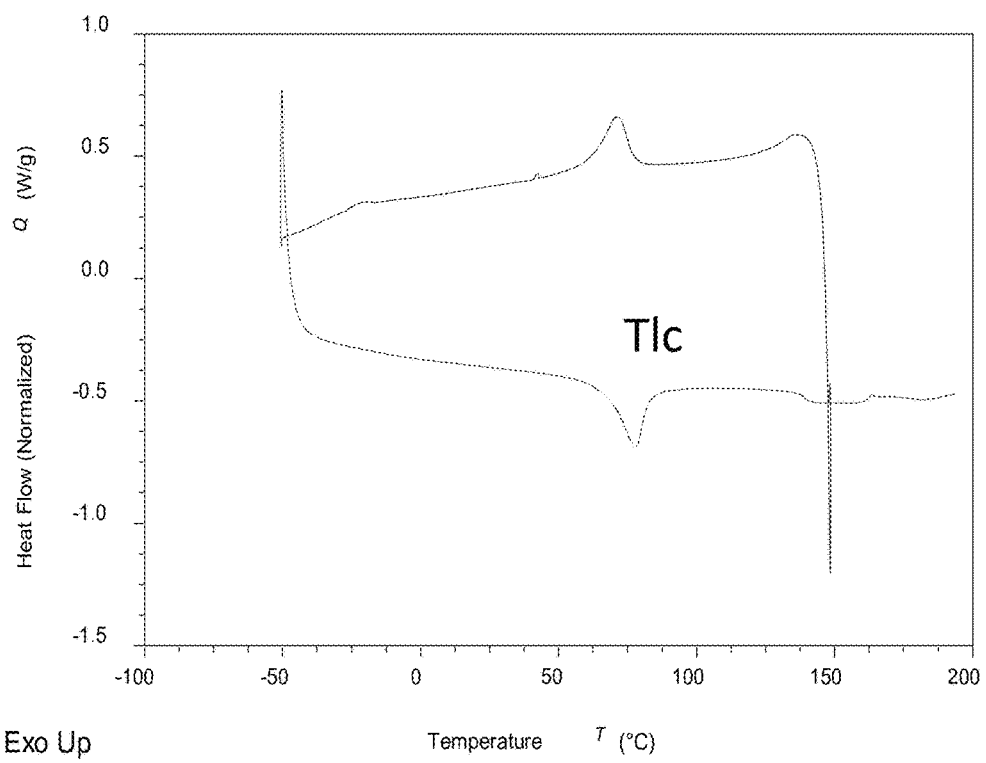
FIG. 20 is a DSC thermogram showing the glass transition temperature ($T_g$) and LC phase transition temperature ($T_{lc}$) for an LCN obtained from a composition comprising monomer 106, PETMP, and BMAB.
Figure 21:
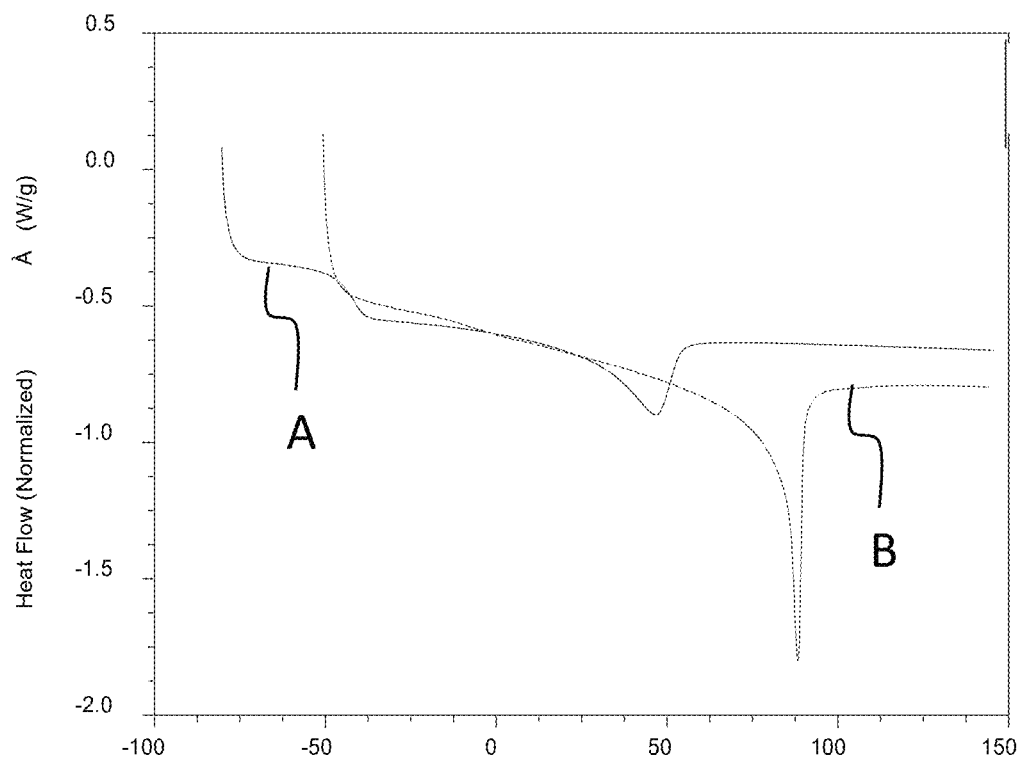
FIG. 21 is a DSC thermogram showing the glass transition temperature ($T_g$) and LC phase transition temperature ($T_{lc}$) for an LCN obtained from a composition comprising (i) monomer 100, PETMP, and BMAB (line B) and (ii) a composition comprising monomer 102, PETMP, BMAB, and a non-liquid crystalline divinyl monomer (namely, 3,6,9,12-tetraoxatetradeca-1,13-diene) (line A).

For the prepared LCN films with different compositions, the thermal and LC properties were characterized using a heat-cool-heat dynamic DSC scan. DSC measurements of the LCN films were performed using the same procedure used for characterizing the monomer. The glass transition temperature ($T_g$), LC phase transition temperature ($T_{lc}$), and enthalpy of the phase transition ($\Delta H_{lc}$) were determined from the second heating scan. The dynamic mechanical properties of the LCNs were characterized using a model Q800 dynamic mechanical analyzer (DMA) from TA Instruments. Rectangular LCN films with 5 mm width and 1 mm thickness were used for the DMA tests (oscillation, tensile, and shape memory). The length of the tested area of the samples was determined by the distance of the clamps and was 10 mm. The LCN films were heated from −50 to 280° C. at 3° C./min, under an oscillation frequency of 1 Hz, and at an amplitude of 25 μm in a tension mode. Static tensile tests were performed using the DMA. The LCN films were equilibrated at a temperature of 20° C. below their respective clearing point for 5 minutes, and then uniaxially stretched at a stress ramp rate of 0.2 MPa/min. DSC and DMA data were analyzed using the TRIOS software from TA Instruments. The LC structure of the LCN-146 at strain values of 0 and 200% was examined ex-situ using wide-angle X-ray scattering (WAXS). The X-ray scattering measurements were carried out using an Anton Paar SAXSess mc2. The X-rays were generated at 40 kV/50 mA, and the wavelength of the used X-ray beam was λ=1.541 Å (Cu Kα radiation). For wide-angle measurements, a sample-to-detector distance of 44.5 mm was used. The scattering patterns were recorded on a MultiSensitive Phosphor Screen, which were then digitized using a Cyclone Plus Storage Phosphor Scanner (Perkin Elmer). To study shape memory properties of the LCNs, cyclic thermomechanical tensile tests were carried out using the DMA in a controlled force mode. The strain of the LCNs was measured continuously under a constant stress of 0.1 MPa while the temperature was cycled between 70 to 150° C. at 2° C./min. Results obtained from an LCN embodiment formed with monomer 102, PETMP, and 2,2'-(ethane-1,2- diylbis(oxy))bis(ethane-1-thiol) are shown by FIG. 15 and FIG. 16 shows results for an LCN embodiment formed with the same monomer and crosslinker compound, but using BMAB as the chain extender compound. Results obtained from an LCN embodiment formed with monomer 104, PETMP, and 2,2'-(ethane-1,2-diylbis(oxy))bis(ethane-1-thiol) are shown by FIG. 17 and FIG. 18 shows results for an LCN embodiment formed with the same monomer and crosslinker compound, but using BMAB as the chain extender compound. Results obtained from an LCN embodiment formed with monomer 106, PETMP, and 2,2'-(ethane-1,2-diylbis(oxy))bis(ethane-1-thiol) are shown by FIG. 19, whereas FIG. 20 shows results from using the same monomer with PETMP and BMAB as the chain extender compound. FIG. 21 shows a DSC thermogram obtained from a composition comprising monomer 100, PETMP, BMAB and a composition comprising monomer 102, PETMP, BMAB, and a non-liquid crystalline divinyl monomer (namely, 3,6,9,12-tetraoxatetradeca-1,13-diene). In this embodiment, the non-liquid crystalline divinyl monomer was added to tailor the thermal transition of the LCN.

Figure 22:
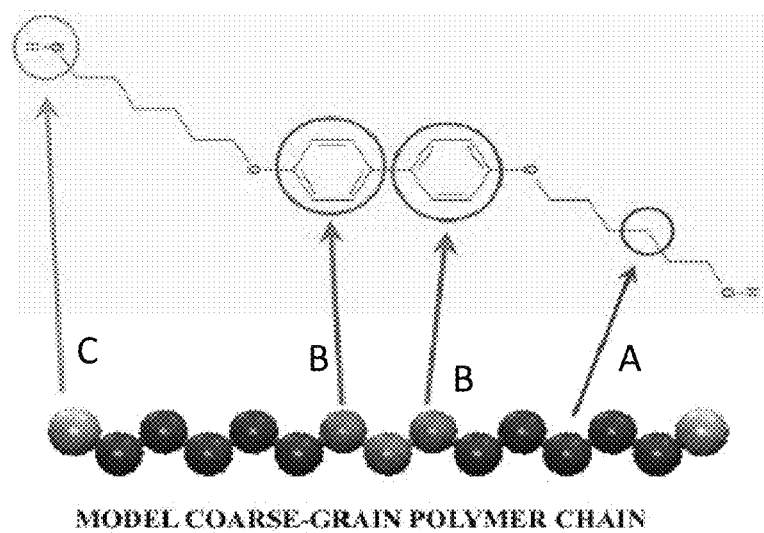
FIG. 22 is an image showing a coarse-grain model of a di-functionalized monomer precursor to monomer 100 and that highlights regions of the monomer involved in providing structural features of an LCN embodiment, such as flexible regions of the monomer (arrows A); mesogen regions that form LC structures (arrows B); and reactive ends that provide the polymerizable alkene regions of the monomer (arrows C).

Two sets of model coarse-grained polymer chain were constructed to simulate the LCNs prepared with and without the chain extender, as shown FIG. 22. The center benzene ring is represented by 3 coarse-grain beads (red) connected by two stiff bonds with a bond angle of 180°. The first, 'small-chain' system consists of 15 beads, while the second, 'large-chain', system has 35 beads in each chain. In the experiments, the increase in BMAB concentration increased the length of the oligomers by chemically extending the chain, and hence short and long chain polymers were used to computationally model systems technically equivalent to the experiments. For small-chain and large-chain systems, total 8000 and 3429 chains were simulated respectively. To keep the density constant, smaller number of chains were used in the large-chain system. Monomer sizes, represented by 6, were kept the same, but mass was normalized to $CH_2$ mass. A randomly generated initial system also was modeled. The simulations were performed on the randomly generated initial system. The central simulation cell size was 53×53×53 in reduced unit. Considering one reduced unit approximately 0.5 nm, the system size can be approximately 27 nm. Periodic Boundary Conditions (PBC) were used on all three dimensions. The simulations are performed using LAMMPS MD package.

Example 4

Figure 23:
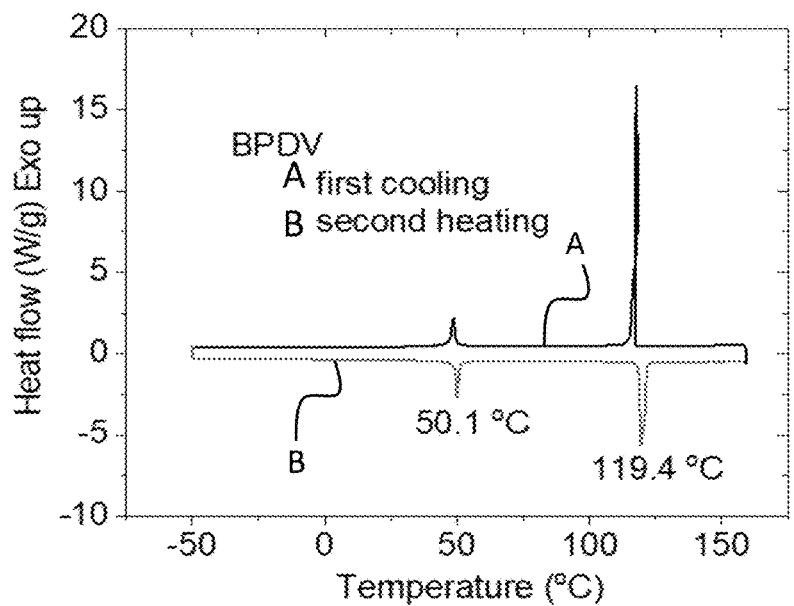
FIG. 23 shows a DSC thermogram of monomer 100, which shows a solid-solid phase transition at 50.1° C. and solid-liquid phase transition at 119.4° C.; the monomer was scanned at a heating and cooling rate of 10° C./min.
Figure 24:
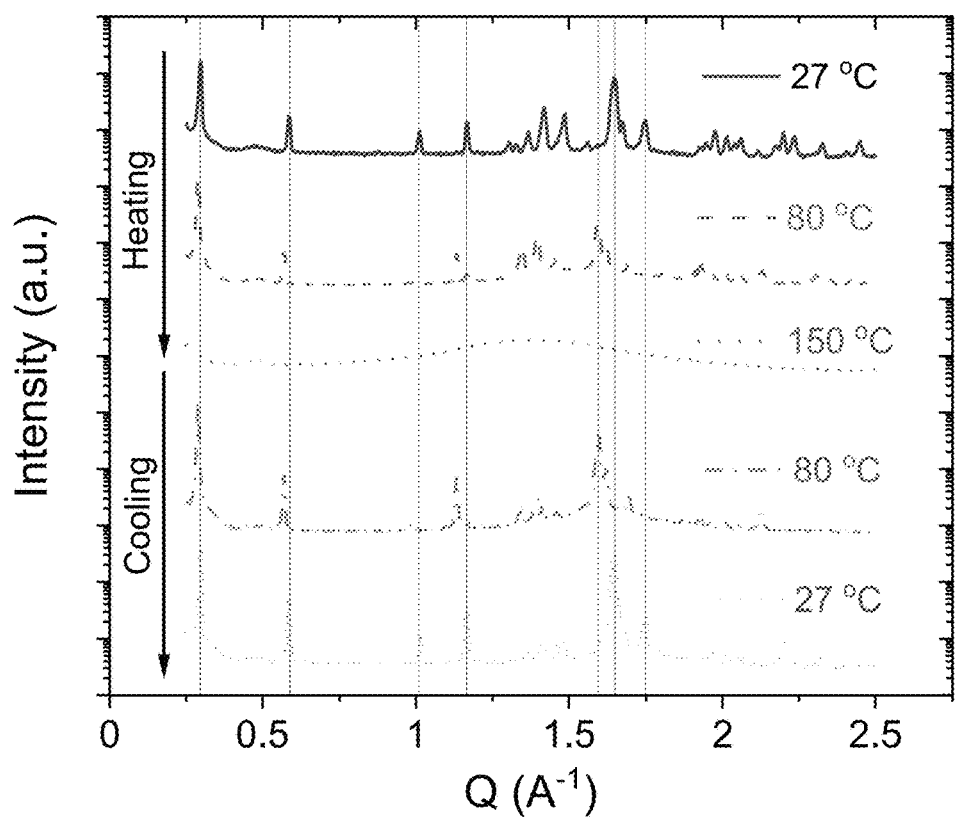
FIG. 24 shows X-ray diffraction (XRD) spectra of monomer 100 at different temperatures showing two reversible structure changes.

From the DSC thermogram of the synthesized BPDV (FIG. 23), the monomer was observed to exhibit two endothermic peaks at 50.1 and 119.4° C., respectively, during the heating process. Without being limited to a particular theory of operation, it currently is believed that the first peak was caused by the change of crystal structure of the monomer as it remained solid after the thermal transition and the second peak was attributed to the melting point of BPDV. Upon cooling, two exothermic peaks were observed, corresponding to the two transitions in the heating process. No LC phase was observed on either heating or cooling as confirmed by the lack of birefringence under polarized light, indicating a non-LC nature of the monomer. To correlate the thermal transitions with structure changes of the monomer, high temperature XRD experiments were performed at 27° C., 80° C., 150° C. on heating and 80° C. and 27° C. on cooling. The XRD spectra are shown in FIG. 24. A change of crystal structure was observed when the monomer was heated to 80° C., as indicated by the shift of the XRD peaks and the formation of new peaks. When heated to 150° C., the monomer lost all the short-range order, indicating a molten state. After cooled to 80° C. and further to 27° C., the intermediate and the original XRD spectra were recovered, respectively.

Example 5

In this example, the chain extender, BMAB, which possesses a glycolate esters structure, was used. This led to a higher reaction rate due to weakened sulfur-hydrogen bond resulting from the hydrogen bonding between the thiol and ester carbonyl groups. The increased reaction rate allowed for a higher reaction probability between BPDV and BMAB, thereby facilitating the rigid molecules to organize into an ordered LC phase. To further elucidate the structure-property relationship, other factors affecting the curing reaction, such as initiator concentration and UV light intensity, were investigated by curing a small amount of sample in a DSC pan. Following the photo-curing experiments, thermal and LC properties of the LCNs were examined by dynamic DSC scans.

Figure 25:
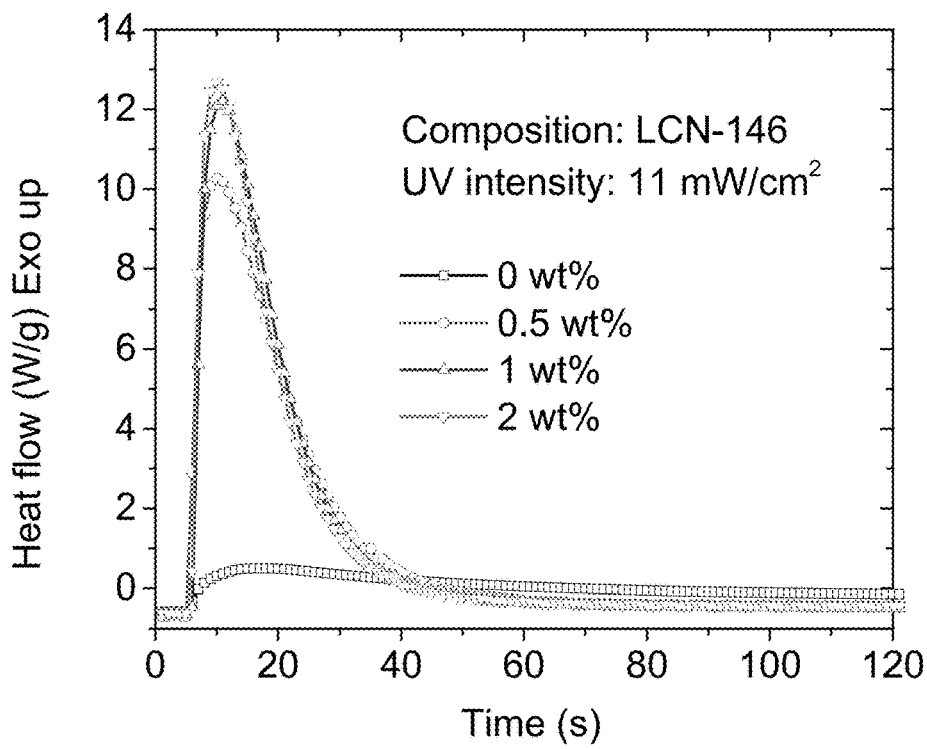
FIG. 25 shows DSC curing curves of the LCN-146 embodiment disclosed herein (see Table 1) that was photo-cured at 11 mW/cm$^2$ with different initiator concentrations.
Figure 26:
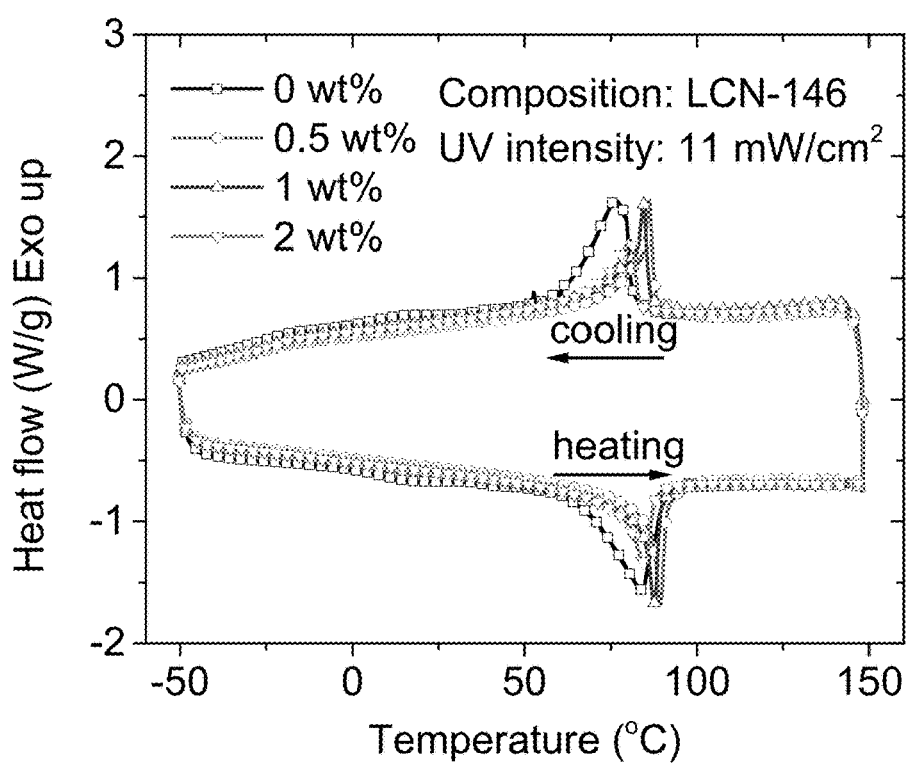
FIG. 26 shows dynamic DSC scans of the LCN-146 embodiment with different initiator concentrations.

The effect of initiator concentration on the curing behavior of the LCNs was studied using a fixed composition (LCN-146) and a fixed UV intensity of 11 mW/cm². As can be seen from FIG. 25, the curing reaction started as soon as the UV light was turned on even for the LCN sample without a photoinitiator. Without being limited to a single theory of operation, it currently is believed that this unexpected behavior might be caused by the decay of the thiol groups in BMAB or PETMP that generated thiyl radicals upon the exposure of the UV light. However, for the LCNs cured with a photoinitiator, nearly all of the reaction was completed within 60 seconds. Interestingly, the heat of reaction decreased with increasing concentration of the photoinitiator, which was attributed to the reduction of liquid crystallinity because of the high crosslinking rate when more photoinitiator was present in the system. FIG. 26 shows dynamic DSC scans of the LCNs cured with different initiator concentration, where $T_{lc}$ and $\Delta H_{lc}$ were determined as the peak temperature of the phase transition and the associated enthalpy, respectively. Detailed values of $T_{lc}$ and $\Delta H_{lc}$ are summarized in Table 2. A reduction of liquid crystallinity was observed with the increasing initiator concentration, which agrees with heat of reaction values determined from the photocuring experiment.

TABLE 2

Effect of initiator concentration and UV intensity on cure behavior and LC properties of a model LCN-146 system.

| Effect of Initiator Concentration | | | |
| --- | --- | --- | --- |
| Initiator concentration (wt %) | Heat of reaction (J/g) | $T_{lc}$ (° C.) | $\Delta H_{lc}$ (J/g) |
| 0 | 22.9 | 83.9 | 44.2 |
| 0.5 | 215.3 | 89.3 | 26.6 |
| 1.0 | 207.0 | 87.5 | 24.6 |
| 2.0 | 196.6 | 84.8 | 22.1 |

| Effect of UV Intensity | | | |
| --- | --- | --- | --- |
| UV intensity (mW/cm²) | Heat of reaction (J/g) | $T_{lc}$ (° C.) | $\Delta H_{lc}$ (J/g) |
| 2.2 | 174.9 | 90.0 | 31.7 |
| 5.6 | 204.5 | 88.4 | 28.8 |

TABLE 2-continued

Effect of initiator concentration and UV intensity on cure behavior and LC properties of a model LCN-146 system.

| 11.0 | 208.1 | 86.5 | 25.6 |
| 21.4 | 210.2 | 85.8 | 24.8 |
| 39.0 | 215.1 | 84.7 | 24.5 |

Figure 27:
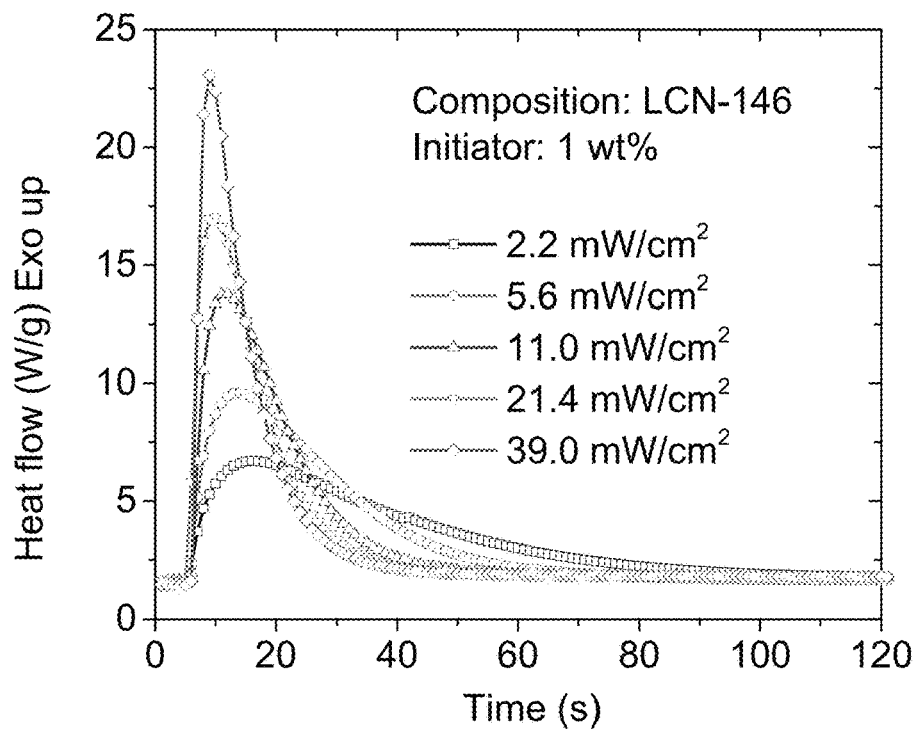
FIG. 27 shows DSC curing curves of the LCN-146 embodiment photo-cured at an initiator concentration of 1 wt % at different ultra-violet ("UV") intensities.
Figure 28:
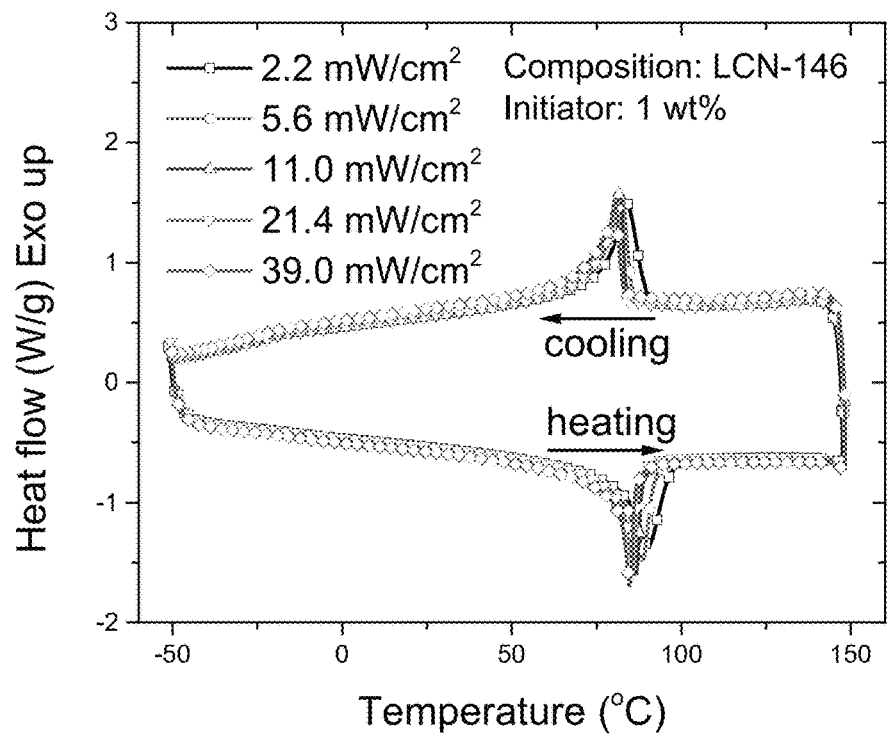
FIG. 28 shows dynamic DSC scans of the LCN-146 embodiment cured at different UV intensities.

Similar to the study of initiator concentration, the effect of UV intensity on the curing behavior of the LCNs was investigated using a fixed composition (LCN-146) and a fixed initiator concentration of 1 wt %. The DSC curing scans are shown in FIG. 27, the LC properties of the cured LCNs are shown in FIG. 28, and the data determined from the DSC results are summarized in Table 2. A higher level of UV intensity led to a faster reaction rate, accelerating the formation of the crosslinked network. This limited the amount of time that the rigid molecules needed to self-assemble into an LC phase, resulting in a reduction of liquid crystallinity.

Figure 29:
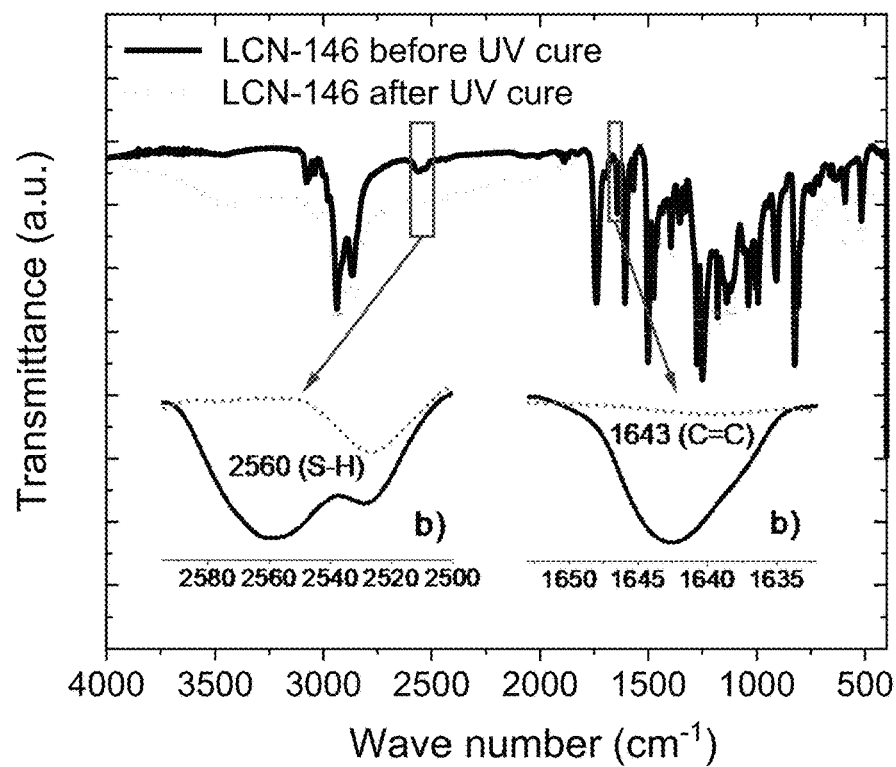
FIG. 29 shows Fourier Transform Infrared ("FTIR") spectra of the LCN-146 embodiment before and after a UV curing reaction, wherein the change of S=H and C=C bonds can be observed.
Figure 30:
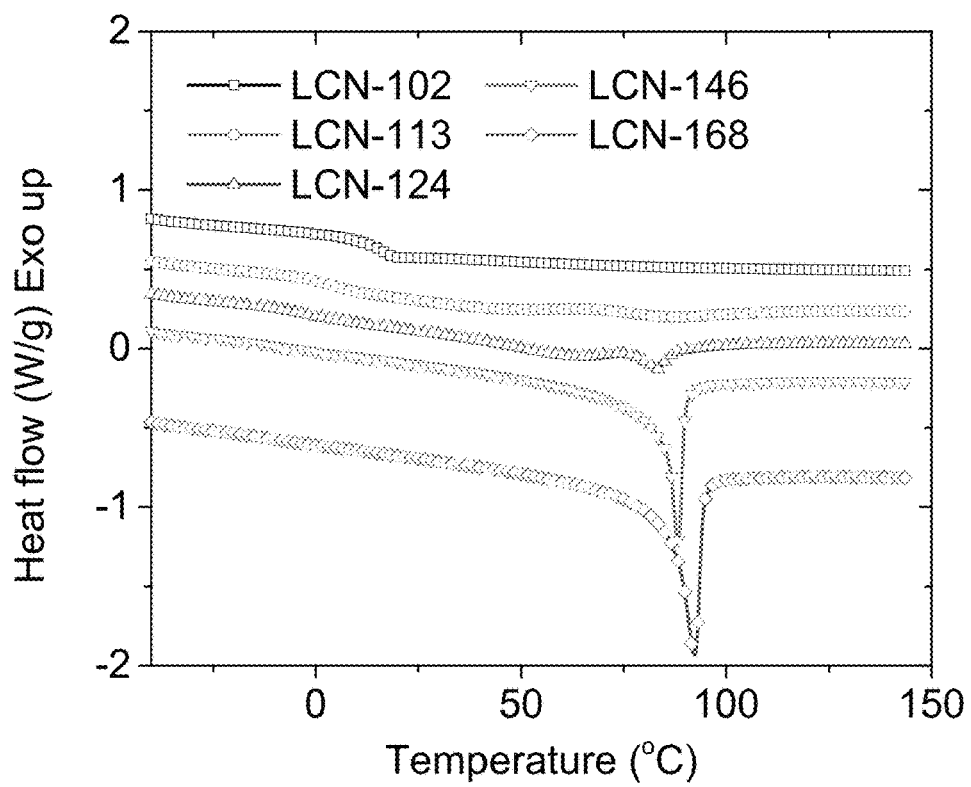
FIG. 30 shows dynamic DSC scans of LCN embodiments made with composition embodiments comprising different amounts of compositional compounds as outlined in Table 1.
Figure 31:
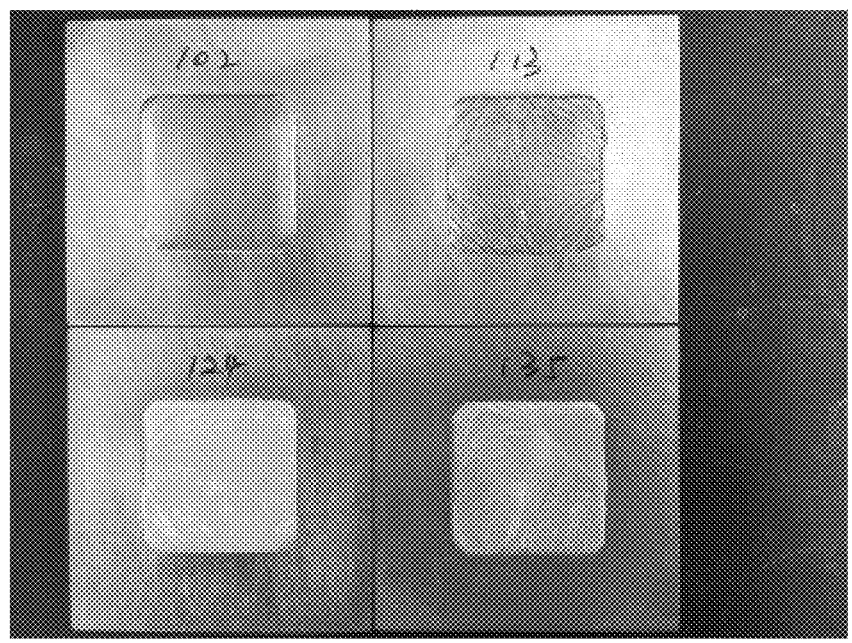
FIG. 31 is a photographic image showing the optical appearance of cured LCN embodiments made using composition embodiments with different amounts of compositional compounds as outlined in Table 1.

In order to study the effect of chemical composition on the thermal and LC properties of the LCNs, LCN films with different compositions were synthesized by varying the molar ratio of the crosslinker, chain extender, and monomer. The initiator concentration and UV intensity were fixed at 1 wt % and 5.6 mW/cm², respectively. First, the thiol-ene reaction was evaluated using FTIR on a model LCN-146 sample, as shown in FIG. 29. The absorption peak at 2560, and 1643 cm$^{-1}$ are attributed to the stretching vibration of the S—H bonds and C═C bonds, respectively. Both groups were detected in the uncured LCN-146 system. A shoulder was also observed for the absorption peak at 2560 cm$^{-1}$, which may be caused by the pre-melting process resulting in a decay of the thiol groups. After UV irradiation, both peaks disappeared in the FTIR spectra, confirming the reaction between the thiol and vinyl groups in the system. Then, the thermal and LC properties of the LCNs with different compositions were evaluated. The DSC scans of fully cured samples are shown in FIG. 30. Compared to initiator concentration and UV intensity, the chemical composition showed a greater influence on the thermal and LC properties of the LCNs. For example, LCN-102 exhibited a $T_g$ of 8.9° C. and no LC phase transition was observed. This is attributed to the rapid formation of a highly crosslinked network, inhibiting self-assembly of the rigid molecules. Also, the prepared LCN-102 film was optically transparent (FIG. 31), indicating an amorphous network structure. In the case of LCN-113, the introduction of the chain extender allowed for the formation of a relatively linear oligomer which then self-organized into an LC phase. As a result, a wide, small dip centered at 87.5° C. was observed in the DSC scan, indicating the transition of the LCN from an LC phase to an isotropic phase. However, the LCN-113 film still appeared mostly transparent, suggesting that a limited amount of LC domains were present in the network. As the molar percentage of the chain extender increased, the endothermic peak caused by the LC phase transition became more pronounced because the rigid molecules self-assembled into a highly ordered structure. Both LCN-146 and LCN-168 films were optically opaque because of the light scattering at the boundary between amorphous and liquid crystalline regions. They also exhibited a large amount of enthalpy related to the LC phase transition, indicating a high degree of liquid crystallinity. In addition, for LCN-146 and LCN-148 samples, the high enthalpy value of the phase transition might be related to crystallization of the alkyl chains as these two samples were more linear than other LCN samples. A 19° C. drop in $T_g$ from sample LCN-102 to LCN-146 was observed. It is worth mentioning that the LC domains greatly restricted the relaxation of polymer chains in the amorphous region, which suppressed the step change in the heat flow signal for LCN-146 and LCN-168 samples, making it difficult to detect $T_g$ of the LCNs from DSC experiments. The DSC results on thermal and LC properties of the LCNs with different compositions are summarized in Table 3.

TABLE 3

DSC results of the LCNs with different compositions

| | Mole fraction of BMAB (%) | $T_g$ (° C.) | $T_{lc}$ (° C.) | $\Delta H_{lc}$ (J/g) |
|---|---|---|---|---|
| LCN-102 | 0 | 14.1 | N/A | N/A |
| LCN-113 | 20.0 | 4.1 | 87.7 | 2.7 |
| LCN-124 | 28.6 | −2.4 | 83.3 | 10.4 |
| LCN-146 | 36.4 | −5.4 | 88.4 | 24.0 |
| LCN-168 | 40.0 | N/A | 92.3 | 31.0 |

Example 6

Figure 32:
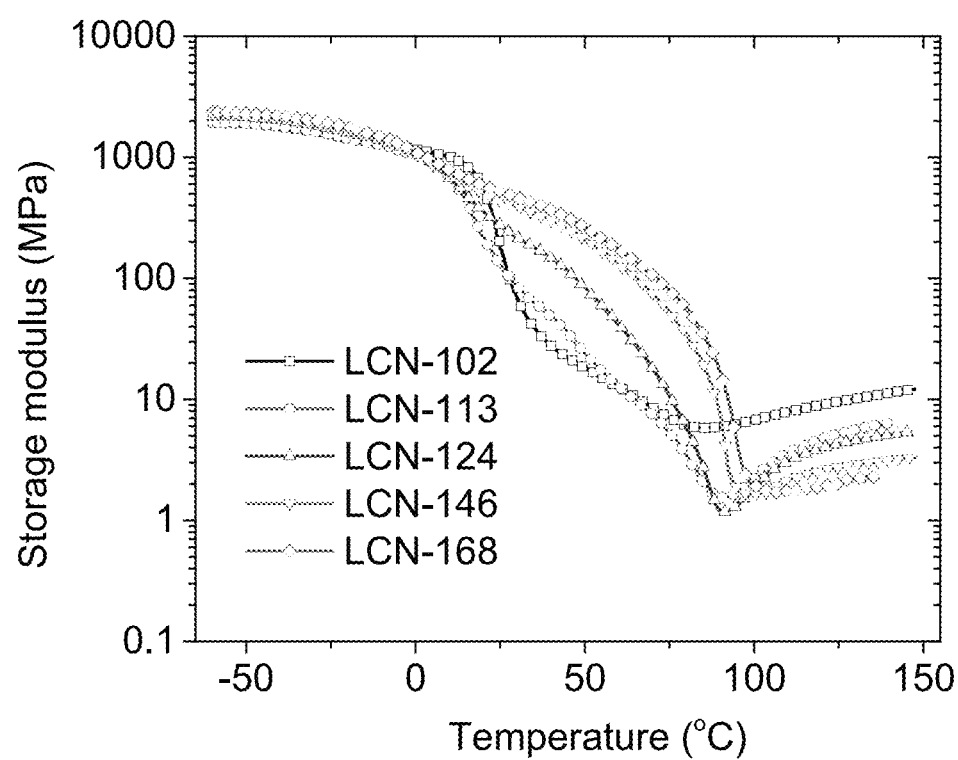
FIG. 32 is a graph of storage modulus (MPa) as a function of temperature (° C.), which shows storage moduli of LCN embodiments made with composition embodiments comprising different amounts of compositional compounds as outlined in Table 1, wherein the storage modulus was determined from oscillating dynamic mechanical tests.
Figure 33:
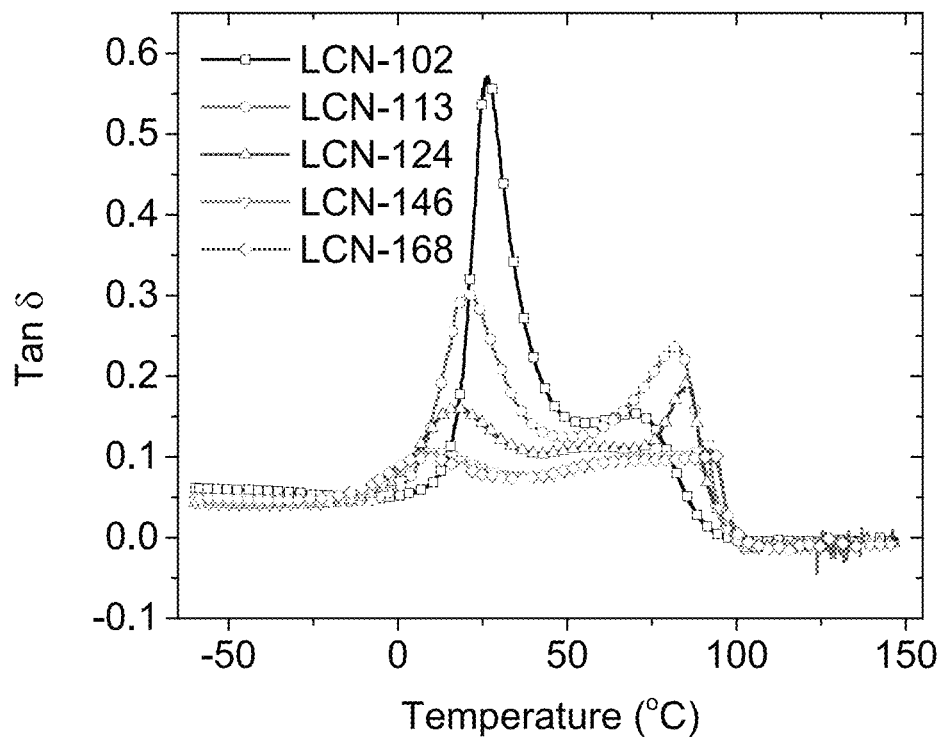
FIG. 33 is a graph showing the dissipation factor of LCN embodiments made with composition embodiments comprising different amounts of compositional compounds as outlined in Table 1, wherein the dissipation factor was determined from oscillating dynamic mechanical tests.

The prepared LCN films were investigated using dynamic mechanical analysis to understand the effect of chemical composition on thermal relaxations of the LCNs. FIGS. 32 and 33 show the change of storage modulus and dissipation factor of the LCNs as a function of temperature, respectively. Transition temperatures, $T_g$ and $T_{lc}$, were determined from the tan delta curves and are tabulated in Table 4. For all the compositions tested, two consecutive thermal relaxations were observed and were attributed to the glass transition of the amorphous region and the phase transition of the LC region, respectively. The presence of the LC domains influenced dynamic mechanical properties of the LCNs in some embodiments. For example, in some embodiments, below the glass transition temperature, LCNs with higher liquid crystallinity showed an increased elastic behavior with higher values of storage modulus in the glassy region even though the mole fraction of the rigid BPDV molecules in the system was decreased. As the LCNs passed through the glass transition, the LC domains remained stable, restricting the motion of the polymer chains in the amorphous region. It can be seen in FIG. 32 that LCNs with higher liquid crystallinity exhibited a smaller drop of storage modulus as the materials went through the glass transition. However, after the LC phase transition, the LC domains no longer existed, and the materials changed into an isotropic phase and behave like traditional rubbers. At this point, the storage modulus of the LCNs were solely influenced by the crosslink density of the materials. In the process of the LC phase transition, an abrupt drop and recovery of the storage modulus was observed for the LCNs. This was caused by the alignment of the LC domains in response to the applied oscillating stress. The behavior was more noticeable for LCN-113 and LCN-124, which was related to the relatively low rigidity and liquid crystallinity of these two compositions.

TABLE 4

DMA results of the LCNs with different compositions

| | Mole fraction of BPDV (%) | $T_g$ (° C.) | $T_{lc}$ (° C.) | Storage modulus at −50° C. (MPa) | Storage modulus at 130° C. (MPa) |
|---|---|---|---|---|---|
| LCN-102 | 66.7 | 26.3 | 69.8 | 1917 | 9.6 |
| LCN-113 | 60.0 | 20.9 | 82.2 | 1903 | 5.2 |
| LCN-124 | 57.1 | 17.1 | 85.5 | 2155 | 4.3 |
| LCN-146 | 54.5 | 11.4 | 91.3 | 2248 | 2.8 |
| LCN-168 | 53.3 | 8.3 | 92.4 | 2312 | 2.0 |

Example 7

Figure 34A:
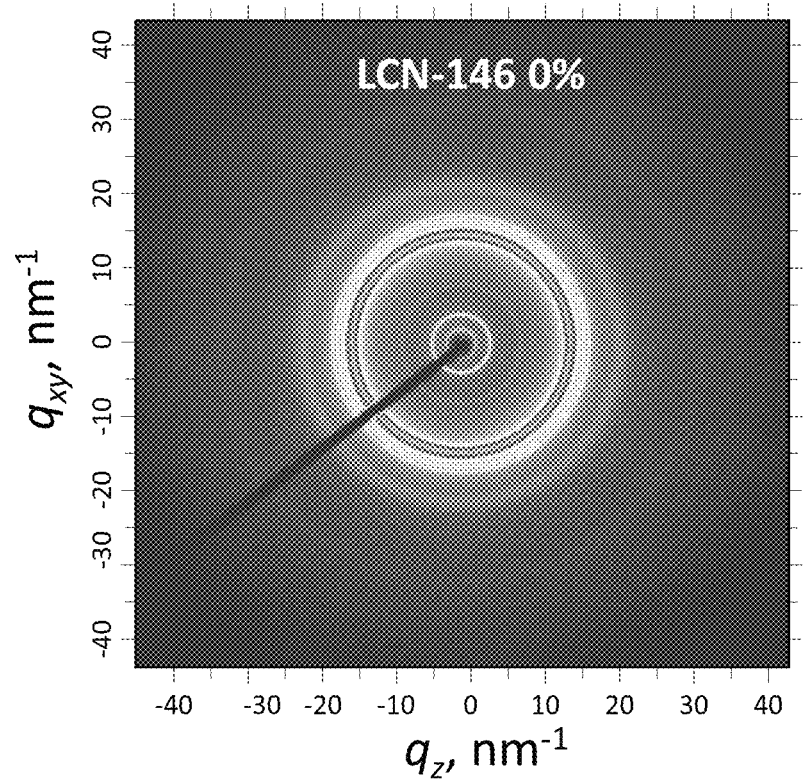
FIGS. 34A and 34B show wide-angle X-ray scattering ("WAXS") images of a film comprising LCN-146 without strain (FIG. 34A) and WAXS of the LCN-146 film with a strain of 200% (FIG. 34B).
Figure 34B:
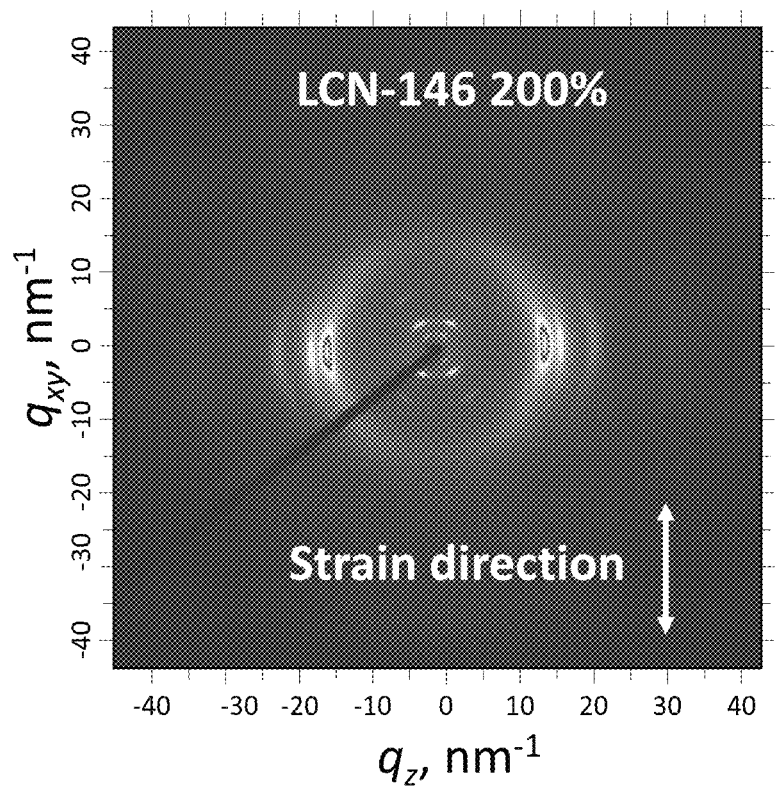
Figure 36A:
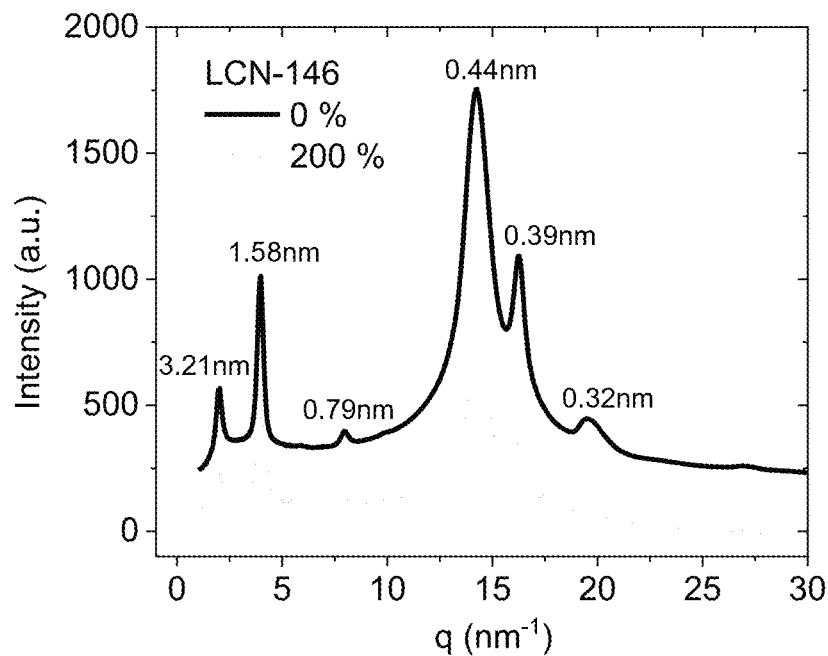
FIGS. 36A-36C show (i) quantified WAXS data of LCN-146-based films with and without strain (FIG. 36A); (ii) azimuthal intensity distribution of the scattering peak at q=3.98 nm$^{-1}$ showing uniaxial orientation of the LCN (FIG. 36B); and (iii) stress-strain behavior of the LCN embodiments made with composition embodiments comprising different amounts of compositional compounds as outlined in Table 1 (FIG. 36C).
Figure 36B:
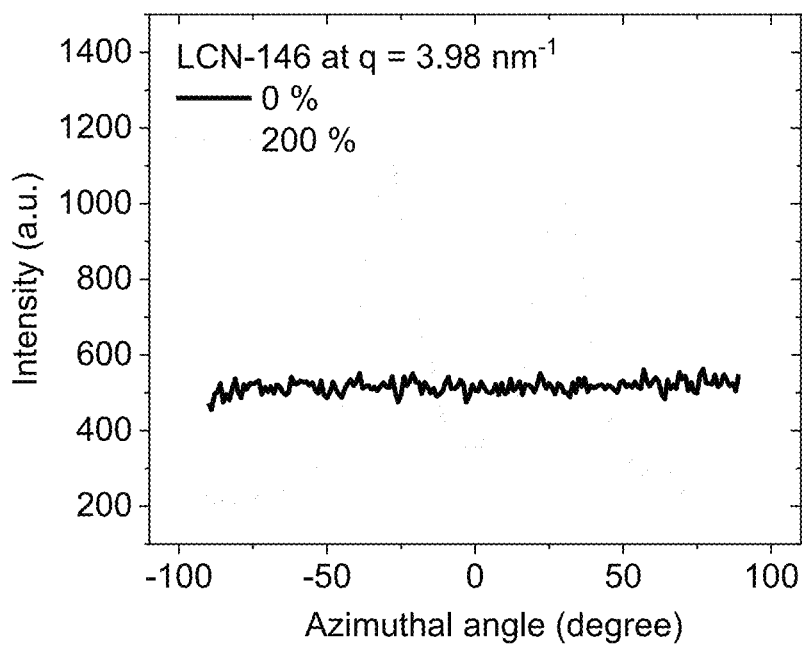

In this example, 2D WAXS experiments were performed. LCN-146 was used as a model system and the scattering pattern of the as-prepared film is shown in FIG. 34A, indicating the presence of a layered smectic ordering. The LCN film was then uniaxially stretched to a strain of 200% at 71° C. (between $T_g$ and $T_{lc}$) to induce a LC orientation. The strain was preserved by cooling the material to room temperature, and the resulting orientation was examined ex-situ (FIG. 34B). After orientation, the inner scattering rings (q=1.95, 3.98, and 7.99 nm-1) split into two sets of scattering arcs, implying the formation of a chevron smectic C LC phase (schematically shown in FIG. 35). The two observed orientation axes corresponded to the tilted smectic layers. The outer rings (q=14.26, 16.27, and 19.48 nm-1), on the other hand, split into two scattering arcs in the equatorial direction, indicating that the long axis of the mesogens as well as the hydrocarbon chains were oriented in the strain direction. The multiple outer rings also indicated the presence of semi-crystalline regions formed by the hydrocarbon chains. The 2D scattering patterns were quantified by integrating along the q direction (FIG. 36A). The azimuthal scan at q=3.98 nm-1 was shown in FIG. 36B to demonstrate the orientation of the LCNs. Order parameter of the aligned LCN was calculated according to Herman's method, which was determined to be 0.25 at 200% strain.

Figure 36C:
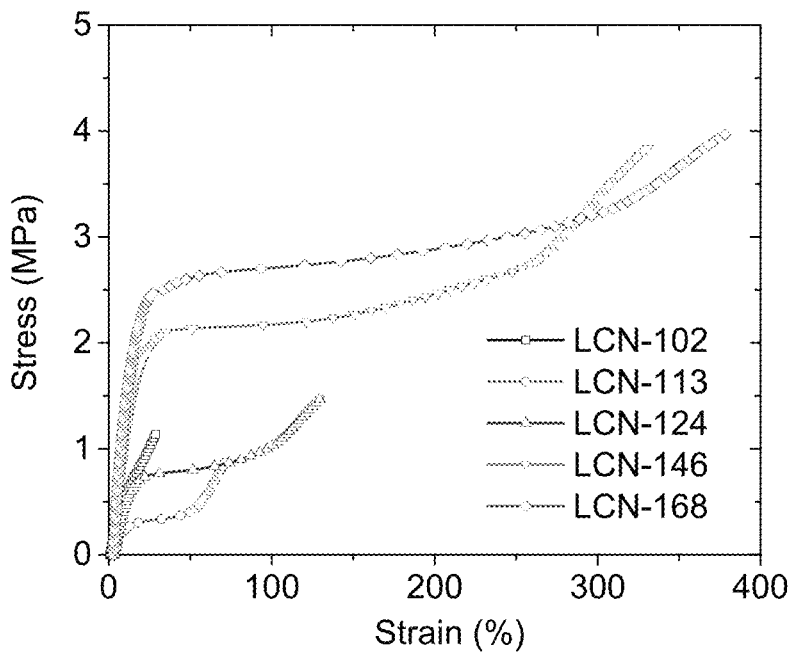
Figure 37A:
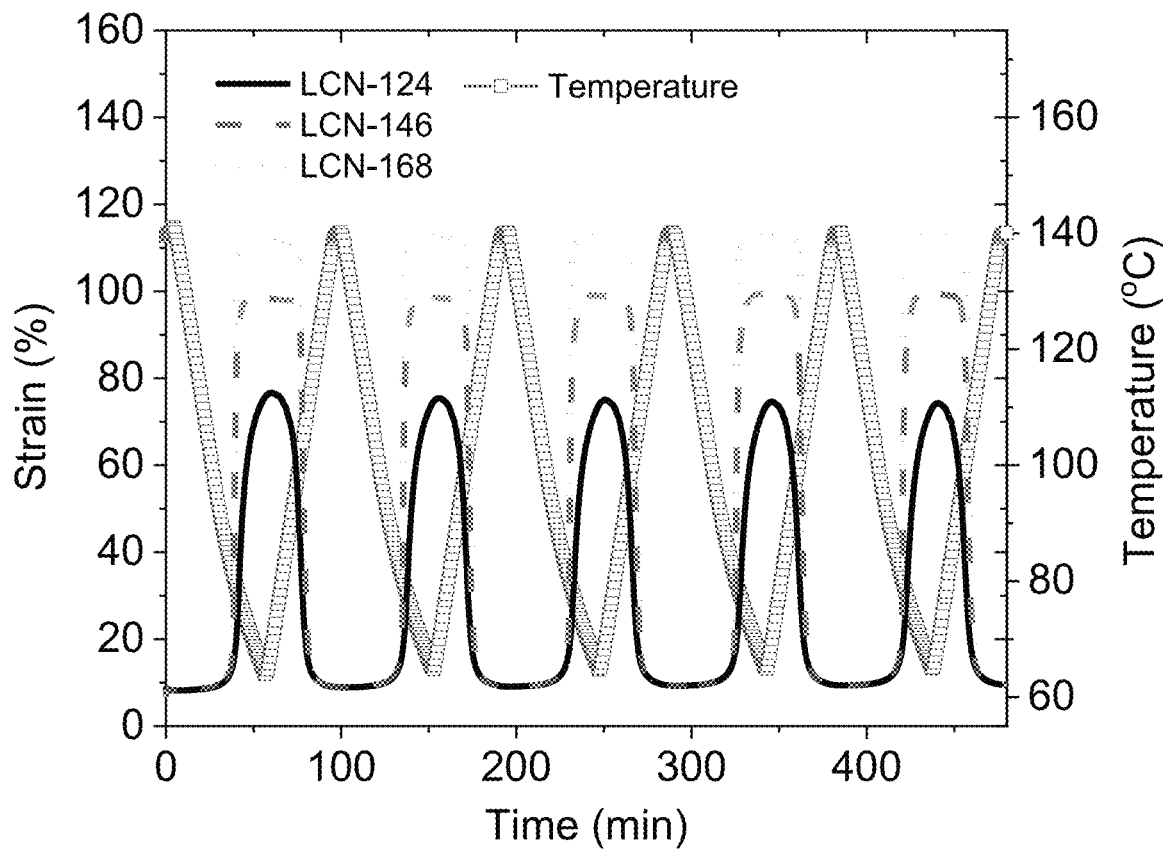
FIGS. 37A and 37B show (i) cyclic thermomechanical tensile test of the LCN-124, LCN-146, and LCN-168 embodiments showing reversible shape change of the materials (FIG. 37A); and (ii) cyclic thermomechanical tensile test of the LCN-124, LCN-146, and LCN-168 embodiments showing the effect of composition on actuating strain of the materials (FIG. 37B).
Figure 37B:
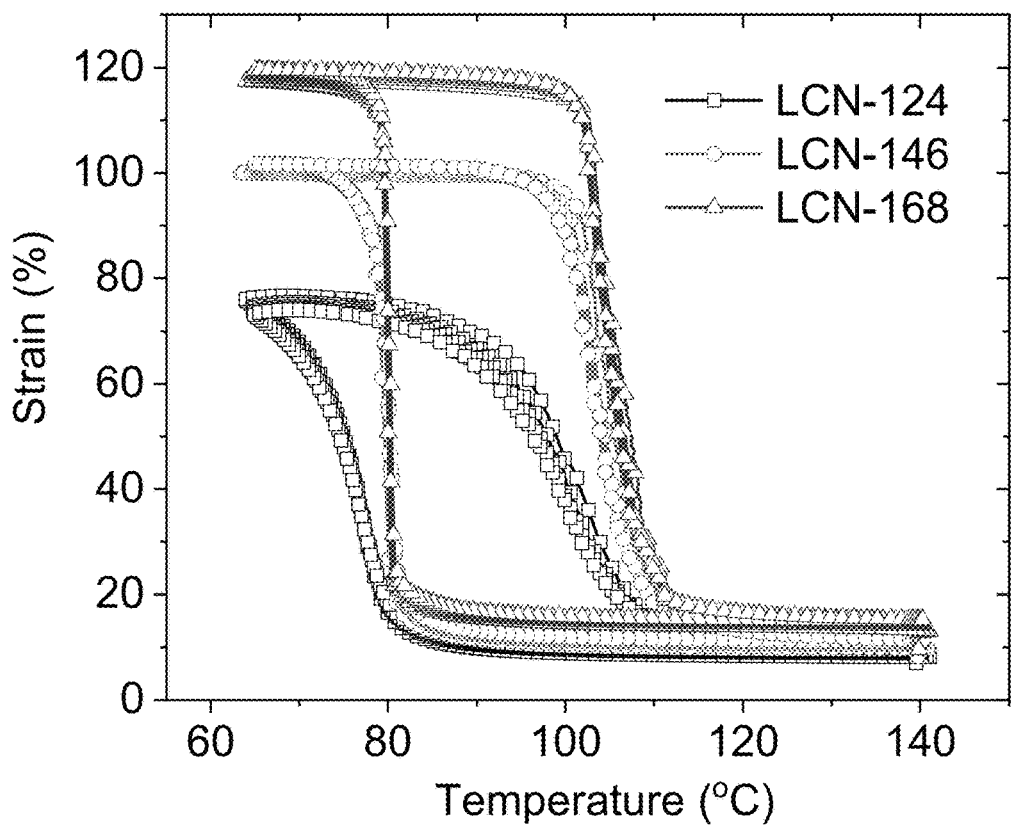

One of the interesting properties of LCNs is their soft elasticity which is enabled by the reorientation of the LC domains under small applied forces. As discussed herein, the composition of the LCNs can influence their LC structure. This difference in liquid crystallinity can be observed due to different their mechanical behavior during static tensile tests, as shown in FIG. 36C. In some embodiments, LCNs with higher liquid crystallinities generally exhibited higher strain values at break and longer plateau regions in the stress-strain curves, owing to the large number of LC domains capable of changing orientation in response to the applied uniaxial force. FIGS. 37A and 37B illustrate the reversible shape change of the LCNs by combining their macroscopic orientation and reversible phase transition characteristics which are responsible for elongation and contraction in a thermomechanical tensile test, respectively. Generally, the LCNs showed reliable shape memory behavior but a slight difference in the strain values was observed due to the difference in liquid crystallinity.

Example 8

In this example, the structural details of the LCNs were evaluated using MD simulation. In particular, MD simulations were performed for two different scenarios, a large-chain and a small-chain LCN representing higher and lower concentration of BMAB, respectively to understand the effect of BMAB concentration.

Figure 38A:
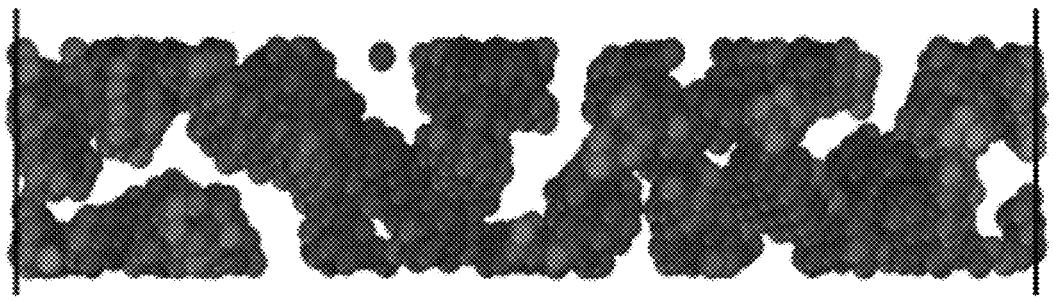
Figure 38B:
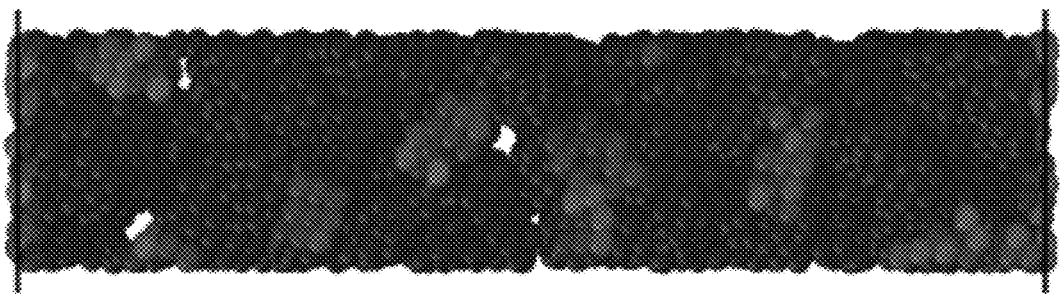
Figure 39A:
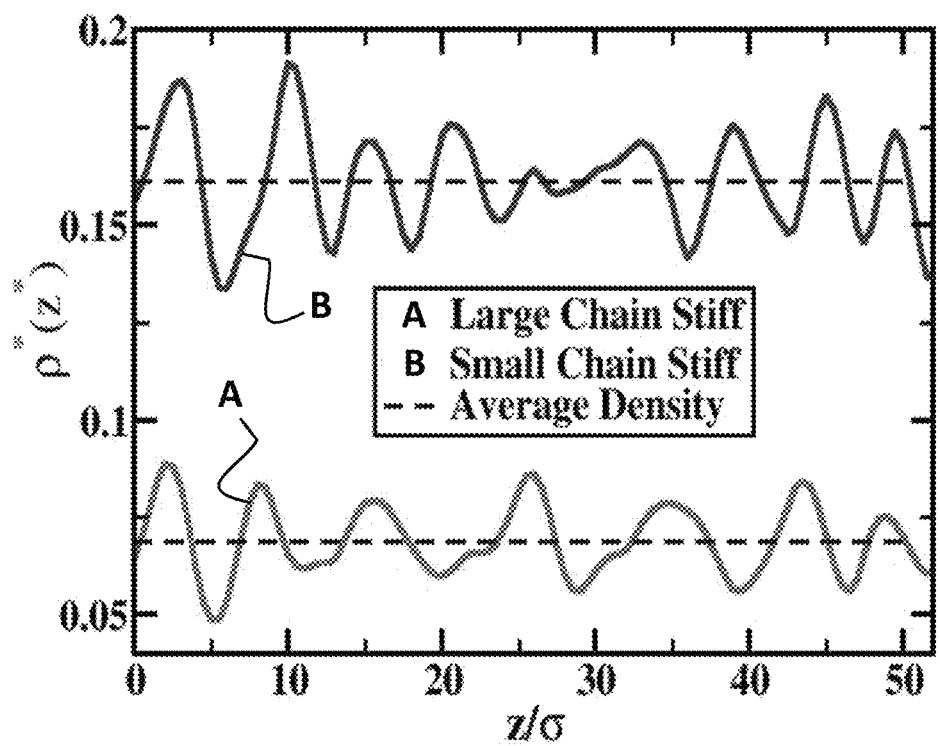
FIGS. 39A and 39B show (i) the density distribution along z-axis of stiff mesogens of an LCN embodiment, wherein the density distribution of large-chain LCN (line A) shows ordered LC layers of density profile and small-chain LCN (line B) showed some breakdown of the LC ordering (FIG. 39A); and the radial distribution function for stiff mesogens and flexible chains for both large-chain and small-chain systems (FIG. 39B).
Figure 39B:
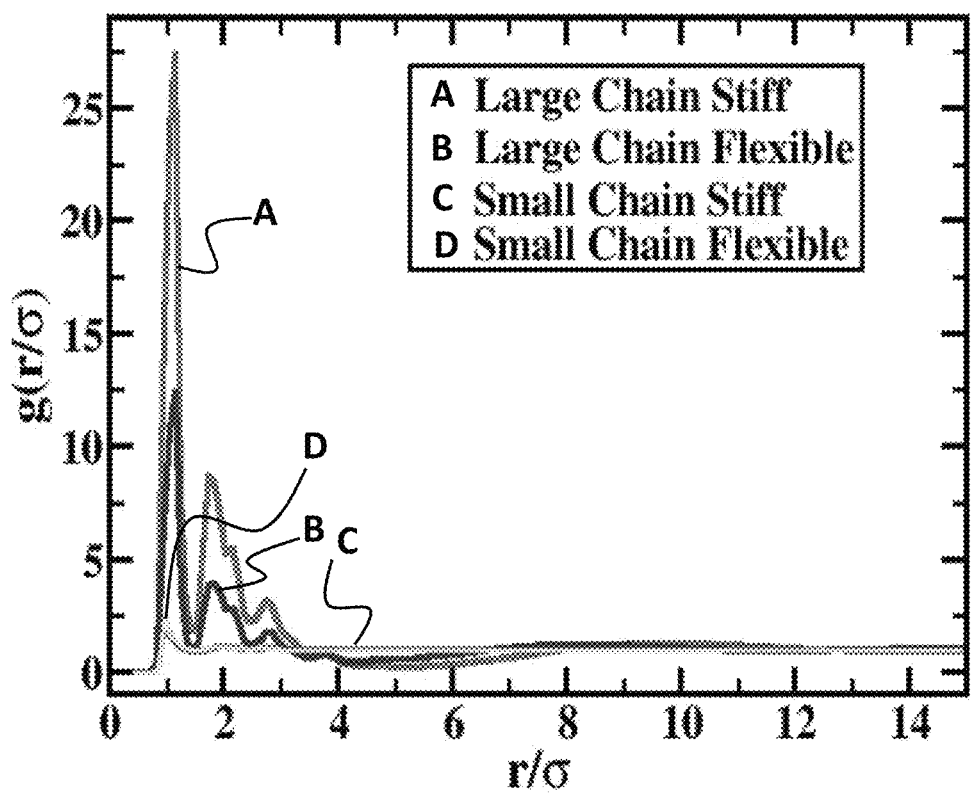

The coarse-grain MD simulations of LCNs with different chain lengths showed structurally different morphologies. The mesogens interacted with each other via attractive LJ potential, thereby introducing anisotropy at the monomer level that can result into LC ordering. A slice of the cross-section of the mesogens along the LC director are shown in FIGS. 38A and 38B for large-chain and small-chain LCN systems, respectively. While distinct LC ordering was observed in large-chain system (FIG. 38A), the same was absent in small-chain system (FIG. 38B) where agglomerated structures were observed. The LC ordering was further established from the density wave of the mesogens (FIG. 39A) along the director axis, a typical representation of smectic LC ordering. The rigid mesogens showed well-spaced smectic phase ordering for large-chain LCN with a higher BMAB concentration (line A); however, the same ordering was broken in small-chain LCN with a lower BMAB concentration (line B). These findings are commensurate with the experimental WAXS and DSC observations. The radial distribution function (RDF) further elucidates the orientation and long-range order (FIG. 39B) of the rigid mesogens. RDF of the flexible chains (line D) showed first and second peaks at 0.97σ and 1.95σ, representing side-by-side monomeric distance and next nearest neighbor peaks, however, no long-range structure was observed. In contrast, RDF of the rigid mesogens for both large (line B) and small (line C) chain LCNs showed long range structures, as evident by peaks at a longer length-scales. However, for the small-chain LCN stronger agglomeration of the rigid mesognes was observed. This indicated that the higher order orientational ordering was facilitated by large-chain LCN, consistent with the experiments where LCNs with higher concentration of BMAB showed better LC properties. The large and small chain LCNs both showed peaks near 1.12σ, representing excluded volume peak (LJ repulsion distance) that corresponded to side-by-side packing of the mesogens. The peaks at the longer length scales showed an interval of equally-spaced monomeric distance of 0.97σ, representing a three-dimensional packing of rigid mesogens coming from multiple chains, consistent with the WAXS pattern. The simulation analysis along with the WAXS confirmed the orientational ordering of the LCNs, in which the LC directors were formed by rigid mesogens from multiple chains that in turn assembled into a layered smectic LC structure.

Example 9

In this example, structural domains of certain LCN embodiments are examined using neutron scattering. Non-deuterated embodiments and deuterated embodiments (wherein one or more hydrogen atoms of the chain extender compound are replaced with deuterium) of the LCN can be examined. SANS patterns are obtained from the neutron scattering. The scans are taken in the high q region, which contains structural information of the LC domains of the LCN. The SANS patterns can indicate that, for some embodiments, deuteration can improve neutron scattering intensity of the material. For example, d-LCNs can exhibit clear neutron scattering patterns that may result from SmA polymorphism. Analysis of the low q region also can be carried out; this region contains information of scattering objects with sub-micron sizes. Slightly oval shaped SANS patterns can be observed for the stretched h-LCNs.

Deuteration can increase the overall neutron scattering intensity of the d-LCNs and also highlight the neutron scattering contrast between the LC and the amorphous domains, which can reveal structural information not obtained from X-ray scattering. Two-dimensional WAXS and SAXS patterns of d-LCNs with different strain values also can be obtained using X-ray scattering. Slightly oval shaped scattering patterns can be observed for stretched d-LCNs.

In view of the many possible embodiments to which the principles of the present disclosure may be applied, it should be recognized that the illustrated embodiments are only preferred examples and should not be taken as limiting the scope of the present disclosure. Rather, the scope of is defined by the following claims. We therefore claim as our invention all that comes within the scope and spirit of these claims.

We claim:

1. A liquid crystalline network, comprising:
(i) a monomer having a structure according to Formula I

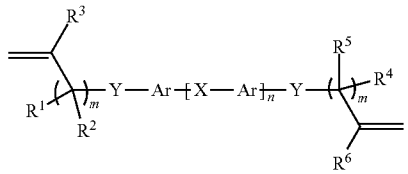

Formula I wherein
each Ar group is an aromatic ring system;
each X independently is a linker group;
each Y independently comprises a heteroatom;
each of $R^1$, $R^2$, $R^3$, $R^4$, $R^5$, and $R^6$ independently is selected from hydrogen, deuterium, aliphatic, heteroaliphatic, haloaliphatic, haloheteroaliphatic, aromatic, or an organic functional group;
n is an integer selected from 0 to 5; and
m is an integer selected from 0 to 50;
(ii) a chain extender compound having a structure according to Formula II HS-A-SH      Formula II wherein
A comprises an aliphatic group, a heteroaliphatic group, an aromatic group, or an organic functional group; and
(iii) a crosslinker compound having a structure according to Formula III

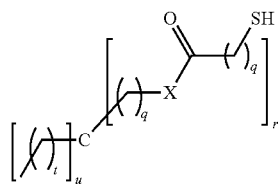

Formula III wherein
each X independently is O, S, or NR", wherein R" is hydrogen, aliphatic, or heteroaliphatic;
each q independently is an integer selected from 1 to 100;
r is an integer selected from 2, 3, or 4;
each t independently is an integer selected from 0 to 5; and
u is an integer selected from 0, 1, or 2; and
wherein the monomer is directly covalently coupled to the chain extender compound, the crosslinker compound, or both the chain extender compound and the crosslinker compound.

2. The liquid crystalline network of claim 1, wherein each Ar group of the monomer is an aryl group or a heteroaryl group; each X independently is azo or ester; each Y independently is O, S, or NH; each of $R^1$, $R^2$, $R^3$, $R^4$, $R^5$, and $R^6$ is hydrogen; and m is an integer selected from 0 to 5.

3. The liquid crystalline network of claim 1, wherein the monomer has a structure according to one of formulas IA, IB, IC, ID, IE, or IF

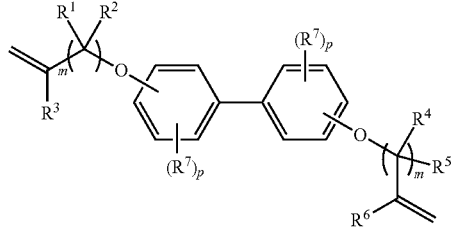

Formula IA

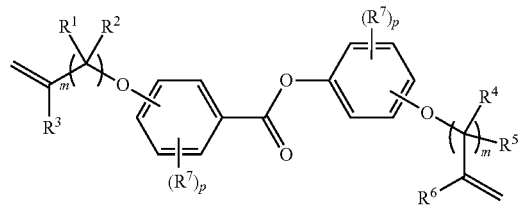

Formula IB

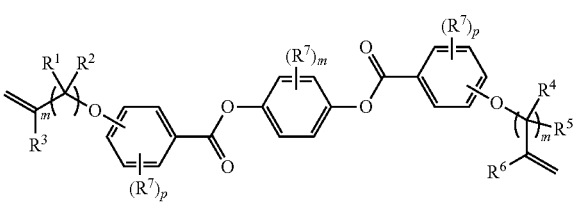

Formula IC

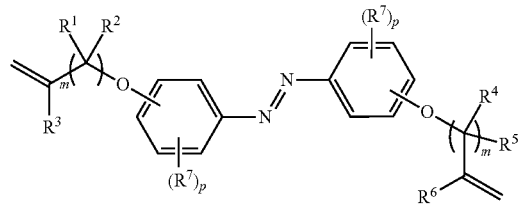

Formula ID

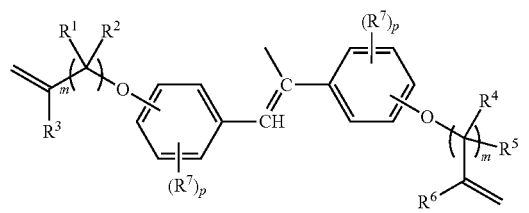

Formula IE

Formula IF

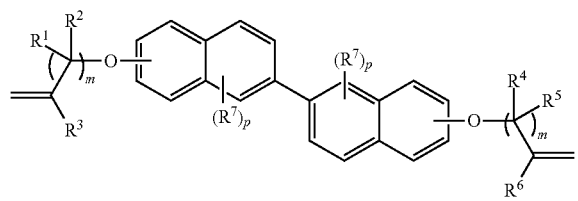

wherein each R⁷ independently is selected from aliphatic, aromatic, or an organic functional group; and each p independently is an integer selected from 0 to 4.

4. The liquid crystalline network of claim 1, wherein the monomer has a structure according to one of formulas IA', IB', IC', ID', IE', or IF'

Formula IA'

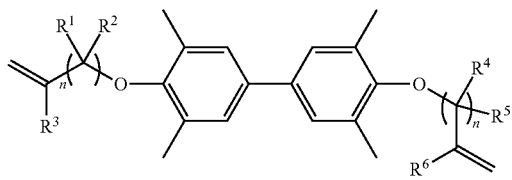

Formula IB'

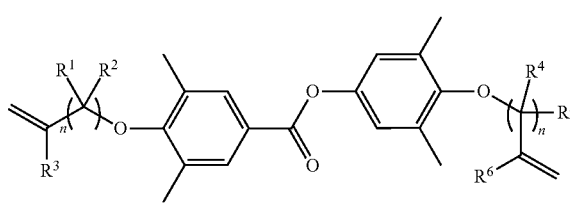

Formula IC'

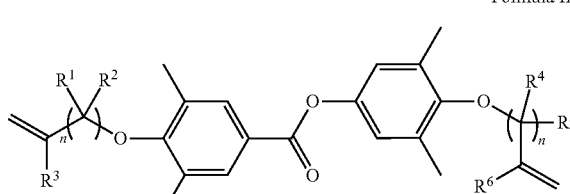

Formula ID'

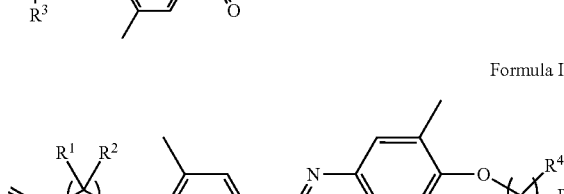

Formula IE'

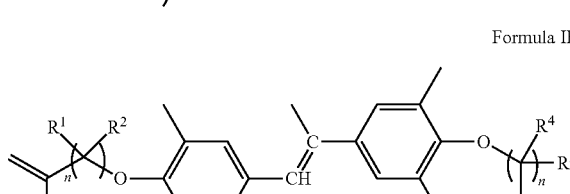

Formula IF'

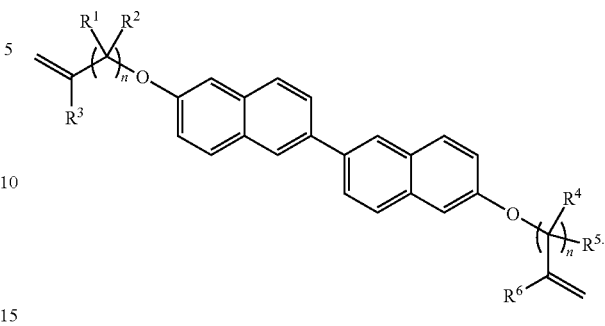

5. The liquid crystalline network of claim 1, wherein the monomer has a structure according to one of formulas IA", IB", IC", ID", IE", or IF"

Formula IA"

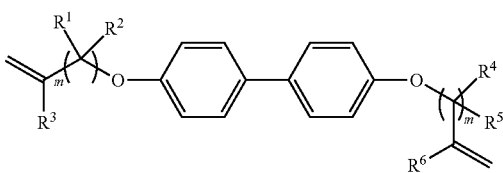

Formula IB"

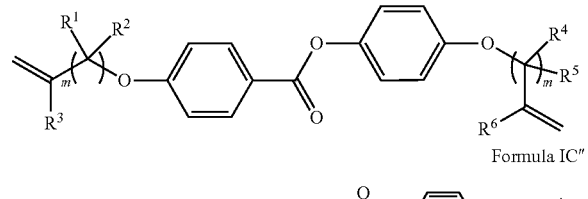

Formula IC"

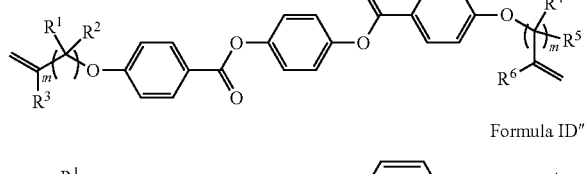

Formula ID"

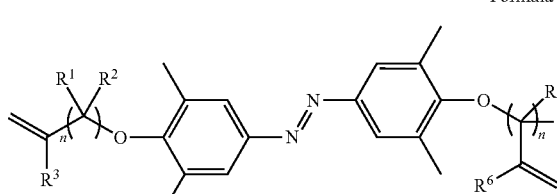

Formula IE"

Formula IF"

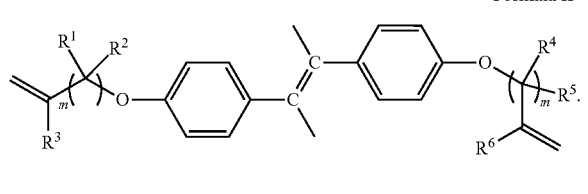

6. The liquid crystalline network of claim 1, wherein the monomer is selected from

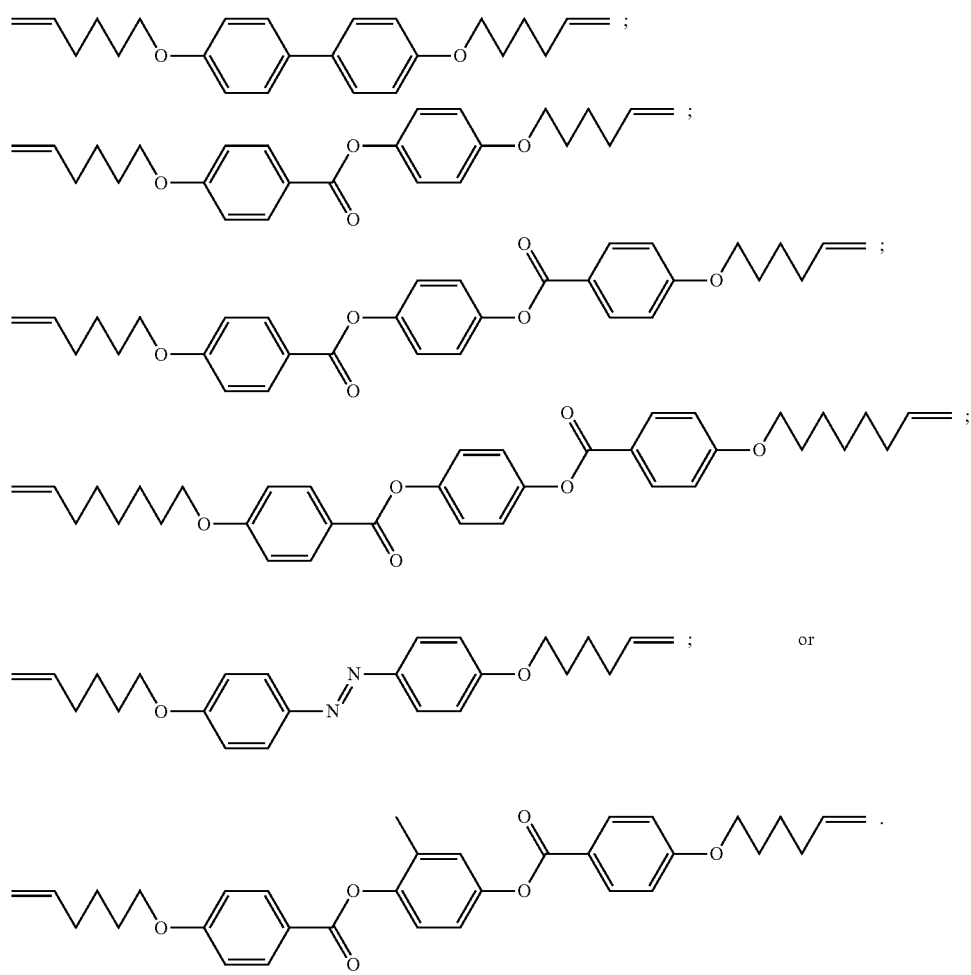

7. The liquid crystalline network of claim 1, wherein the A group of Formula II is —(CR'$_2$)$_q$, wherein each R' independently is hydrogen or aliphatic and q is an integer selected from 1 to 100; —CH$_2$CH$_2$(OCH$_2$CH$_2$)$_q$—, wherein q is an integer selected from 1 to 100; —(CH$_2$)$_q$C(O)O (CH$_2$)$_q$ OC(O)(CH$_2$)$_q$—, wherein q is an integer selected from 1 to 100; —(CH$_2$)$_q$C(O)N(H)(CH$_2$)$_q$N(H)C(O) (CH$_2$)$_q$—, wherein q is an integer selected from 1 to 100; or —(CH$_2$)$_q$O-Ph-C(O)O-Ph-OC(O)-Ph-O(CH$_2$)$_q$—, wherein q is an integer selected from 1 to 100.

8. The liquid crystalline network of claim 1, wherein the chain extender compound is selected from 2,2'-(ethane-1,2-diylbis(oxy))bis(ethane-1-thiol), hexane-1,6-dithiol, butane-1,4-diylbis(2-mercaptoacetate), octane-1,8-dithiol, hexadecane-1,16-dithiol, 2,2'-oxybis(ethane-1-thiol), or 1,4-phenylene bis(4-((6-mercaptohexyl)oxy)benzoate).

9. The liquid crystalline network of claim 1, wherein X of Formula III is oxygen; r of Formula III is 4; u of Formula III is 0; t is 1; and each q independently is 1 or 2.

10. The liquid crystalline network of claim 1, wherein X of Formula III is oxygen; r of Formula III is 3; u of Formula III is 1; t is 1; and each q independently is 1 or 2.

11. The liquid crystalline network of claim 1, wherein the crosslinker is selected from

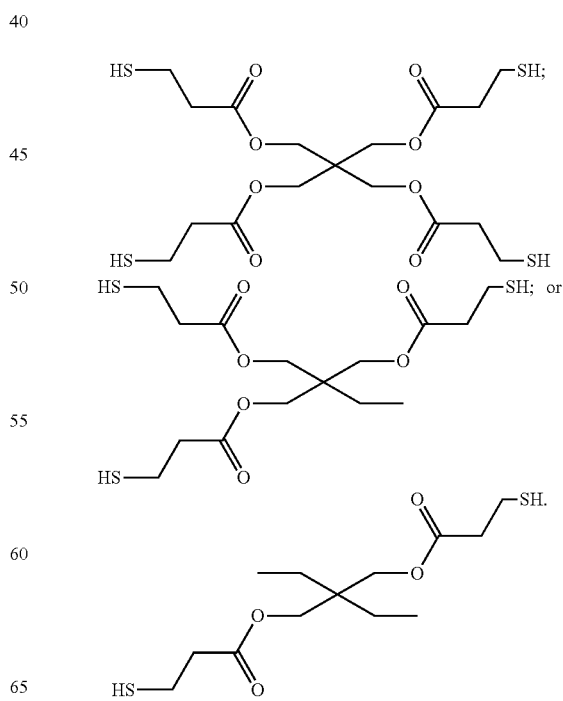

12. The liquid crystalline network of claim 1, wherein the liquid crystalline network exhibits a glass transition temperature ranging from −50° C. to 50° C., as measured using differential scanning calorimetry.

13. The liquid crystalline network of claim 1, wherein the liquid crystalline network comprises a liquid crystalline phase and the liquid crystalline phase exhibits a thermal stability ranging from 40° C. to 180° C., as measured using differential scanning calorimetry.

14. The liquid crystalline network of claim 1, wherein the liquid crystalline network exhibits a degree of liquid crystallinity ranging from 0 J/g to 40 J/g, as measured using differential scanning calorimetry.

15. A composition, comprising:
(i) a monomer having a structure according to Formula I

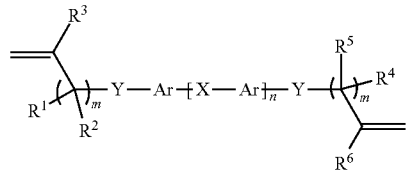

Formula I wherein
each Ar group is an aromatic ring system;
each X independently is a linker group;
each Y independently comprises a heteroatom;
each of $R^1$, $R^2$, $R^3$, $R^4$, $R^5$, and $R^6$ independently is selected from hydrogen, aliphatic, heteroaliphatic, haloaliphatic, haloheteroaliphatic, aromatic, or an organic functional group;
n is an integer selected from 0 to 5; and
m is an integer selected from 0 to 50;
(ii) a chain extender compound having a structure according to Formula II HS-A-SH      Formula II wherein
A comprises an aliphatic group, a heteroaliphatic group, an aromatic group, or an organic functional group; and (iii) a crosslinker compound having a structure according to Formula III

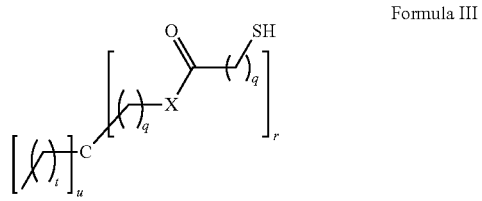

Formula III wherein
each X independently is O, S, or NR″, wherein R″ is hydrogen, aliphatic, or heteroaliphatic;
q is an integer selected from 1 to 100;
r is an integer selected from 2, 3, or 4;
t is an integer selected from 0 to 5; and
u is an integer selected from 0, 1, or 2.

16. The composition of claim 15, further comprising an initiator compound.

17. The composition of claim 15, wherein the monomer, the chain extender compound, and the crosslinker compound are present in a ratio ranging from 3:1:1 (monomer:chain extender compound:crosslinker compound) to 8:6:1 (monomer:chain extender compound:crosslinker compound).

18. The composition of claim 15, wherein the crosslinker is present at a mole fraction ranging from 5% to 35%.

19. A method, comprising:
adding the composition of claim 15, or components thereof, into an additive manufacturing device;
depositing the composition using the additive manufacturing device to provide a deposited composition; and
polymerizing the deposited composition to provide a liquid crystalline network by exposing it to an energy source.

20. The method of claim 19, further comprising exposing the deposited composition, the liquid crystalline network, or both to an external field selected from a magnetic field, and electric field, or a combination thereof.

* * * * *